(12) United States Patent  (10) Patent No.: US 9,626,875 B2
Gal et al.  (45) Date of Patent: Apr. 18, 2017

(54) SYSTEM, DEVICE, AND METHOD OF ADAPTIVE TEACHING AND LEARNING

(71) Applicants: Michael Gal, Herzliya (IL); Arie Kogan, Tel Aviv (IL)

(72) Inventors: Michael Gal, Herzliya (IL); Arie Kogan, Tel Aviv (IL)

(73) Assignee: Time to Know Ltd., Ramat Gan (IL)

( * ) Notice: Subject to any disclaimer, the term of this patent is extended or adjusted under 35 U.S.C. 154(b) by 248 days.

(21) Appl. No.: 14/446,346

(22) Filed: Jul. 30, 2014

(65) Prior Publication Data

US 2014/0335497 A1 Nov. 13, 2014

Related U.S. Application Data

(63) Continuation-in-part of application No. 11/831,981, filed on Aug. 1, 2007, now abandoned.

(51) Int. Cl.
  *G09B 3/00* (2006.01)
  *G09B 5/08* (2006.01)
  *G09B 7/00* (2006.01)
  *G09B 19/00* (2006.01)

(52) U.S. Cl.
  CPC .............. *G09B 5/08* (2013.01); *G09B 7/00* (2013.01); *G09B 19/003* (2013.01)

(58) Field of Classification Search
  USPC ........................................................ 434/322
  See application file for complete search history.

*Primary Examiner* — Kesha Frisby
(74) *Attorney, Agent, or Firm* — Eitan, Mehulal & Sadot

(57) ABSTRACT

Device, system, and method of adaptive teaching and learning. A computerized method includes operations performed in order to dynamically group and re-group students based on their monitored progress of interacting with digital educational learning objects; performing dynamic layout of components and elements of a digital learning object by taking into account pedagogic goals, pedagogic priorities or pedagogic significance or elements; allowing a teacher to define differential stop-lines for different groups of students; allowing a teacher to command that all student devices temporarily present a uniform learning object; allowing a content publisher to receive aggregated feedback based on monitored progress; and allowing a content publisher to package the objects as portable stand-alone playback modules.

30 Claims, 8 Drawing Sheets

SYSTEM, DEVICE, AND METHOD OF ADAPTIVE TEACHING AND LEARNING

CROSS-REFERENCE TO RELATED APPLICATIONS

This application is a Continuation-in-Part (CIP) of U.S. patent application Ser. No. 11/831,981, filed on Aug. 1, 2007, which is hereby incorporated by reference in its entirety.

FIELD

Some embodiments of the invention are related to the field of electronic learning.

BACKGROUND

Many professionals and service providers utilize computers in their everyday work. For example, engineers, programmers, lawyers, accountants, bankers, architects, physicians, and various other professionals spend several hours a day utilizing a computer. In contrast, many teachers do not utilize computers for everyday teaching. In many schools, teachers use a "chalk and talk" teaching approach, in which the teacher conveys information to students by talking to them and by writing on a blackboard.

SUMMARY

Some embodiments of the invention include, for example, devices, systems, and methods of adaptive teaching and learning. Some embodiments include, for example, a teaching/learning system including a real-time class management module to selectively allocate first and second digital learning objects for performance, substantially in parallel, on first and second student stations, respectively.

In some embodiments, the real-time class management module is to select the first and second digital learning objects from a repository of digital learning objects.

In some embodiments, the real-time class management module is to receive from the first student station a signal indicating, substantially in real-time, successful performance of the first digital learning object.

In some embodiments, the real-time class management module is to receive from the first student station a signal indicating, substantially in real-time, incorrect performance of at least a portion of the first digital learning object.

In some embodiments, in response to the signal received from the first student station, the real-time class management module is to automatically allocate a third digital learning object for performance on the first student station.

In some embodiments, the system includes a teacher station associated with the first and second student stations; in response to the signal received from the first student station and further in response to a signal indicating approval received from the teacher station, the real-time class management module is to automatically allocate a third digital learning object for performance on the first student station.

In some embodiments, the real-time class management module is to determine substantially in real-time that at least a portion of the first digital object has been incorrectly performed, and to selectively allocate for performance on the first student station a third learning object including at least the incorrectly performed portion of the first digital learning object.

In some embodiments, at least a portion of the third learning object includes a modified version of at least a portion of the first digital learning object.

In some embodiments, a computing station includes: an interface to present to a student a first set of learning exercises for performance, to identify one or more of the exercises that are incorrectly performed by the student, to determine a common topic of the one or more incorrectly performed exercises, and to selectively present to the student a second set of exercises in the common topic.

In some embodiments, the second set of exercises includes at least one exercise including modified content of an exercise of the first set of exercises.

In some embodiments, prior to presenting the second set of exercises, the interface is to present a digital learning object in the common topic.

In some embodiments, a computing station includes: an interface to present to a student a first set of learning exercises for performance, to identify one or more of the exercises that are correctly performed by the student, to determine a common topic of the one or more correctly performed exercises, and to selectively present to the student a second set of exercises in the common topic.

In some embodiments, the second set of exercises includes at least one exercise including modified content of an exercise of the first set of exercises.

In some embodiments, a difficulty level of the second set of exercises is higher than a difficulty level of the first set of exercises.

In some embodiments, a method of adaptive teaching includes: generating a knowledge map associated with a student, the knowledge map including information reflecting knowledge levels of the student in a plurality of topics; based on the knowledge map, allocating to the student a digital learning activity for performance; and updating the knowledge map based on the performance results of the digital learning activity by the student.

In some embodiments, the digital learning activity relates to one or more topics, and updating the knowledge map includes: updating the knowledge map with information to reflect a level of the student in the one or more topics based on the performance of the student in the digital learning activity.

In some embodiments, the method includes: identifying in the knowledge map a topic in which the knowledge level of the student is below a pre-defined threshold; and allocating to the student a digital learning activity for performance in the identified topic.

In some embodiments, the method includes: identifying in the knowledge map a topic in which the knowledge level of the student is above a pre-defined threshold; and allocating to the student a digital learning activity for performance in the identified topic.

In some embodiments, the digital learning activity includes at least first and second portions, and the method includes: automatically modifying the second portion of the digital learning activity based on performance by the student of the first portion of the digital learning activity.

In some embodiments, a collaborative learning system includes: a plurality of student stations to allow substantially parallel performance of a digital learning activity; a teacher station to receive a first captured snapshot of the digital learning activity from a first student station of the student stations, and to receive a second, different, captured snapshot of the digital learning activity from a second student station of the student stations.

In some embodiments, the teacher station includes an input unit to select one or more captured snapshots from two or more received captured snapshots of the digital learning activity.

In some embodiments, the system includes a display unit to selectively display the selected captured snapshots.

In some embodiments, the system includes a display unit to selectively display scaled-down representations of the selected captured snapshots.

In some embodiments, the teacher station is to generate a snapshot of the digital learning activity, and the display unit is to selectively display the snapshot generated by the teacher station and one or more captured snapshots received from student stations.

In some embodiments, a system includes: a student station to allow a student to perform thereon one or more digital learning objects; and an assessment module to assess, substantially in real-time, a knowledge level of the student based on performance of the one or more digital learning objects on the student station.

In some embodiments, the assessment module is to monitor, substantially in real-time, one or more parameters reflecting results of performance of the one or more digital learning objects by the student, and to report, substantially in real-time, the one or more parameters to a teacher station.

In some embodiments, the assessment module is to dynamically calculate a ratio between a number of exercises performed correctly by the student and a total number of exercises performed by the student.

In some embodiments, the assessment module is to generate an alert substantially in real-time if the assessed knowledge level is below a pre-defined threshold.

In some embodiments, the system includes a teacher station to present the alert substantially in real-time.

In some embodiments, a system for facilitating teaching, learning and assessment includes: a lesson planning module to generate a lesson plan having one or more learning activities intended to be performed in accordance with a planned sequence; a real-time class management module to manage, substantially in real-time, teaching processes performed utilizing a teacher station and learning processes performed utilizing student stations; and an integrated assessment module to perform integrated assessment based on operations performed utilizing the student stations, the assessment integrated into the teaching processes and the learning processes.

In some embodiments, the lesson planning module is to modify the lesson plan based on input entered utilizing the teacher station substantially in real-time.

In some embodiments, the lesson planning module is to remove from the lesson plan a learning activity thereof, based on input entered utilizing the teacher station substantially in real-time.

In some embodiments, the lesson planning module is to replace in the lesson plan a first learning activity thereof with a second learning activity, based on input entered utilizing the teacher station substantially in real-time.

In some embodiments, the system is to divide students utilizing student stations into a plurality of groups based on multi-dimensional criteria.

In some embodiments, the system is to allocate a first learning activity to a first group of the groups, and to allocate a second learning activity to a second group of the groups; and the first and second learning activities to be performed substantially in parallel by the first and second groups, respectively.

In some embodiments, the system is to expose a subsequent learning activity to a student utilizing a student station if a pre-defined percentage of students utilizing student stations successfully completed a previously-exposed learning activity.

In some embodiments, a computing station includes: a lesson planning module to generate a lesson plan representing, in accordance with a pre-defined scripting language, one or more learning activities intended to be performed during a lesson, and a sequence in which the learning activities are intended to be performed.

In some embodiments, the lesson planning module is to perform a modification of the lesson plan based on input entered substantially in real-time during the lesson through a teacher station.

In some embodiments, the modification includes an operation selected from a group consisting of: removal of a learning activity from the lesson plan; replacement of a first learning activity in the lesson plan with a second, different, learning activity; insertion of a learning activity into the lesson plan; modification of the sequence of the learning activities; modification of a sequence of two or more lesson plans of a study unit; temporarily locking a learning activity to be unavailable to student stations; and unlocking a previously-locked learning activity.

In some embodiments, the computing station includes: a speech recognition module to receive an oral input, and to determine that the oral input represents a command to perform the modification.

In some embodiments, the computing station includes: a drag-and-drop interface to receive input representing a command to perform the modification.

In some embodiments, the lesson planning module is to dynamically perform a modification of the lesson plan, in accordance with one or more predefined rules, based on performance of one or more digital learning objects through one or more student stations.

In some embodiments, the modification includes an operation selected from a group consisting of: removal of a learning activity from the lesson plan; replacement of a first learning activity in the lesson plan with a second, different, learning activity; insertion of a learning activity into the lesson plan; modification of the sequence of the learning activities; temporarily locking a learning activity to be unavailable to student stations; and unlocking a previously-locked learning activity.

In some embodiments, a method of evaluating performance of a member of an education system includes: generating a plurality of knowledge maps associated with a plurality of students associated with the member, wherein each knowledge map includes information reflecting knowledge levels of a student in a plurality of topics; and assessing the performance of the member based on an aggregated analysis of the plurality of knowledge maps.

In some embodiments, the method includes: evaluating the performance of a first member of the education system relative to a second member of the education system, based on a comparison between knowledge maps of students associated with the first member and knowledge maps of students associated with the second member.

In some embodiments, the method includes: based on an analysis of operations performed by the member, determining that the member utilizes pre-provided lesson plans more than modified lesson plans or originally-created lesson plans; and evaluating the performance of the member based on an aggregated analysis of a plurality of knowledge maps associated with the member.

In some embodiments, the method includes: based on an analysis of operations performed by the member, determining that the member utilizes modified lesson plans more than pre-provided lesson plans or originally-created lesson plans; and evaluating the performance of the member based on an aggregated analysis of a plurality of knowledge maps associated with the member.

In some embodiments, the method includes: based on an analysis of operations performed by the member, determining that the member utilizes originally-created lesson plans more than pre-provided lesson plans or modified lesson plans; and evaluating the performance of the member based on an aggregated analysis of a plurality of knowledge maps associated with the member.

In some embodiments, a method for assessing knowledge of one or more students includes: generating a knowledge map associated with a student, the knowledge map including information reflecting at least one of: knowledge levels of the student in a plurality of topics; skills of the student; and competencies of the student.

In some embodiments, the method includes: presenting a graphical representation of the knowledge map to distinctively indicate, in accordance with pre-defined presentation rules, topics in which the student is strong and topics in which the student is weak.

In some embodiments, the method includes determining a knowledge gap between: actual knowledge of the student reflected in the knowledge map, and required knowledge in accordance with an education system requirements.

In some embodiments, the method includes: presenting a graphical representation of the knowledge map, the required knowledge, and the knowledge gap.

In some embodiments, a method of generating a techno-pedagogic solution to a pedagogic problem includes: determining an educational topic intended for teaching in a computerized environment; correlating between a set of characteristics of the computerized environment and one or more pedagogic goals; and determining a teaching process that utilizes at least a portion of the computerized environment to meet at least one of the pedagogic goals.

In some embodiments, determining a teaching process includes: determining an optimal teaching process that utilizes at least a portion of the computerized environment to meet a maximum number of pedagogic goals achievable with respect to the pedagogic problem.

In some embodiments, the method includes: generating a digital learning object that represents the optimal teaching process.

Some embodiments may include, for example, a computer program product including a computer-useable medium including a computer-readable program, wherein the computer-readable program when executed on a computer causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
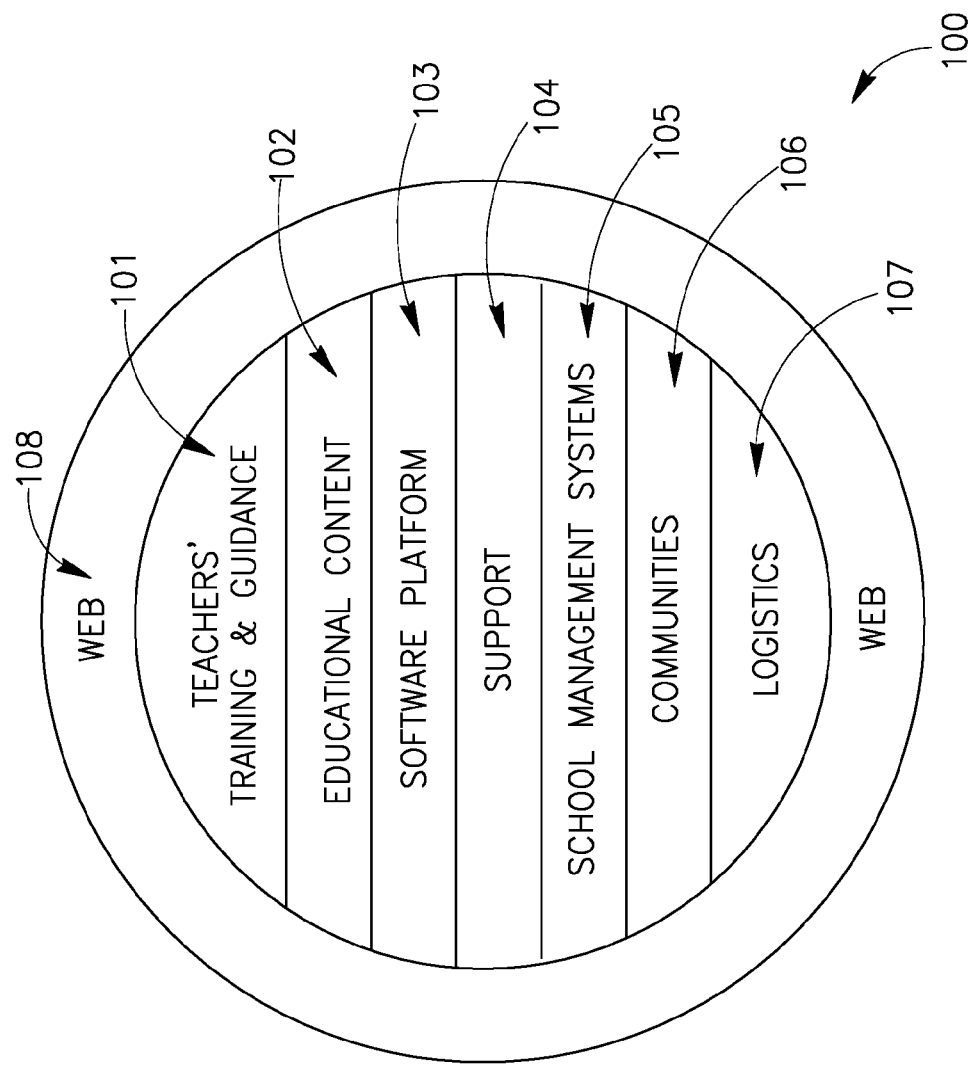
FIG. 1 is a schematic block diagram illustration of a teaching/learning system in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein may include, for example, "multiple" or "two or more". For example, "a plurality of items" includes two or more items.

Although portions of the discussion herein may relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

The term "teacher" as used herein includes, for example, an educator, a tutor, a guide, a principal, a permanent teacher, a substitute teacher, an instructor, a moderator, a supervisor, an adult supervising minors, a parent acting in a role of a teacher, a designated student acting in a role of a teacher, a coach, a trainer, a professor, a lecturer, an education-providing person, a member of an education system, a teaching professional, a teaching person, a member of an education system, a teacher that performs teaching activities in-class and/or out-of-class and/or remotely, a person that conveys information or knowledge to one or more students, or the like.

The term "student" as used herein includes, for example, a pupil, a minor student, an adult student, a scholar, a minor, an adult, a person that attends school on a regular or non-regular basis, a learner, a person acting in a learning role, a learning person, a person that performs learning activities in-class or out-of-class or remotely, a person that receives information or knowledge from a teacher, or the like.

The term "class" as used herein includes, for example, a group of students which may be in a classroom or may not be in the same classroom; a group of students which may be associated with a teaching activity or a learning activity; a group of students which may be spatially separated, over one or more geographical locations; a group of students which may be in-class or out-of-class; a group of students which may include student(s) in class, student(s) learning from their homes, student(s) learning from remote locations (e.g., a remote computing station, a library, a portable computer), or the like.

Some embodiments utilize Information and Computer Technology (ICT) to significantly enhance academic achievements of students in schools. A modified learning culture, a modified learning environment and a comprehensive approach are used, in association with features of Computer-Based Learning (CBL), to provide a holistic approach to teaching and learning. For example, research and experience in CBL contribute to understanding of the value, the importance and/or the need to utilize ICT in learning; the penetration of ICT into various aspects of life, specifically of young people, contributes to readiness for change and implementation of adaptive learning; evolving technologies contribute to availability of ICT, e.g., at affordable prices; realization of un-fitness of conventional education methods contributes to understanding of the importance of using new educational methods; and cultural changes, whereas social changes and economic changes (e.g., globalization, information society) present new requirements from school graduates. Accordingly, some embodiments harness the power of ICT to the educational arena, to provide C-Learning (namely, Comprehensive Learning, Collaborative Learning, and/or In-Class Learning).

Some embodiments, provide meaningful learning, for example, by utilizing learning objects and learning activities that are interactive, thereby encouraging the student to be actively involved in the learning process; attractive, thereby making the learning process a desired process from the student point-of-view; constructive, assisting knowledge building; adaptive, addressing personal needs of individual students; and relevant to the student's world. The individual learning is supported and assisted by an adaptive teaching/learning system, which selectively allocates and assigns various digital learning objects to students based on their individual skills, needs and past performance.

Some embodiments are adapted to accommodate to a new graduate profile, according to which a graduate is an active learner; an autonomous learner; able to continuously adapt to frequent changes; able to evaluate and criticize information and data; able to evaluate choices an choose among alternatives; able to set goals and determine priorities; able to learn by himself; able to cooperate and collaborate with colleagues; able to properly and wisely utilize the technical tools of the ICT environment; able to assess his own progress and performance; able to dynamically choose a learning strategy, and/or to dynamically initiate such learning strategy, according to needs at a particular situation.

Some embodiments are adapted to accommodate to changes in teachers' competencies, which include: guidance skills; knowledge building skills; ability to build skills and competencies of students; ICT literacy; ability to adapt the teaching process to learning needs; ability to select items (e.g., digital learning objects) from a repository, to create digital learning objects, to compose learning activities from learning objects, and to allocate learning activities or learning objects to students, to groups of students, or to a class; and ability to properly and wisely utilize the technical tools of the ICT environment. In some embodiments, for example, the teacher is able to "guide on the side" instead of "sage on the stage".

Some embodiments provide a solution specifically tailored, designed and developed for schools (e.g., elementary schools) and school teachers, e.g., in contrast with solutions designed and developed for academic needs and users, or for corporate or business needs or users. Accordingly, some embodiments place the school and/or the teacher in the center of the educational system.

Some embodiments create relation and correlation between ICT advantages and the pedagogic goals set for knowledge, skills, and competencies in the curriculum. Some embodiments provide a comprehensive solution that takes into account substantially all the parties to education and all aspects associated with education, namely, teachers, students, parents, computers, curriculum, assessment, educational content, or the like. Accordingly, some embodiments provide a techno-pedagogy solution that allows a teacher to easily and/or efficiently teach in a classroom populated with students equipped with computers or other electronic devices (e.g., desktop computers, laptop computers, portable computers, workstations, student terminals, smartphones, tablets, content consumption devices, board, smart-board, projectors, or the like). Some embodiments thus include methodology and tools to provide the advantages of ICT to the pedagogic science, thereby allowing the teacher to perform his job (namely, to teach) at his workspace (namely, the classroom, and/or from home or other places from which the teacher can remotely connect to the teaching/learning system) utilizing the benefits of ICT.

Some embodiments provide a full comprehensive educational solution, which positions the teacher in the focus. Diversity, flexibility and modularity are taken into account, such that the teaching/learning system accommodates a variety of pedagogical approaches or teachers, teaching styles of teachers, ICT competencies of teachers, competencies of students, learning styles of students, and special needs of students. The teacher guides the process of knowledge building by the students; the teacher can choose to be a source of knowledge, and/or a coach for knowledge building.

Curriculum, goals and standards set by official agencies (e.g., Ministry of Education) may be utilized; needs and priorities specific by users may be addressed; and a variety of pedagogic approaches may be used or supported. Some embodiments utilize an ICT system which is web-based, open, scalable, re-usable (e.g., utilizing Semantic Web principles, utilizing educational library services, or the like), and/or compliant with standards (e.g., international standards, learning outcome standards, or the like). In some embodiments, the teaching/learning system is implemented using open and/or scalable software platform or infrastructure. In some embodiments, educational content used by the teaching/learning system may be open for modification and/or expansion by users, e.g., further development or generation of educational content by the educational community.

In some embodiments, the teaching/learning system may be used by substantially all teachers in a school or in an education system, in contrast with sporadic use of computers by few pioneering teachers. For example, the teaching/learning system may be implemented as a user-friendly system which may be relatively easy to master and operate, including by teachers that are not ICT literate.

In some embodiments, the teaching/learning system allows personal, personalized, adaptive and/or differential learning, instead of uniform and/or average learning. In some embodiments, the teaching/learning system provides full-curriculum high-quality rich digital content, instead of low-quality and/or coincidental digital content.

In some embodiments, the teaching/learning system offers to teachers an initial selection of high-quality rich digital content, and allows expansion of the educational content by users and/or by third-party content providers.

In some embodiments, the teaching/learning system allows integrated assessment, ongoing assessment, continuous assessment, real-time assessment, alternative assessment, and/or assessment substantially un-noticeable by students, instead of occasional and/or solitary assessment events. For example, "in the classroom" integrated teaching, learning and assessment processes are used, and assessment may be integrated in substantially all learning activities. Alternative assessment includes one or more types of assessment in which students create a response to a question or task; for example, in contrast to traditional assessments, in which students select a response from a pre-provided group or list (e.g., multiple-choice questions, true/false questions, matching between items, or the like).

In some embodiments, the teaching/learning system allows students and teachers to be exposed to computers and/or utilize computers substantially anywhere and anytime, instead of a limited access to computers and/or limited utilization of computers in school by teachers and/or students.

In some embodiments, the teaching/learning system supports a comprehensive educational curriculum, instead of a partial curriculum, a sporadic portion of the curriculum, or only supplementary resources.

In some embodiments, the teaching/learning system allows classroom management by a teacher in substantially real time, for example, flow of learning activities; student/groups management; allocation of assignments; or the like.

In some embodiments, the teaching/learning system may require an initial one-time investment (e.g., an initial teachers preparation and ongoing, optional, update sessions), instead of numerous disjointed sessions of teachers preparation; for example, an intuitive approach allows teachers to rapidly understand and utilize the system, thereby attracting even teachers that are hesitant or relatively slow to adapt to new systems.

In some embodiments, the teaching/learning system allows teachers to save time and efforts, for example, in planning or preparing lessons (e.g., by utilizing lessons templates, pre-prepared lessons plans models for teaching scenarios, or the like), in creating tests or assessment tasks, in checking or marking or grading tests or assessment tasks, or the like. The teaching/learning system allows teaching and learning to become positive and enjoyable experiences.

In some embodiments, the teaching/learning system is used in conjunction with conservative teaching styles (e.g., blended teaching, or blending learning), in class and/or out of class. For example, in some embodiments, approximately 50 percent, or up to 50 percent, of the teaching/learning in the classroom are ICT-based activities, and the rest are conservative teaching/learning activities.

FIG. 1 schematically illustrates a block diagram of a teaching/learning system 100 in accordance with some demonstrative embodiments of the invention. System 100 may include one or more components, modules or layers, which may be implemented using software and/or hardware, optionally across multiple locations or using multiple devices or units.

A teachers' training and guidance module 101 is operable to train and guide teachers in utilizing the system 100, for example, using online help, a help-desk, seminars, workshops, tutorials, or the like.

An educational content module 102 includes digital content corresponding to partial or substantially complete curriculum. The educational content module 102 allows differential teaching/learning, for example, such that system 100 selectively presents a first educational content to a first student or group of students, and a second educational content to a second student or group of student. The differential teaching/learning is based, for example, on the progress or the relative progress of a student or a group of student, on the level or the relative level of a student or a group of student, on prior or ongoing assessments, or on other criteria. The differential teaching/learning addresses personal needs and/or personal abilities of a student or a group of students, allowing student self-pace learning while the teacher guides and monitors the activities and progress of students and/or groups of students.

In some embodiments, the differential teaching/learning may allow substantially each student (or group of students) to advance in his studies according to his specific needs, abilities, skills, knowledge, and preferred learning style. For example, different students in the same class may be assigned or allocated different learning objects or learning activities (e.g., substantially in parallel or in an overlapping time period), to accommodate the specific needs of various students. Additionally or alternatively, within the flow of a learning object, personalized feedback or support may be provided to the student, taking into account the specific needs or skills of the student, his prior performance and answers, his specific strengths and weaknesses, his progress and decisions, or the like. In some embodiments, portions of the content of educational learning objects may be automatically modified, removed or added, based on characteristics of the student utilizing the learning object, thereby providing to each student a learning object accommodating the student's characteristic and record of progress.

The differential teaching/learning may include differential support within a learning object or a learning activity. For example, system 100 may provide a first type or level of support (e.g., having more details) to a first type of students (e.g., students identified to have a difficulty in a certain topic), and may provide a second, different, type or level of support (e.g., having less details) to a second type of students (e.g., students identified to be proficient in a certain topic).

The differential teaching/learning may include differential, automated modification of educational content, within a learning object or a learning activity. For example, a learning object may present additional explanations to a student identified to have a difficulty in a particular topic, and may present less information (or may skip some explanations) with regard to a student identified to be proficient in that topic.

The differential teaching/learning may include differential learning activities, such that different students engage in different learning activities substantially in parallel, or in an overlapping time period. This may be achieved, for example, by efficiently utilizing a repository storing learning objects associated with various levels of difficulty, various time frames, various levels of complexity, or the like.

The differential teaching/learning may include differential assistance and differential fulfillment of special needs of students. For example, an audio narration or an audio/video tutorial may accompany a learning object when used by a first student who has difficulty in the relevant subject matter, whereas such narration or tutorial may be skipped or omitted when the learning object is used by a second student who is proficient in that subject matter.

The educational content module 102 allows adaptive teaching/learning, for example, such that system 100 modifies or re-constructs content presented to a student (or a group of students) based on identified weaknesses of that student or group, based on identified strengths of that student or group, based on a determined knowledge map of that student or group, or based on other criteria.

A software platform 103 allows planning, management and integration of teaching, learning and assessment and the related activities and content. A support module 104 (e.g., in-school support or remote support) provides support to one or more modules of system 100, for example, operational support, pedagogical support, and technical support. School management systems 105 include interface(s) between system 100 or components thereof and other school systems, for example, an attendance system, a grading system, a financial system, or the like. A communities module 106 allows publishing (e.g., bulletin boards, "blogs", web-casting, "pod-casting", or the like) and communications (e.g., electronic mails, instant messaging, chat, forums, or the like) among teachers, students, parents, administrative personnel, business entities associated with system 100 (e.g., providers or vendors of educational content), volunteers, or the like. A logistics module 107 includes school infrastructure utilized for implementing one or more components or functions of system 100, for example, hardware, software, maintenance services, or the like.

In some embodiments, optionally, system 100 may be implemented using a web 108, such that one or more (or substantially all) functions of teaching/learning are available through a web (e.g., the World Wide Web, the Internet, a global communication network, a Local Area Network (LAN), a Wide Area Network (WAN), an intranet, an extranet, or the like), optionally utilizing web services or web components (e.g., web browsers, plug-ins, web applets, or the like). In other embodiments, optionally, system 100 may be implemented as a non-web solution, for example, as a local or non-open system, as a stand-alone executable system, or the like.

Figure 2:
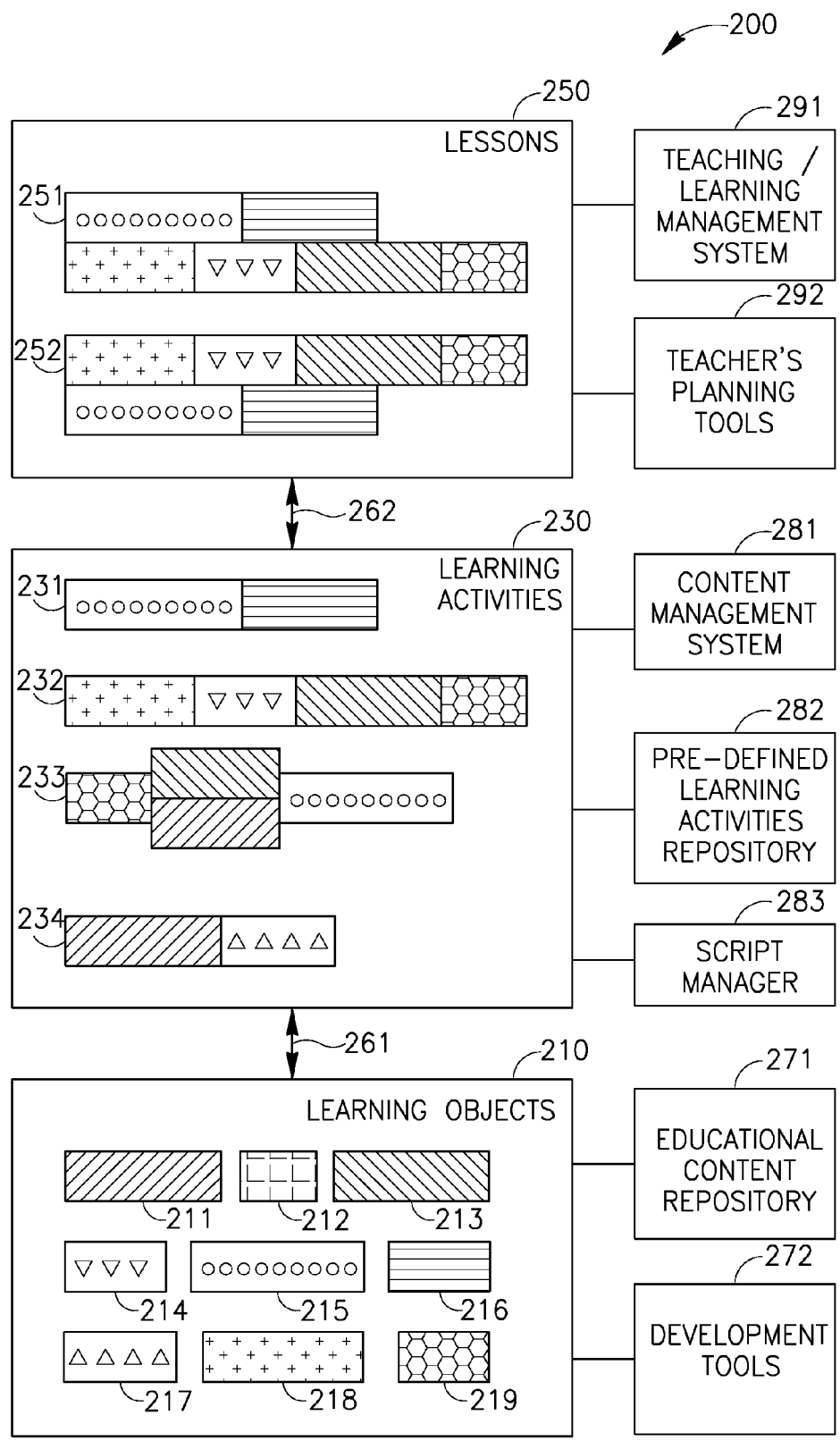
FIG. 2 is a schematic block diagram illustration of a teaching/learning data structure in accordance with a demonstrative embodiment of the invention.

FIG. 2 schematically illustrates a block diagram of a teaching/learning data structure 200 in accordance with some demonstrative embodiments of the invention. Data structure 200 includes multiple layers, for example, learning objects 210, learning activities 230, and lessons 250. In some embodiments, the teaching/learning data structure 200 may include other or additional levels of hierarchy; for example, a study unit may include a collection of multiple lessons that cover a particular topic, issue or subject, e.g., as part of a yearly subject-matter learning/teaching plan. Other or additional levels of hierarchy may be used.

Learning objects 210 include, for example, multiple learning objects 211-219. A learning object includes, for example, a stand-alone application, applet, program, or assignment addressed to a student (or to a group of students), intended for utilization by a student. A learning object may be, for example, subject to viewing, listening, typing, drawing, or otherwise interacting (e.g., passively or actively) by a student utilizing a computer. For example, learning object 211 is an Active-X interactive animated story, in which a student is required to select graphical items using a pointing device; learning object 212 is an audio/video presentation or lecture (e.g., an AVI or MPG or WMV or MOV video file) which is intended for passive viewing/hearing by the student; learning object 213 is a Flash application in which the student is required to move (e.g., drag and drop) graphical object and/or textual objects; learning object 214 is a Java applet in which the student is required to type text in response to questions posed; learning object 215 is a JavaScript program in which the student selects answers in a multiple-choice quiz; learning object 216 is a Dynamic HTML page in which the student is required to read a text, optionally navigating forward and backward among pages; learning object 217 is a Shockwave application in which the student is required to draw geometric shapes in response to instructions; or the like. Learning objects may include various other content items, for example, interactive text or "live text", writing tools, discussion tools, assignments, tasks, quizzes, games, drills and exercises, problems for solving, questions, instruction pages, lectures, animations, audio/video content, graphical content, textual content, vocabularies, or the like.

Learning objects 210 may be associated with various time-lengths, levels of difficulty, curriculum portions or subjects, or other properties. For example, learning object 211 requires approximately twelve minutes for completion, whereas learning object 212 requires approximately seven minutes for completion; learning object 213 is a difficult learning object, whereas learning object 214 is an easy learning object; learning object 215 is a math learning object, whereas learning object 216 is a literature learning object.

Learning objects 210 are stored in an educational content repository 271. Learning objects 271 are authored, created, developed and/or generated using development tools 272, for example, using templates, editors, authoring tools, a step-by-step "wizard" generation process, or the like. The learning objects 210 are created by one or more of: teachers, teaching professionals, school personnel, pedagogic experts, academy members, principals, consultants, researchers, or other professionals. The learning objects 210 may be created or modified, for example, based on input received from focus groups, experts, simulators, quality assurance teams, or other suitable sources. The learning objects 210 may be imported from external sources, e.g., utilizing a conversion or re-formatting tools. In some embodiments, modification of a learning object by a user may result in a duplication of the learning object, such that both the original un-modified version and the new modified version of the learning object are stored; the original version and the new version of the learning object may be used substantially independently.

Learning activities 230 include, for example, multiple learning activities 231-234. For example, learning activity 231 includes learning object 215, followed by learning object 216. Learning activity 232 includes learning object 218, followed by learning objects 214, 213 and 219. Learning activity 233 includes learning object 233, followed by either learning object 213 or learning object 211, followed by learning object 215. Learning activity 234 includes learning object 211, followed by learning object 217.

A learning activity includes, for example, one or more learning objects in the same (or similar) subject matter (e.g., math, literature, physics, or the like). Learning activities 230 may be associated with various time-lengths, levels of difficulty, curriculum portions or subjects, or other properties. For example, learning activity 231 requires approximately eighteen minutes for completion, whereas learning activity 232 requires approximately thirty minutes for completion; learning activity 232 is a difficult learning activity, whereas learning activity 234 is an easy learning activity; learning activity 231 is a math learning activity, whereas learning activity 232 is a literature learning activity. A learning object may be used or placed at different locations (e.g., time locations) in different learning activities. For example, learning object 215 is the first learning object in learning activity 231, whereas learning object 215 is the last learning object in learning activity 233.

Learning activities 230 are generated and managed by a content management system 281, which may create and/or store learning activities 230. For example, browser interface allows a teacher to browse through learning objects 210 stored in the educational content repository (e.g., sorted or filtered by subject, difficulty level, time length, or other properties), and to select and construct a learning activity by combining one or more learning objects (e.g., using a drag-and-drop interface, a time-line, or other tools). In some embodiments, learning activities 230 can be arranged and/or combined in various teaching-learning-assessment scenarios or layouts, for example, using different methods of organization or modeling methods. Scenarios may be arranged, for example, manually in a pre-defined order; or may be generated automatically utilizing a script to define sequencing, branched sequencing, conditioned sequencing, or the like. Additionally or alternatively, pre-defined learning activities are stored in a pre-defined learning activities repository 282, and are available for utilization by teachers. In some embodiments, an edited scenario or layout, or a teacher generated scenario or layout, are stored in the teacher's personal "cabinet" or "private folder" (e.g., as described herein) and can by recalled for re-use or for modification. In some embodiments, other or additional mechanisms or components may be used, in addition to or instead of the learning activities repository 282. The teaching/learning system provides tools for editing of pre-defined scenarios (e.g., stored in the learning activities repository 282), and/or for creation of new scenarios by the teacher. For example, a script manager 283 may be used to create, modify and/or store scripts which define the components of the learning activity, their order or sequence, an associated time-line, and associated properties (e.g., requirements, conditions, or the like). Optionally, scripts may include rules or scripting commands that allow dynamic modification of the learning activity based on various conditions or contexts, for example, based on past performance of the particular student that uses the learning activity, based on preferences of the particular student that uses the learning activity, based on the phase of the learning process, or the like. Optionally, the script may be part of the teaching/learning plan. Once activated or executed, the script calls the appropriate learning object(s) from the educational content repository 271, and may optionally assign them to students, e.g., differentially or adaptively. The script may be implemented, for example, using Educational Modeling Language (EML), using scripting methods and commands in accordance with IMS Learning Design (LD) specifications and standards, or the like. In some embodiments, the script manager 283 may include an EML editor, thereby integrating EML editing functions into the teaching/learning system. In some embodiments, the teaching/learning system and/or the script manager 283 utilize a "modeling language" and/or "scripting language" that use pedagogic terms, e.g., describing pedagogic events and pedagogic activities that teachers are familiar with. The script may further include specifications as to what type of data should be stored or reported to the teacher substantially in real time, for example, with regard to students interactions or responses to a learning object. For example, the script may indicate to the teaching/learning system to automatically perform one or more of these operations: to store all the results and/or answers provided by students to all the questions, or to a selected group of questions; to store all the choices made by the student, or only the student's last choice; to report in real time to the teacher if pre-defined conditions are true, e.g., if at least 50 percent of the answers of a student are wrong; or the like.

Lessons 250 include, for example, multiple lessons 251 and 252. For example, lesson 251 includes learning activity 231, followed by learning activity 232. Lesson 252 includes learning activity 234, followed by learning activity 231. A lesson includes one or more learning activities, optionally having the same (or similar) subject matter.

For example, learning objects 211 and 217 are in the subject matter of multiplication, whereas learning objects 215 and 216 are in the subject matter of division. Accordingly, learning activity 234 (which includes learning objects 211 and 217) is in the subject matter of multiplication, whereas learning activity 231 (which includes learning objects 215 and 216) is in the subject matter of division. Furthermore, lesson 252 (which includes learning activities 234 and 231) is in the subject matter of math.

Lessons 250 may be associated with various time-lengths, levels of difficulty, curriculum portions or subjects, or other properties. For example, lesson 251 requires approximately forty minutes for completion, whereas lesson 252 requires approximately thirty five for completion; lesson 251 is a difficult lesson, whereas lesson 252 is an easy lesson. A learning activity may be used or placed at different locations (e.g., time locations) in different lessons. For example, learning activity 215 is the first learning object in learning activity 231, whereas learning object 215 is the last learning object in learning activity 233.

Lessons 250 are generated and managed by a teaching/learning management system 291, which may create and/or store lessons 250. For example, browser interface allows a teacher to browse through learning activities 230 (e.g., sorted or filtered by subject, difficulty level, time length, or other properties), and to select and construct a lesson by combining one or more learning activities (e.g., using a drag-and-drop interface, a time-line, or other tools). Additionally or alternatively, pre-defined lessons may be available for utilization by teachers.

As indicated by an arrow 261, learning objects 210 are used for creation and modification of learning activities 230. As indicated by an arrow 262, learning activities are used for creation and modification of lessons 250.

In some embodiments, a large number of learning objects 210 and/or learning activities 230 are available for utilization by teachers. For example, in one embodiment, learning objects 210 may include at least 300 singular learning objects 210 per subject per grade (e.g., for second grade, for third grade, or the like); at least 500 questions or exercises per subject per grade; at least 150 drilling games per subject per grade; at least 250 "live text" activities (per subject per grade) in which students interact with interactive text items; or the like.

Some learning objects 210 are originally created or generated on a singular basis, such that a developer creates a new, unique learning object 210. Other learning objects 210 are generated using templates or generation tools or "wizards". Still other learning objects 210 are generated by modifying a previously-generated learning object 210, e.g., by replacing text items, by replacing or moving graphical items, or the like.

In some embodiments, one or more learning objects 210 may be used to compose or construct a learning activity; one or more learning activities 230 may be used to compose or construct a lesson 250; one or more lessons may be part of a study unit or an educational topic or subject matter; and one or more study units may be part of an educational discipline, e.g., associated with a work plan.

Figure 3:
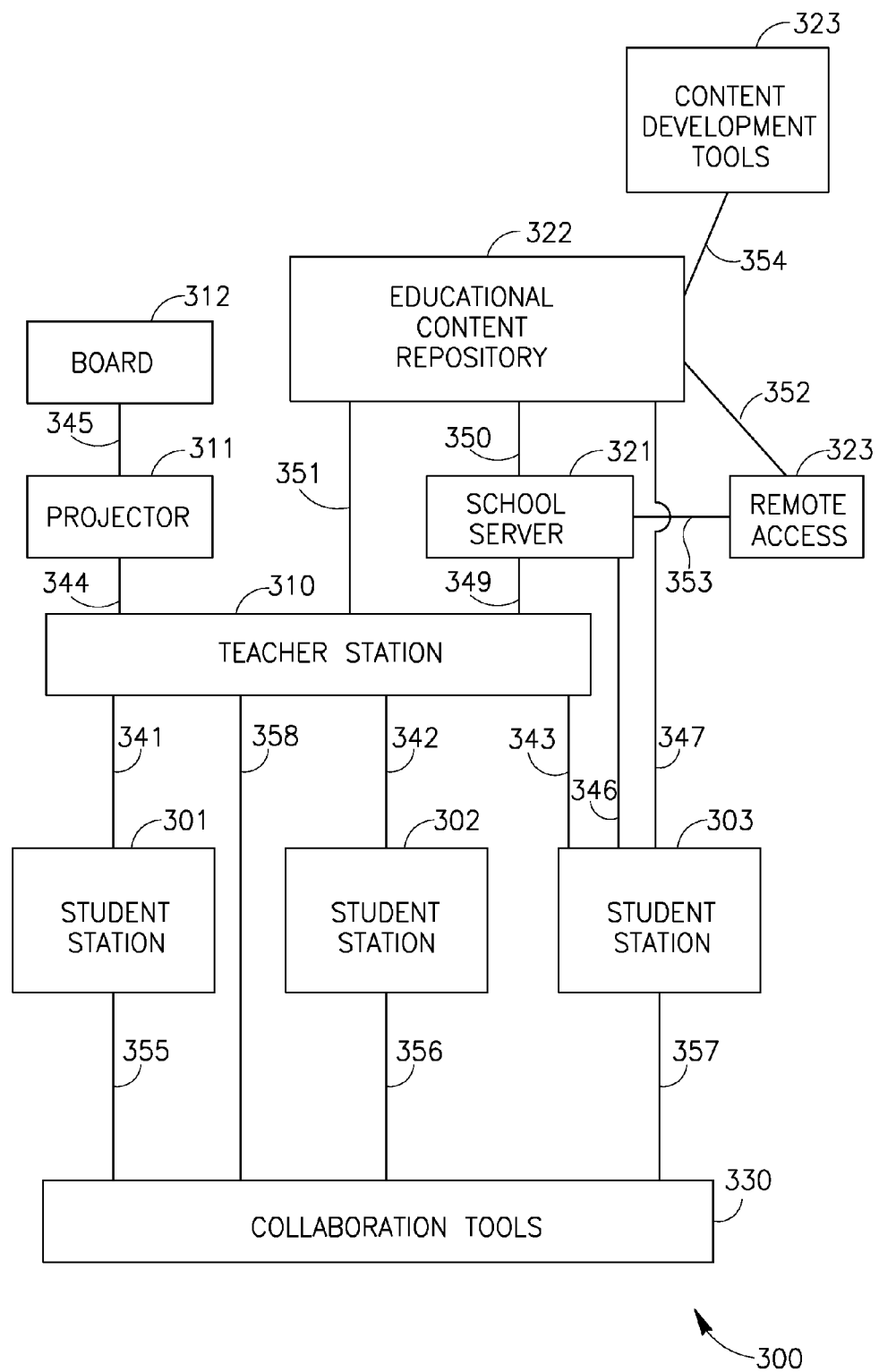
FIG. 3 is a schematic block diagram illustration of a teaching/learning system in accordance with another demonstrative embodiment of the invention.

FIG. 3 schematically illustrates a block diagram of a teaching/learning system 300 in accordance with some demonstrative embodiments of the invention. Components of system 300 are interconnected using one or more wired and/or wireless links 341-358, e.g., utilizing a wired LAN, a wireless LAN, the Internet, or other communication systems.

System 300 includes a teacher station 310, and multiple student stations 301-303. The teacher station 310 and/or the student stations 301-303 may include, for example, a desktop computer, a Personal Computer (PC), a laptop computer, a mobile computer, a notebook computer, a tablet computer, a portable computer, a dedicated computing device, a general purpose computing device, or the like.

The teacher station 310 and/or the student stations 301-303 may include, for example: a processor (e.g., a Central Processing Unit (CPU), a Digital Signal Processor (DSP), a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller); an input unit (e.g., a keyboard, a keypad, a mouse, a touch-pad, a stylus, a microphone, or other suitable pointing device or input device); an output unit (e.g., a Cathode Ray Tube (CRT) monitor or display unit, a Liquid Crystal Display (LCD) monitor or display unit, a plasma monitor or display unit, a screen, a monitor, one or more speakers, or other suitable display unit or output device); a memory unit (e.g., a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units); a storage unit (e.g., a hard disk drive, a floppy disk drive, a Compact Disk (CD) drive, a CD-ROM drive, a Digital Versatile Disk (DVD) drive, or other suitable removable or non-removable storage units); a communication unit (e.g., a wired or wireless Network Interface Card (NIC), a wired or wireless modem, a wired or wireless receiver and/or transmitter, a wired or wireless transmitter-receiver or transceiver, a Radio Frequency (RF) communication unit or transceiver, or other units able to transmit and/or receive signals, blocks, frames, transmission streams, packets, messages and/or data; the communication unit may optionally include, or may optionally be associated with, one or more antennas, e.g., a dipole antenna, a monopole antenna, an omni-directional antenna, an end fed antenna, a circularly polarized antenna, a micro-strip antenna, a diversity antenna, or the like); an Operating System (OS); and other suitable hardware components and/or software components.

The teacher station 310, optionally utilizing the projector 311 and the board 312, are used by the teacher to present educational subject matters and topics, to present lectures, to convey educational information to students, to perform lesson planning, to perform in-class lesson execution and management, to perform lesson follow-up activities or processes (e.g., review students performance, review homework, review quizzes, or the like), to assign learning activities to one or more students (e.g., on a personal basis and/or on a group basis), to conduct discussions, to assign homework, to obtain the personal attention of a student or a group of student, to perform real-time in-class teaching, to perform real-time in-class management of the learning activities performed by students or groups of students, to selectively allocate or re-allocate learning activities or learning objects to students or groups of students, to receive automated feedback or manual feedback from student stations 301-303 (e.g., upon completion of a learning activity or a learning object; upon reaching a particular grade or success rate; upon failing to reach a particular grade or success rate; upon spending a threshold amount of attempts or minutes with a particular exercise, or the like), or to perform other teaching and class management operations.

In some embodiments, the teacher station 310 is used to perform operations of teaching tools, for example, lesson planning, real-time class management, presentation of educational content, allocation of differential assignment of content to students (e.g., to individual students or to groups of students), differential assignment of learning activities or learning objects to students (e.g., to individual students or to groups of students), adaptive assignment of content or learning activities or learning objects to students (e.g., based on their past performance in one or more learning activities, past successes, past failures, identified strengths, identified weaknesses), conducting of class discussions, monitoring and assessment of individual students or one or more groups of students, logging and/or reporting of operation performed by students and/or achievements of students, operating of a Learning Management System (LMS), managing of multiple learning processes performed (e.g., substantially in parallel or substantially simultaneously) by student stations 301-303, or the like.

The teacher station 310 may be used in substantially real time (namely, during class hours and while the teacher and the students are in the classroom), as well as before and after class hours. For example, real time utilization of the teacher station includes: presenting topics and subjects; assigning to students various activities and assignments; conducting discussions; concluding the lesson; and assigning homework. Before and after class hours utilization include, for example: selecting and allocating educational content (e.g., learning objects or learning activities) for a lesson plan; guiding students; assisting students; responding to students questions; assessing work and/or homework of students; and reporting.

The student stations 301-303 are used by students (e.g., individually such that each student operates a station, or that two students operate a station, or the like) to perform personal learning activities, to conduct personal assignments, to participate in learning activities in-class, to participate in assessment activities, to access rich digital content in various educational subject matters in accordance with the lesson plan, to collaborate in group assignments, to participate in discussions, to perform exercises, to participate in a learning community, to communicate with the teacher station 310 or with other student stations 301-303, to receive or perform personalized learning activities, or the like. In some embodiments, the student stations 301-303 include software components which may be accessed remotely by the student, for example, to allow the student to do homework from his home computer using remote access, to allow the student to perform learning activities or learning objects from his home computer or from a library computer using remote access, or the like.

The teacher station 310 is connected to, or includes, a projector 311 able to project or otherwise display information on a board 312, e.g., a blackboard, a white board, a curtain, a smart-board, or the like. The teacher station 310 and/or the projector 311 are used by the teacher, to selectively project or otherwise display content on the board 312. For example, at first, a first content is presented on the board 312, e.g., while the teacher talks to the students to explain an educational subject matter. Then, the teacher may utilize the teacher station 310 and/or the projector 311 to stop projecting the first content, while the students use their student stations 301-303 to perform learning activities. Additionally, the teacher may utilize the teacher station 310 and/or the projector 311 to selectively interrupt the utilization of student stations 301-303 by students. For example, the teacher may instruct the teacher station 310 to send an instruction to each one of student stations 301-303, to stop or pause the learning activity and to display a message such as "Please look at the Board right now" on the student stations 301-303. Other suitable operations and control schemes may be used to allow the teacher station 310 to selectively command the operation of projector 311 and/or board 312.

The teacher station 310, as well as the student stations 301-303, may be connected with a school server 321 able to provide or serve digital content, for example, learning objects, learning activities and/or lessons. Additionally or alternatively, the station 310, as well as the student stations 301-303, may be connected to an educational content repository 322, either directly (e.g., if the educational content repository 322 is part of the school server 350 or associated therewith) or indirectly (e.g., if the educational content repository 322 is implemented using a remote server, using Internet resources, or the like). Content development tools 323 are used, locally or remotely, to generate original or new education content, or to modify or edit or update content items, for example, utilizing templates, editors, step-by-step "wizard" generators, packaging tools, sequencing tools, "wrapping" tools, authoring tools, or the like.

In some embodiments, a remote access sub-system 323 is used, to allow teachers and/or students to utilize remote computing devices (e.g., at home, at a library, or the like) in conjunction with the school server 321 and/or the educational content repository 322.

In some embodiments, the teacher station 310 and the student stations 301-303 may be implemented using a common interface or an integrated platform (e.g., an "educational workstation"), such that a log-in screen request the user to select or otherwise input his role (e.g., teacher or student) and/or identity (e.g., name or unique identifier).

In some embodiments, system 300 performs ongoing assessment of students performance based on their operation of student stations 301-303. For example, instead of or in addition to conventional event-based quizzes or examinations, system 300 monitors the successes and the failures of individual students in individual learning objects or learning activities. For example, the teacher utilizes the teacher station 310 to allocate or distribute various learning activities or learning objects to various students or groups of students. The teacher utilizes the teacher station 310 to allocate a first learning object and a second learning object to a first group of students, including Student A who utilizes student station 301; and the teacher utilizes the teacher station 310 to allocate the first learning object and a third learning object to a second group of students, including Student B who utilizes student station 302.

System 300 monitors, logs and reports the performance of student based on their operation of student stations 301-303. For example, system 300 may determine and report that Student A successfully completed the first learning object, whereas Student B failed to complete the second learning object. System 300 may determine and report that Student A successfully completed the first learning object within a pre-defined time period associated with the first learning object, whereas Student B completed the second learning object within a time period longer than the required time period. System 300 may determine and report that Student A successfully completed or answered 87 percent of tasks or questions in a learning object or a learning activity, whereas Student B successfully completed or answered 45 percent of tasks or questions in a learning object or a learning activity. System 300 may determine and report that Student A appears to be "stuck" or lingering on a particular exercise or learning object, or that Student B did not operate the keyboard or mouse for a particular time period (e.g., two minutes). System 300 may determine and report that at least 80 percent of the students in the first group successfully completed at least 75 percent of their allocated learning activity, or that at least 50 percent of the students in the second group failed to correctly answer at least 30 percent of questions allocated to them. Other types of determinations and reports may be used.

System 300 generates reports at various times and using various methods, for example, based on the choice of the teacher utilizing the teacher station 310. For example, the teacher station 310 may generate one or more types of reports, e.g., individual student reports, group reports, class reports, an alert-type message that alerts the teacher to a particular event (e.g., failure or success of a student or a group of students), or the like. Reports may be generated, for example, at the end of a lesson; at particular times (e.g., at a certain hour); at pre-defined time intervals (e.g., every ten minutes, every school-day, every week); upon demand, request or command of a teacher utilizing the teacher station; upon a triggering event or when one or more conditions are met, e.g., upon completion of a certain learning activity by a student or group of students, a student failing a learning activity, a pre-defined percentage of students failing a learning activity, a student succeeding in a learning activity, a pre-defined percentage of students succeeding in a learning activity, or the like.

In some embodiments, reports or alerts may be generated by system 300 substantially in real-time, during the lesson process in class. For example, system 300 may alert the teacher, using a graphical or textual or audible notification through the teacher station 310, that one or more students or groups of students do not progress (at all, or according to pre-defined mile-stones) in the learning activity or learning object assigned to them. Upon receiving the real-time alert, the teacher may utilize the teacher station 310 to further retrieve details of the actual progress, for example, by obtaining detailed information on the progress of the relevant student(s) or group(s). For example, the teacher may use the teacher station 310 to view a report detailing progress status of students, e.g., whether the student started or not yet started a learning object or a learning activity; the percentage of students in the class or in one or more groups that completed as assignment; the progress of students in a learning object or a learning activity (e.g., the student performed 40 percent of the learning activity; the student is "stuck" for more than sixty seconds in front of the third question or the fourth screen of a learning object; the student completed the assigned learning object, and started to perform an optional learning object), or the like.

In some embodiments, teaching, learning and/or assessment activities are monitored, recorded and stored in a format that allows subsequent searching, querying and retrieval. Data mining processes in combination with reporting tools may perform research and may generate reports on various educational, pedagogic and administrative entities, for example: on students (single student, a group of students, all students in a class, a grade, a school, or the like); teachers (a single teacher, a group of teachers that teach the same grade and/or in the same school and/or the same discipline); learning activities and related content; and for conducting research and formative assessment for improvement of teaching methodologies, flow or sequence of learning activities, or the like.

In some embodiments, data mining processes and analysis processes may be performed, for example, on knowledge maps of students, on the tracked and logged operations that students perform on student stations, on the tracked and logged operations that teachers perform on teacher stations, or the like. The data mining and analysis may determine conclusions with regard to the performance, the achievements, the strengths, the weaknesses, the behavior and/or other properties of one or more students, teachers, classes, groups, schools, school districts, national education systems, multi-national or international education systems, or the like. In some embodiments, analysis results may be used to compare among teaching and/or learning at international level, national level, district level, school level, grade level, class level, group level, student level, or the like.

In some embodiments, the generated repots are used as alternative or additional assessment of students performance, students knowledge, students classroom behavior (e.g., a student is responsive to instructions, a student is non-responsive to instructions), or other student parameters. In some embodiments, for some assessment events, information items (e.g., "rubrics") may be created and/or displayed, to provide assessment-related information to the teacher or to the teaching/learning system; the assessment information item may be visible to, or accessible by, the teacher and/or the student (e.g., subject to teacher's authorization). The assessment information item may include, for example, a built-in or integrated information item inside an assessment event that provides instructions to the teacher (or the teaching/learning system) on how to evaluate an assessment event which was executed by the student. Other formats and/or functions of assessment information items may be used.

Optionally, system 300 generates and/or initiates, automatically or upon demand of the teacher utilizing the teacher station 310 (or, for example, automatically and subject to the approval of the teacher utilizing the teacher station 310), one or more correction cycles, "drilling" cycles, additional learning objects, modified learning objects, or the like. For example, system 300 determines that Student A solved correctly 72 percent of the math questions presented to him; that substantially all (or most of) the math questions that Student A solved successfully are in the field of multiplication; and that substantially all (or most of) the math questions that Student A failed to solved are in the field of division. Accordingly, system 300 may report to the teacher station 310 that Student A comprehends multiplication, and that Student A does not comprehend (at all, or to an estimated degree) division. Additionally, system 300 adaptively and selectively presents content (or refrain from presenting content) to accommodate the identified strengths and weaknesses of Student A. For example, system 300 may selectively refrain from presenting to Student A additional content (e.g., explanations and/or exercises) in the field of multiplication, which Student A comprehends. System 300 may selectively present to Student A additional content (e.g., explanations and/or exercises) in the field of division, which Student B does not yet comprehend. The additional presentation (or the refraining from additional presentation) may be performed by system 300 automatically, or subject to an approval of the teacher utilizing the teacher station 310 in response to an alert message or a suggestion message presented on the teacher station 310.

In some embodiments, multiple types of users may utilize system 300 or its components, in-class and/or remotely. Such types of users include, for example, teachers in class, students in class, teachers at home or remotely, students at home or remotely, parents, community members, supervisors, managers, principals, authorities (e.g., Board of Education), school system administrator, school support and help-desk personnel, system manager(s), techno-pedagogic experts, content development experts, or the like.

In some embodiments, system 300 may be used as a collaborative Learning Management System (LMS), in which teachers and students utilize a common system. For example, system 300 may include collaboration tools 330 to allow real-time in-class collaboration, e.g., allowing students to send or submit their accomplishments or their work results (or portions thereof) to a common space, from which the teacher (utilizing the teacher station 310) selects one or more of the submission items for projection, for comparison, or the like. The collaboration tools 330 may optionally be implemented, for example, using a collaboration environment or collaboration area or collaboration system. The collaboration tools 330 may optionally include a teacher-moderated common space, to which students (utilizing the student stations 301-303) post their work, text, graphics, or other information, thereby creating a common collaborative "blog" or publishing a Web news bulletin or other form of presentation of students products. The collaboration tools 330 may further provide a collaborative workspace, where students may work together on a common assignment, optionally displaying in real-time peers that are available online for chat or instant messaging (e.g., represented using real-life names, user-names, avatars, graphical items, textual items, photographs, links, or the like).

In some embodiments, dynamic personalization and/or differentiation may be used by system 300, for example, per teacher, per student, per group of students, per class, per grade, or the like. System 300 and/or its educational content may be open to third-party content, may comply with various standards (e.g., World Wide Web standards, education standards, or the like). System 300 may be a tagged-content Learning Content Management System (LCMS), utilizing Semantic Web mechanisms, meta-data, and/or democratic tagging of educational content by users (e.g., teachers, students, experts, parents, or the like).

System 300 may utilize or may include pluggable architecture, for example, a plug-in or converter or importer mechanism, e.g., to allow importing of external materials into the system as learning objects or learning activities or lessons, to allow rapid adaptation of new types of learning objects (e.g., original or third-party), to provide a blueprint or a template for third-party content, or the like.

System 300 may be implemented or adapted to meet specific requirements of an education system or a school. For example, in some embodiments, system 300 may set a maximum number of activities per sequence or per lesson; may set a maximum number of parallel activities that the teacher may allocate to students (e.g., to avoid a situation in which the teacher "loses control" of what each student in the class is doing); may allow flexible navigation within and/or between learning activities and/or learning objects; may include clear, legible and non-artistic interface components, for easier or faster comprehension by users; may allow collaborative discussions among students (or student stations), and/or among one or more students (or student stations) and the teacher (or teacher station); and may train and prepare teacher and students for using the system 300 and for maximizing the benefits from its educational content and tools.

In some embodiments, a student station allows the student to access a "user cabinet" or "personal folder" which includes personal information and content associated with that particular student. For example, the user cabinet may store and/or present to the student: educational content that the student already viewed or practiced; projects that the student already completed and/or submitted; drafts and work-in-progress that the student prepares, prior to their completion and/or submission; personal records of the student, for example, his grades and his attendance records; copies of tests or assignments that the student already took, optionally reconstructing the test or allowing the test to be re-solved by the student, or optionally showing the correct answers to the test questions; lessons that the student already viewed; tutorials that the student already viewed, or tutorials related to topics that the student already practiced; forward-looking tutorials, lectures and explanations related to topics that the student did not yet learn and/or did not yet practice, but that the student is required to learn by himself or out of class; assignments or homework assignments pending for completion; assignments or homework assignments completed, submitted, graded, and/or still in draft status; a notepad with private or personal notes that the student may write for his retrieval; indications of "bookmarks" or "favorites" or other pointers to learning objects or learning activities or educational content which the student selected to mark as favorite or for rapid access; or the like.

In some embodiments, a teacher station allows the teacher (and optionally one or more students, via the student stations) to access a "teacher cabinet" or "personal folder" (or a subset thereof, or a presentation or a display of portions thereof), which may, for example, store and/or present to the teacher (and/or to students) the "plans" or "activity layout" that the teacher planned for his class; changes or additions that the teacher introduced to the original plan; presentation of the actually executed lesson process, optionally including comments that the teacher entered; or the like.

Figure 4:
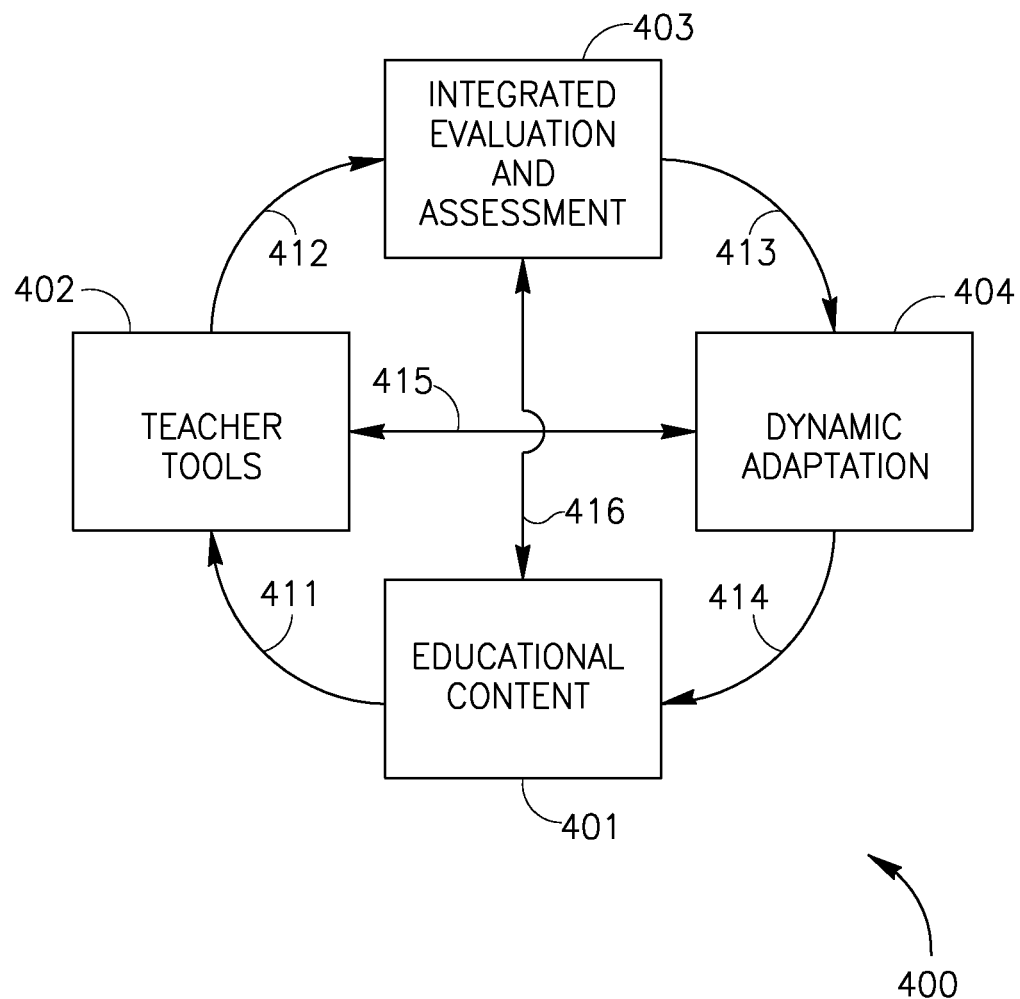
FIG. 4 is a schematic block diagram illustration of a teaching/learning system in accordance with yet another demonstrative embodiment of the invention.

FIG. 4 schematically illustrates a teaching/learning system 400 in accordance with some demonstrative embodiments of the invention. System 400 includes multiple modules or components, for example, educational content 401, teacher tools 402, an integrated evaluation and assessment module 403, and a dynamic adaptation module 404. As indicated by arrows 411-416, components and/or modules of system 400 may be operationally associated or interconnected, and one component may affect the operation or the properties of other components.

The educational content 401 includes, for example, comprehensive educational content in accordance with full curriculum or portions thereof, in digital format. The educational content 401 includes originally-generated or pre-designed learning materials (e.g., lessons, exercises, assignments, or the like), as well as learning materials created by modifying prior or other learning materials (e.g., using editors, templates, or the like).

The teacher tools 402 include, for example, tools for real-time in-class management of teaching and learning. This includes, for example, differential and/or selective allocation of learning objects and/or learning activities to students or groups of students, monitoring the in-class learning progress of students or groups of students, approving or rejecting automatic suggestions by the system 400 (e.g., a suggestion to serve to Student B a tailored "correction cycle" or repeat exercise in a certain subject-matter), or the like.

The integrated evaluation and assessment module 403 is able to perform integrated evaluation and assessment of substantially all learning activities, e.g., by monitoring, logging and dynamically reporting the performance of individual students through their learning. The integrated evaluation and assessment module 403 is capable of dynamic knowledge mapping, namely, generating and/or updating a knowledge map of a student, a group of student, a class, a grade, or the like. For example, the integrated evaluation and assessment module 403 may generate the knowledge map associated with Student B, indicating that in the subject matter of mathematics, Student B is proficient in addition and subtraction, relatively strong in multiplication, but relatively weak in division. The knowledge map may be generated and/or updated, for example, upon demand (e.g., by the teacher, by the school principal, or the like), at the end of a lesson, at the end of the week, at pre-defined time intervals, upon completion of certain tasks (e.g., learning objects or learning activities), or the like.

The integrated evaluation and assessment module 403 may substantially continuously monitor the learning activities of students utilizing the student stations, and may generate (e.g., in substantially real time) alert messages and notifications, e.g., transferred to the teacher station. For example, the integrated evaluation and assessment module 403 may be part of the student station and/or the teacher station and/or the school server, and may determine that the user of a particular student station answered incorrectly a pre-defined cumulative number of questions (e.g., six incorrect answers, cumulatively in a learning object); that the user of a particular student station answered incorrectly a pre-defined consecutive number of questions (e.g., three incorrect answers, consecutively, in a learning object); that the user of a particular student station answered incorrectly a pre-defined percentage of tasks or questions in a learning activity or in a pre-defined time period; that the user of a particular student station did not operate its student station (e.g., did not move the mouse, did not click the mouse, and/or did not press a key on the keyboard) for at least a pre-defined time period (e.g., two minutes); or the like.

Upon such determination, an alert message may be transferred to the teacher station (e.g., from the student station, from the school server, or from the integrated evaluation and assessment module 403). Optionally, additional notification may be presented to the student on the relevant student station, e.g., alerting the attention of the student to the determined triggering event. Optionally, additional help or support information (e.g., educational content, explanations, narrations, or the like) may be presented to the student on the relevant student station, either automatically or in response to a pre-approval of the teacher using the teacher station.

The integrated evaluation and assessment module 403 may be implemented within interactive learning activities and learning objects, allowing ongoing monitoring of student progress. The integrated evaluation and assessment module 403 may further allow LMS integration, and may be implemented using management tools for managing tests, assignments, and question bank utilization. Additionally, in some embodiments in which the teaching/learning system is implemented using a Web environment, knowledge mining may be performed, for example, by tracking and analysis of web-based activity of students (e.g., statistical analysis, page view analysis, time periods spent in viewing pages analysis, or the like).

In some embodiments, the integrated evaluation and assessment module 403 may generate and update the actual knowledge map of the student, thereby generating a dynamic representation of the student's "learning curve". In view of the actual student map, and in view of the desired or required or "target" knowledge map, the teaching/learning system may provide to students adaptive offering of educational content; the adaptive offering may be provided directly to students automatically (e.g., if the teacher allowed it in advance), or may be first sent to the teacher for approval prior to sending the adaptive educational content to the student station.

The integrated evaluation and assessment module 403 may determine and present to the teacher on the teacher station information regarding individual student performance, group-wide performance, and/or class-wide performance. For example, the teacher may use the teacher station to allocate a learning object to a group of ten students, the learning object having three questions included therein. After a pre-defined time period, or upon demand by the teacher, the integrated evaluation and assessment module 403 may calculate and present to the teacher group-wide evaluation, indicating that: the first question in the learning object was correctly answered by 70 percent of the students in the group; the second question in the learning object was correctly answered by 30 percent of the students in the group; and the third question in the learning object was correctly answered by 80 percent of the students in the group. The integrated evaluation and assessment module 403 may be pre-programmed to alert the teacher to identified situations in which less than a pre-defined percentage of students (e.g., less than 50 percent of students) answer correctly a particular question. Therefore, the integrated evaluation and assessment module 403 may selectively alert the teacher that the second question in the learning object was correctly answered by 30 percent of the students in the group.

Alternatively, the teacher station may present to the teacher the success rates of all the three questions, optionally sorted from worse performance to best performance, optionally highlighting or otherwise marking the second question in which the students performance was poor. The integrated evaluation and assessment module 403 may compare and/or analyze two continuously-updated knowledge maps: a required knowledge map derived from the curriculum and updated or refined by the teacher's choice of learning activities or their order of performance; and a student's acquired knowledge map, derived from the record of activities and performance of the particular student. The integrated evaluation and assessment module 403 may dynamically and continuously (or upon demand) determine the "gap" or difference between the student's acquired knowledge map and the required knowledge map, and may generate reports reflecting analysis results of that gap.

In some embodiments, the integrated evaluation and assessment module 403 may generate progress information reports per teacher, per student, per group of students, per class, per grade, per school, or the like. For example, a progress information report for a student may include: assignments completed by the student, including the success rate and specific grades in each assignment; a list of vocabulary learnt by the student, and/or calculated indications of the vocabulary learnt by the student (e.g., an indication that based on the vocabulary-related learning objects that the student performed, the student is proficient with 84 percent of the vocabulary that he is required to learn); a report of math exercises performed, including details of success rates, of math topics in which the student is strong or weak, or the like.

The dynamic adaptation module 404 is able to dynamically adapt or modify properties of the system 400, content of the system 400, and/or operations of the system 400 in order to accommodate various teaching styles of teachers, various learning skills of students, various preferences of teachers, or the like. For example, system 400 may allow dynamic adaptation of the teaching/learning process to the needs of the individual student, e.g., by assigning to the student learning activities and learning objects (or specific content within the learning object) to accommodate the student's particular needs, knowledge map, and/or past performance. Accordingly, system 400 may adapt and/or provide additional assignments which may be tailored to the particular student based on his past performance, optionally including hints or specific assistance with regard to selected portions of the learning object or learning activity (e.g., special hints attached to questions, audio narration added to text, or the like).

Figure 5:
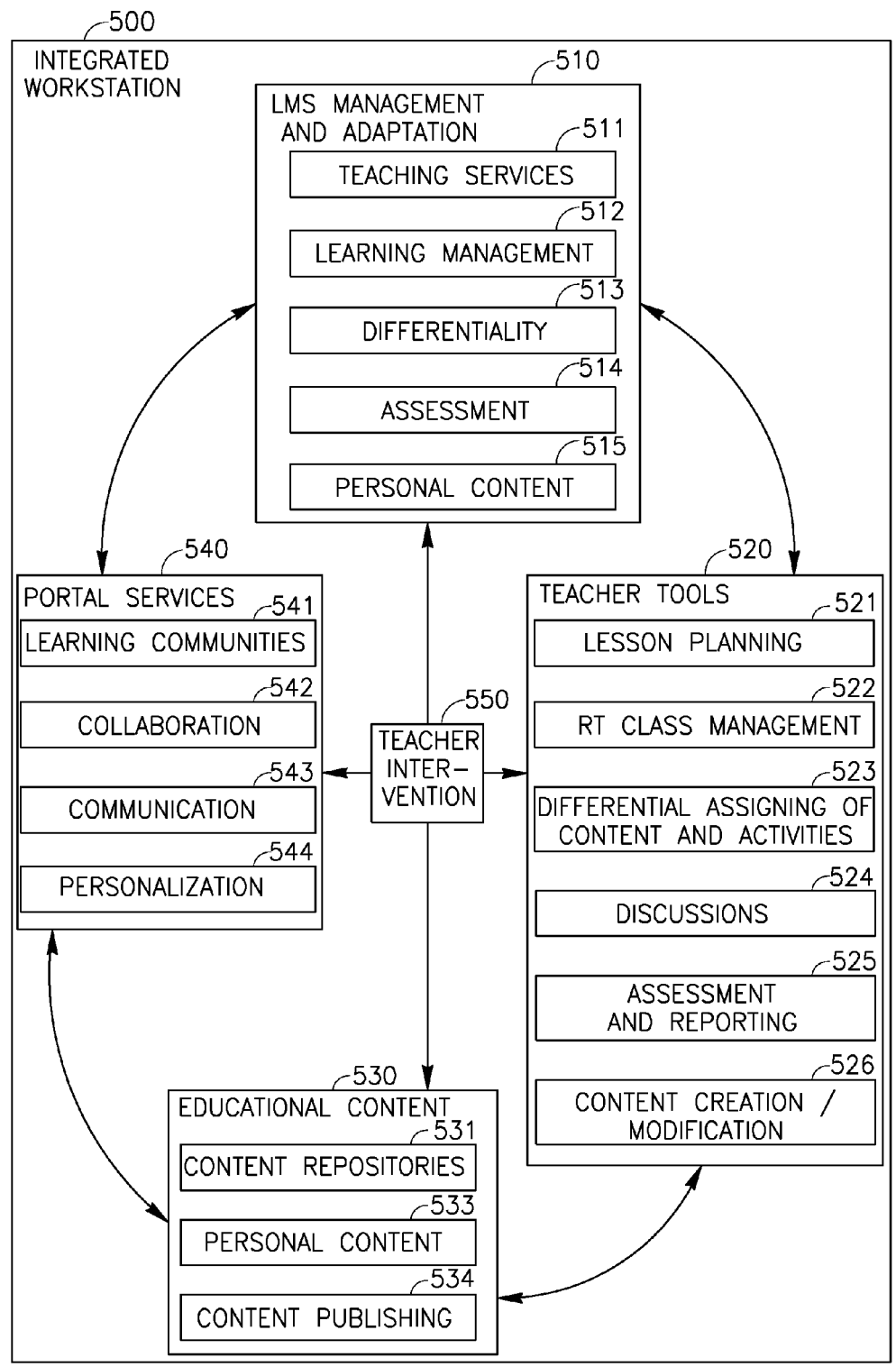
FIG. 5 is a schematic block diagram illustration of an integrated workstation in accordance with a demonstrative embodiment of the invention.

FIG. 5 schematically illustrates an integrated workstation 500 in accordance with some demonstrative embodiments of the invention. Workstation 500 may be, for example, a demonstrative implementation of teacher station 310 of FIG. 3. Workstation 500 includes multiple modules or components, for example, a LMS management and adaptation module 510, teacher tools 520, educational content 530, and a portal services module 540. Components and/or modules of workstation 500 may be operationally associated or interconnected, and one component may affect the operation or the properties of other components.

Additionally, a teacher intervention module 550 may generate and present to the teacher various updates, for example, feedback, progress reports, alert messages, system suggestions, a notification about a student that succeeds or completes a learning activity or learning object, a notification about a student that fails to complete a learning activity or learning object, notifications about dynamically calculated grades of various students, or the like. The teacher intervention module may allow the teacher to respond to the generated information, and/or to respond to input (e.g., requests, help request, questions, completion notifications, comments, or the like) received from students (e.g., through their student stations).

The LMS management and adaptation module 510 includes, for example, a teaching services module 511 to provide the teacher with various teaching services; a learning management module 512 to allow the teacher to manage the learning of individual students and/or groups of students; a differentiality module 513 to allow differential teaching and differential learning, e.g., by students or groups of students; an assessment module 514 to perform ongoing assessment of students, groups of students or the entire class; and a personal content module 515 to generate and/or store content associated with a particular teacher or class.

The teacher tools 520 include, for example, a lesson planning module 521 to allow the teacher to plan and prepare a lesson (e.g., before class begins, using a drag-and-drop interface to select and place learning objects or learning activities onto sequencing bars, or the like).

The teacher tools 520 further include a real time class management module 522 to allow the teacher to see on the teacher station the status and progress of each student, and/or each group of students, during actual learning in class. The real time class management module 522 further allows, for example, selective activation or de-activation of teaching accessories or equipment, and selective activation and/or projection of a learning object (e.g., which may be used as integral part of presenting, explaining and discussing a topic in class). The real time class management module 522 further allows activation or unlocking of a learning object or a learning activity, thereby sending it to one or more students or making it available to them.

The real time class management module 522 further allows the teacher to view, on the teacher station, the status and progress of teaching peripherals (e.g., the projector, Internet connection, communication tools, or the like). The teacher tools 520 further includes a module 523 for differential assigning of content and activities to individual students or to groups of students; a discussions module 524 to allow initiation and execution of discussions, e.g., among students, or among the teacher and one or more students; and an assessment and reporting module 525 to allow the teacher to obtain current assessment of students or groups of students (e.g., including a knowledge map).

The assessment and reporting module 525 may calculate the percentage of exercises of assignments completed successfully by individual students or groups of students, and may transfer the calculated data to a school server for further processing or utilization. The assessment and reporting module 525 allows the teacher to selectively give or modify weight in the total assessment score to a particular activity, object, assignment or question; allows the teacher to add assessment to portions of the assignment that cannot be efficiently or accurately evaluated by automatic tools (e.g., an "open" question to which the student is required to answer using his free-style text); and allows the teacher to override or modify scores calculated automatically by the system based on automated checking of students results and performance.

In some embodiments, workstation 500 includes a content creation and modification module 526, which includes: tools for creating and/or modifying multiple learning objects, e.g., in a "factory" style of production; templates, editors and generators that allow the teacher to do simple alterations to previously-created educational content, using the appropriate editor; tools to allow the teacher to create educational content by himself, based on a pre-designed template and/or from scratch, utilizing a generator. The content creation and modification module 526 may be integrated in the teacher station; and content items that were created, revised and/or edited using the content creation and modification module 526 are recognized and usable by the teaching/learning system for substantially all purposes, for example: storage in repositories; browsing, searching or filtering items in the educational content repositories; planning the sequences for the flow of teaching, learning and assessment processes; assessing students progress; reporting; or the like.

The educational content 530 includes one or more content repositories 531 able to store learning objects, learning activities, lessons (e.g., lesson plans, scripts for scenarios, history of executed lessons), or the like. The teacher may browse, search or filter items in the content repositories 531, in order to locate and retrieve digital content matching one or more criteria (e.g., subject matter, topic, type of activity, or the like), optionally by searching through meta-data or tags or keywords associated with educational content items. Optionally, the teacher may tag educational content items by adding tags, keywords, meta-data, or other description or categorization information, as well as to grade the quality of the educational content item, to grade or to comment on the validity or relevancy of the educational content item to a teaching/learning process or subject matter.

In some embodiments, workstation 500 includes a personal content repository 533 to store the teacher's newly-created content and/or the teacher's modified content (e.g., reflecting changes that the teacher introduced to system-provided content) and/or imported educational content. Workstation 500 further includes a content publishing module 534, to allow the teacher to manage a publishing process for created and/or modified and/or imported educational content, e.g., transferring or sending altered or created content from the teacher's personal content repository 533 to other teacher stations, to a shared or general repository accessible by other teachers, or the like. Optionally, the publishing process includes review and approval procedures (e.g., by other teachers), and results in the placing of approved educational content in a publicly accessible repository such that other teachers may use it.

The portal services 540 include, for example, a learning communities module 541 to allow creation and operation of one or more learning communities (e.g., using forums, blogs, chat rooms, or the like). The portal services 540 further include a collaboration module 542 to allow collaboration and participation of multiple users (e.g., multiple students, or a teacher together with one or more students) in a particular activity or discussion or assignment. The collaboration module 542 may be based on the teacher's gallery tool 852 (described herein with reference to FIG. 8), utilizing a similar mechanism and optionally transforming it into a common work space and/or giving students authorization or privileges to moderate and/or manage the gallery; thereby allowing groups of students to learn cooperatively in class or from home (or from other remote location where they can use a computer to access the system), e.g., to submit files to the common space, to comment on other students work, to perform "peer assessment", to publish their collaborative products to a higher level (e.g., the teacher's gallery or the class gallery).

The portal services 540 further include a communication module 543 to allow online or offline communication among users (e.g., electronic mail, instant messaging, or the like); and a personalization module 544 to allow personalization of the teaching/learning environment according to personal preferences of a particular user (for example, creating, or deleting "portlets" and the related services in the personal home-page; defining RSS parameters; or the like).

The integrated workstation 500 may optionally include student tools, for example, implemented as part of the LMS management and adaptation module 510 or using a separate module or component. The student tools, as well as other optional components or module, may include: a learning content display; homework and long-term activities tools; collaboration tools; disciplinary applets and tools (e.g., a calculator, a dictionary); and a personal desktop (e.g., including a calendar, a task list, a to-do list, an e-mail client, or the like).

Figure 6:
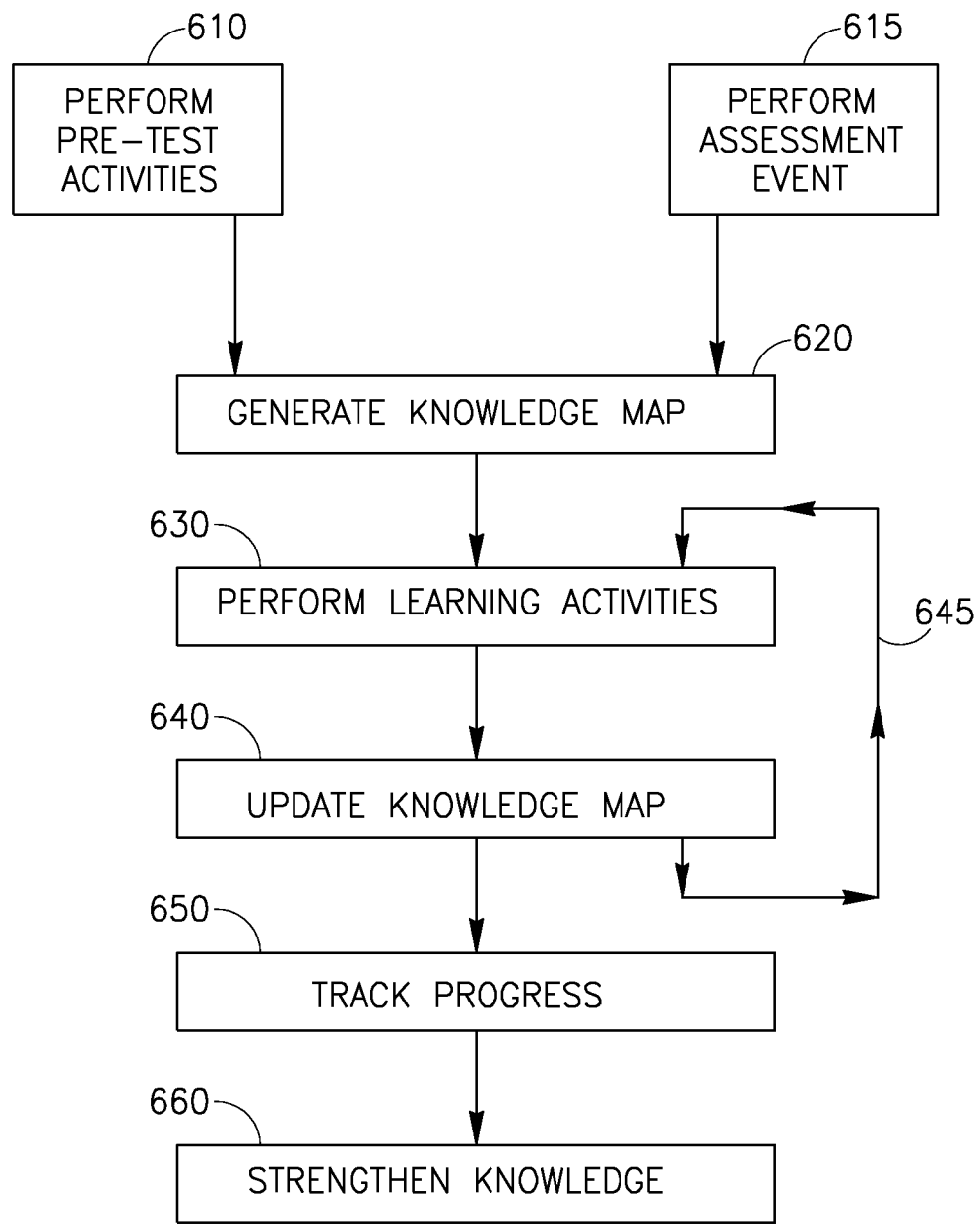
FIG. 6 is a schematic flow-chart of a method of adaptive teaching, learning and assessment in accordance with a demonstrative embodiment of the invention.

FIG. 6 is a schematic flow-chart of a method of adaptive teaching, learning and assessment in accordance with some demonstrative embodiments of the invention. Operations of the method may be used, for example, by system 300 of FIG. 3, by system 400 of FIG. 4, and/or by other suitable units, devices and/or systems.

In some embodiments, the method may optionally include, for example, performing pre-test activities or learning activities (block 610), e.g., by a student utilizing a student station. Additionally or alternatively, the method may optionally include, for example, performing a formal assessment event (block 615), e.g., a quiz.

Additionally or alternatively, e.g., in parallel to the operations of block 615 of thereafter, the method may optionally include: dynamically creating a student learning curve, thereby allowing alternative assessment processes (e.g., performance based assessment; "authentic" or project assessment; portfolio assessment; journal assessment; or the like). The student learning curve may be based on the adherence of: scores in automatically-assessed assignments, and/or records of student performance in pre-designated "pedagogic events", and/or information regarding completion of learning activities, and/or teachers evaluation and comments regarding submitted work, and/or the documentation/journal of the searches that the student performed and the sites he visited on the Web. These records may be dynamically considered, compiled and processed to create a personal study map that may be compared with a set of predefined goals of required skills, competencies, and knowledge maps; thereby indicating the student's achievements and progress dynamically, and allowing dynamic adaptation of his learning processes (e.g., through assignment of appropriate content and tasks).

Based on the student's performance in the pre-test activities of block 610, and/or based on the student's performance in the assessment event of block 615, and/or on the personal study map, an initial knowledge map and/or a student's learning curve of the student is generated (block 620). This map reports the student's progress in various forms (list, table, graph, graphic concept map, color-keyed goals map, and the like), and may be part of his formal assessment report and/or serve as the basis for teacher/student progress evaluation meetings. Optionally, these reports may be accesses by the student any time, at his discretion or at pre-defined pedagogic milestones (e.g., end of term, end of study unit, end of the study of a certain topic) to assist self-assessment processes.

The knowledge map may indicate, for example, that the student is strong in math and weak in literature, that the student is strong in verbal communication of ideas but weak in writing, that the student is strong in multiplication and weak in division, that the student is strong in comparing numbers that have an easily-identifiable common denominator but is weak in comparing numbers that do not have an easily-identifiable common denominator, or the like.

These indications of the knowledge map, the personal study map, the student's learning curve, and/or the progress reports, together with the real-time reporting features and alerts (e.g., as created by the alerts module 885 of FIG. 8) may provide the teacher valuable information for managing the pedagogic process (for example: indicating to the teacher that a certain teaching or learning process did not produce the planed results; that a certain student or group of students did not perform as anticipated; that a student failed an assessment event or failed to perform according to instructions) and may assist the teacher to take measures for shortening the correction cycle (e.g., re-arranging the order or flow of activities; refining pre-defined conditions for alerts or for optional content allocation; allocating to a student or a group of students some additional content or exercises).

Based on the knowledge map, learning activities are performed (block 630) by the student utilizing the student station. Specifically, the student may be exposed to exercises or "drills" in topics in which the student's knowledge maps shows weakness. Based on the student's performance of the additional learning activities, the student's knowledge map is updated, modified, or re-generated (block 640), to reflect modifications in the students knowledge. For example, the student's knowledge map may be updated to reflect that the student is now strong in division.

Optionally, one or more iterations or cycles of the operations of blocks 630 and 640 may be repeated (arrow 645). The iterations may be performed during the same lesson or at the same day (e.g., consecutively), or across multiple days or lessons. The iterations may be performed until the updated knowledge map of the student reflects sufficient knowledge of the student in the relevant topic or subject matter (e.g., until the student's actual knowledge map reaches or matches the required knowledge map; or until the estimated "gap" or difference between the student's actual knowledge map and the required knowledge map is small, or smaller than a pre-defined percentage or threshold; or until his personal learning curve shows a certain degree or level of progress. Optionally, additional explanations or help may be provided to the student during the iterations, if needed, to strengthen his knowledge in the relevant topic or subject matter. The content of learning objects may be automatically modified or adapted during the iterations, to accommodate the student's weaknesses and strengths as identified in his knowledge map.

The student's progress is monitored and tracked (block 650). Optionally, a student's knowledge may be further strengthened by re-cycling and further "drilling" topics or vocabulary that the student already knows (block 660) according to his knowledge map. For example, learning activities may be adaptively tailored to further exercise concepts that the student already grasped, as well as to attempt to provide the student with new knowledge which the student did not yet grasp. The learning objects may be filled with content, or their content may be modified, according to the tracked record of progress of the student.

Other suitable operations or sets of operations may be used in accordance with embodiments of the invention. One or more of the operations may be repeated, for example, in multiple iterations or cycles. Operations may be performed in other suitable order.

Figure 7:
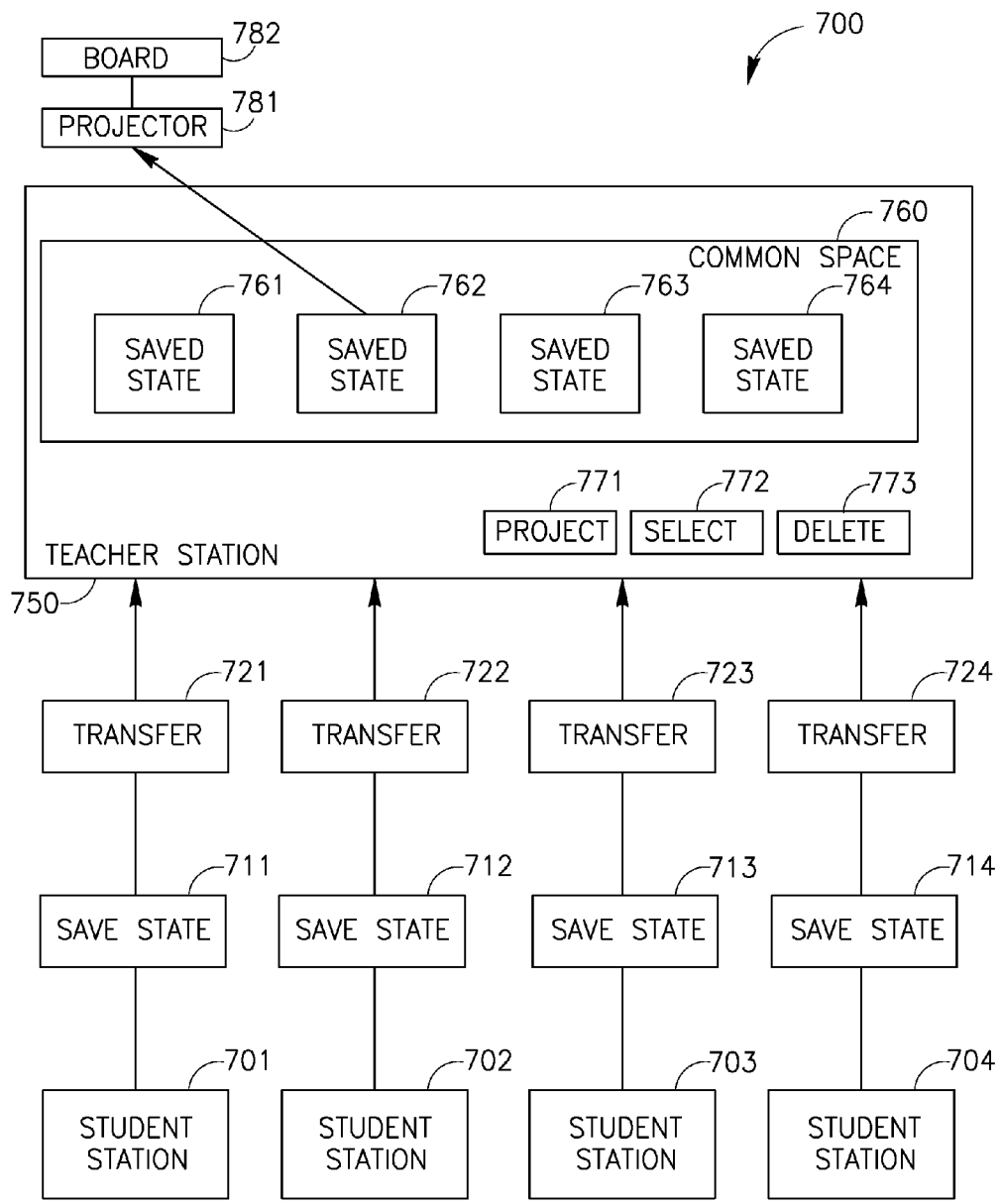
FIG. 7 is a schematic block diagram illustration of a collaboration tool in accordance with a demonstrative embodiment of the invention.

FIG. 7 schematically illustrates a collaboration tool 700 in accordance with some demonstrative embodiments of the invention. The collaboration tool 700 may be implemented, for example, using system 300 of FIG. 3, or using other suitable systems or devices. The collaboration tool 700 may be implemented using multiple modules, for example, a common space, a teacher's gallery, a voting tool, communication tools, or the like.

The collaboration tool 700 includes a teacher station 750 associated with multiple student stations, for example, student stations 701-704. Students utilize the student stations 701-704 to perform learning activities substantially in parallel, e.g., the same learning activity or various learning activities. A save state mechanism is associated with each student station; for example, save state mechanisms 711-714 are associated with student stations 701-704, respectively. The save state mechanism allows, for example, to save or copy or capture or acquire a current state or "snapshot" of a learning activity of a student station; to pause or hold a current state of a learning activity of a student station; to save or copy a screen-shot or "snapshot" or a status of a learning activity of a student station; to save or copy a results report of a learning activity of a student station. The save state mechanisms 711-714 may be activated substantially together (e.g., the teacher station 750 is used by the teacher to activate all the save state mechanisms 711-714) or selectively (e.g., the teacher station 750 is used by the teacher to selectively activate one or more of the save state mechanisms 711-714).

For example, the teacher may utilize the teacher station 750 to selectively activate one or more of the save state mechanisms 711-714. Additionally or alternatively, a student may utilize a student station (e.g., student station 701) to activate the corresponding save state mechanism (711). Additionally or alternatively, the teaching/learning system or a learning object may be programmed to activate a save state mechanism upon a triggering event or when pre-defined conditions are met; for example, when a pre-defined time period elapses since the beginning of the lesson, when a pre-defined time period elapses since the beginning of the operation of a learning object or a learning activity, when a pre-defined percentage of a learning object is successfully completed, when a pre-defined percentage of a learning object is incorrectly performed, or the like. In some embodiments, optionally, a save state mechanism may be able to save multiple states, e.g., corresponding to multiple time points.

A transfer mechanism is associated with each student station; for example, transfer mechanisms 721-724 are associated with student stations 701-704, respectively. The transfer mechanism is able to transfer the saved state information from the corresponding student station to the teacher station 750. The transfer mechanisms 721-724 may be activated substantially together (e.g., the teacher station 750 is used by the teacher to activate all the transfer mechanisms 721-724) or selectively (e.g., the teacher station 750 is used by the teacher to selectively activate one or more of the transfer mechanisms 721-724).

For example, the teacher may utilize the teacher station 750 to selectively activate one or more of the transfer mechanisms 721-724. Additionally or alternatively, a student may utilize a student station (e.g., student station 701) to activate the corresponding transfer mechanism (721). Additionally or alternatively, the teaching/learning system or a learning object may be programmed to activate a transfer mechanism upon a triggering event or when pre-defined conditions are met; for example, when a pre-defined time period elapses since the beginning of the lesson, when a pre-defined time period elapses since the beginning of the operation of a learning object or a learning activity, when a pre-defined percentage of a learning object is successfully completed, when a pre-defined percentage of a learning object is incorrectly performed, or the like. In some embodiments, optionally, a transfer mechanism may be able to transfer multiple saved states, e.g., corresponding to multiple time points.

A saved state may include, for example, a screen-shot, textual component, graphical components, audio/video, animations, results, achievements, answers, correct answers, incorrect answers, or other information. Saves states may be received from one or more student stations; for example, saved states 761-764 may be received from student stations 701-704, respectively. The received saved states 761-764 are stored and presented on the teacher station 750, for example, in a common space 760.

The common space 760 may be implemented in various ways. For example, in some embodiments, the common space 760 may be implemented as a global common space that virtually exists on the Internet or the World Wide Web. Such global type of common space 760 may be associated with a view, or other functions, available exclusively to the teacher using the teacher station 750, allowing the teacher to perform management and/or moderation of the common space 760, e.g., management and/or moderation of content and saved states 761-764. Optionally, a non-managed or non-moderated common space 760 may be used, in addition to or instead of the managed or moderated common space 760.

In other embodiments, the common space 760 may be implemented as a local common space and/or a teacher station's common space, which is operable substantially exclusively on the teacher station 750. In some embodiments, students may use student stations 701-704 to post or submit their work (e.g., work results or work products) to the common space 760, and/or to relate (e.g., comment) on work posted by other students. The teacher may utilize the teacher station 750 to access such global common space 760; optionally the teacher utilizing the teacher station 750 may have more privileges (e.g., more available functions) with regard to the common space 760 then students utilizing the student stations 701-704.

In some embodiments, a global type of common space 760 may not necessarily include all or some of the saved states 761-764 that were captured and transferred to the teacher station 750. In some embodiments, some or all of the saved states 761-764 may be stored in the global common space 760 and may not be stored on the teacher station 750; optionally, the teacher station 750 may allow the teacher to moderate, modify, delete, edit, or otherwise manage the content of the common space.

In some embodiments, a common space 760 may be implemented locally utilizing the teacher station 750, and the teacher may selectively share the local common space 760 (or selected portions thereof) with the class; for example, the local common space 760 may be selectively presented and operated as a class-session common space 760, available to the class for a limited time period, and/or not necessarily available globally to third parties.

A received saved state may optionally be presented, on the teacher station 750, together with an indication of the respective source of the saved state. For example, saved state 761 may be presented on the teacher station 750 in proximity to a textual item indicating that saved state 761 was received from student station 701 which is currently operated by Student B.

The teacher station 750 may include an interface to allow the teacher to selectively operate on one or more (or all) of the saved states 761-764. For example, a "select" button 772 allows a teacher to select one or more of the saved states 761-764; a "delete" button 773 allows a teacher to delete or remove the selected saved state(s) from the common space 760; a "project" button 771 allows a teacher to project the selected saved state(s) using a projector 781 onto a board 782; other interface components may be used. The projected saved state(s) may aid the teacher to conduct a class discussion, for example, comparing the projected saved states, evaluating the correctness of the projected saved state(s), inviting comments from students about the projected saved state(s), or the like.

Optionally, the teacher may utilize the teacher station to select a particular saved state (e.g., or a particular student, or of the teacher utilizing the teacher station) and to define that saved state as a starting point or a continuation point for some or all of the students; the learning object may thus become available for utilization by students, continuing from the position of the selected saved state.

Instead of, or in addition to, projection of selected saved state(s), other information may be selected for class presentation or projection by the teacher using the teacher station 750. For example, other items may be included in the common space 760 or in the projected information, which may be used as a sharing space for lesson materials or information which provides opportunity for class discussions or interacting between the teacher and students regarding educational content.

In some embodiments, the teacher station 750 may allow the teacher to perform various operations on the saved states 761-764 or on other information in the common space 760, for example, sorting operation, comparison, marking the differences between items, putting items side by side or in various presentation formats, zooming in or zooming out on items, shrinking or expanding items, hiding and revealing items, dividing items into groups, or the like.

In some embodiments, the collaboration tool 700 may include additional functions for interactions and collaboration. For example, an annotation tool may allow students to use their student stations 701-704, and/or may allow the teacher to use his teacher station 750, to annotate information items, to add comments to information items, to tag information items, to mark portions of information items, or the like.

Additionally or alternatively, a voting tool or a poll-conducting tool may allow students to use their student stations 701-704 in order to cast votes on survey questions presented by the teacher station 750 with regard to the projected information items. For example, the teacher may use the teacher station 750 to selectively project two different saved states 761 and 762 onto the board 782. The teacher may then ask the students (orally, or by using the teacher station 750) to cast their vote for the saved state which they think includes the correct answer. The students may use student stations 701-704 to cast their votes electronically, for example, using a survey program or a poll application or interface, and the votes may be collected and the results displayed using the teacher station. Other tools may be used in conjunction with the collaboration tool 700.

Figure 8:
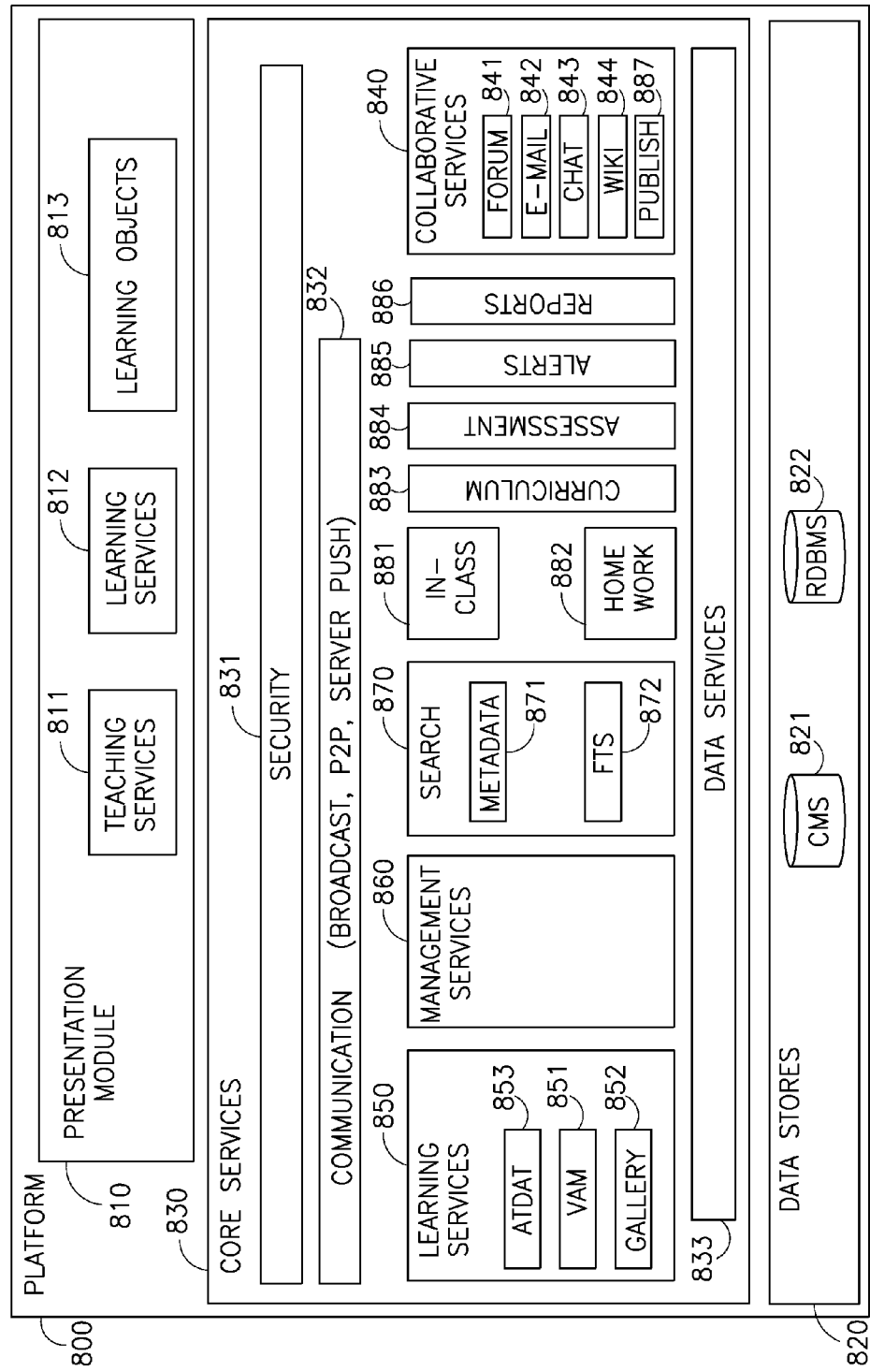
FIG. 8 is a schematic block diagram illustration of a platform in accordance with a demonstrative embodiment of the invention.

FIG. 8 schematically illustrates a platform 800 in accordance with some demonstrative embodiments of the invention. Platform 800 may be implemented, for example, using software and/or hardware components, using client/server architecture, using client/database architecture, using Web architecture, or the like. Platform 800 may be integrated in, for example, teacher station 310 of FIG. 3, student stations 301-303 of FIG. 3, or other suitable devices or systems.

Platform 800 includes, for example, a presentation module 810, one or more data stored 820, and core services 830. The presentation module 810 may be a client-side module, optionally implemented using a browser application. The presentation module 810 may include, for example, a sub-module for presenting teacher services 811 (e.g., to a teacher); a sub-module for presenting learning services 812 (e.g., to students); and a sub-module for presenting learning objects 813 (e.g., to teachers and/or students)

The data stores 820 may include one or more server-side databases, for example, a database or repository able to store data used by a Content Management System (CMS) 821, a Relational Database Management System (RDBMS) 822, and/or other data repositories, data management tools, data storage tools, data backup tools, or the like.

The core services 830 may include one or more server-side applications, optionally implemented using an applications server. A security module 831 provides security services, for example, to secure data and/or communications. A communication module 832 provides broadcast services, Peer to Peer (P2P) functions, server push functions, or other data transfer or data serving functions. A data services module 833 provides connection to the data stores 820, data retrieval, data access, or other functions.

Further in the core services 830, learning services 850 may include a Vocabulary Acquisition Machine (VAM) 851 which may be an automated "drilling machine" that dynamically modifies content in learning objects, or fills each exercise or game with adaptive content according to the particular student's record of progress. The VAM 851 may allow teaching, drilling and testing of vocabulary according to the student's individual abilities. The VAM 851 may be used to ensure to ensure that substantially every student, upon completion of the sixth grade, knows how to read and write and has a core vocabulary knowledge that serves as the basis for understanding and advancing.

The VAM 851 may utilize three levels of words (e.g., having 12 words per level) per theme or study unit: a core level, an expansion level, and an enrichment level which typically only strong students attain. Per each level of words, the VAM 851 utilizes multiple modalities, for example: audio, audio and text, text, and spelling. Further in the core services, a teacher gallery tool 852 allows the teacher and/or one or more students to collaborate in class based on work or content (or portions thereof) that are sent or submitted by students to a teacher-moderated common space. The teacher may utilize the teacher station to select, add, delete, sort, arrange, edit, comment, or modify one or more of the submitted items, and to selectively display them one or some or all of them in a gallery or project them to the class.

In some embodiments, gallery tools may be assigned or allocated to a group of students as a collaborative common space for group assignments during the student class activity or for homework and long-term assignments. Optionally, one or more students may be allocated teacher's rights and privileges, and may perform some or all of the functions available to teachers. A gallery assigned to a group of students may be open to teacher's intervention, or may be "blocked" for access by any person except the group members. Students may then (for the teacher gallery or for a group gallery) be involved in or perform peer assessment, and may relate to the displayed or projected content, for example: verbally using communication tools, using a voting tool, using a grading tool, using a commenting tool, or the like.

Although portions of the discussion herein relate to the VAM 851, such VAM 851 is a demonstrative implementation and various embodiments may include other and/or additional teaching/learning applications, e.g., general-purpose or specific applications or modules, for example, general or specific Adaptive Training and Drilling Automation Tools (ATDAT) 853. Such tools and applications may not be limited to vocabulary acquisition, and may provide a practice module, a drilling machine module, a testing module, a timed assignment module, a module to allow automatic and dynamic allocation of tasks or exercises to individual students (e.g., differentially), a module to dynamically generate or arrange sets of fill-in questions in accordance with pre-defined sets of keywords, a module to dynamically modify or fill a game with words or terms derived from a text file, or the like. Other suitable teaching/learning modules may be used, in addition to or instead of the VAM 851.

Management services 860 may manage teaching and learning; search services 870 may allow the teacher to search for educational content or for student-related data, e.g., based on metadata 871 and/or using a Full Text Search engine 872. An in-class module 881 may provide in-class services, in-class management services, information about progress of students' in-class learning, or the like.

A homework module 882 may be used to distribute homework to students; to collect homework submission from students; to manage submission dates and times, optionally using a reminders and notifications mechanism (e.g., to alert students before an assignment is due for submission, to notify the teacher that a student submitted an assignment, to notify the teacher that a student did not submit an assignment at all or within the assigned time period, or the like); to allow the teacher to manually review, correct and/or grade the submitted homework; and/or to perform automatic review, correction and/or grading of submitted homework (e.g., with regard to homework in math, with regard to homework having multiple-choice questions, with regard to homework having pre-defined textual answers or other types of answers).

A curriculum module 883 may be used for scheduling of lessons, for ensuring that lessons are in line with a pre-defined curriculum, to define curriculum requirements that lessons or learning activities are required to adhere to, or the like. An assessment module 884 may perform integrated and ongoing assessment. An alerts module 885 may generate and/or send alert messages and other notification to the teacher station and/or the student stations. A reports module 886 may generate reports about the learning progress of one or more students, of a group of students, of a class, of a grade, or of a school.

Collaborative services 840 may be able to provide one or more collaboration tools, for example, a forum service 841, an electronic mail service 842, a chat service 843, and/or a "wiki" service 844 (e.g., a public or private Web-site or Web-based application for organizing linked information that allows visitors to add, remove, edit and/or modify content). In some embodiments, a publishing module 887 may be included, for example, as part of collaborative services 840 (e.g., allowing multiple users to create content), as part of management services 860, as part of data services module 833, as part of development tools 272 of FIG. 2 (e.g., offered to teachers and educators, allowing them to create new content, optionally utilizing pre-defined templates, editors, "wizard" mechanisms, or the like), or in associated with other suitable module. The publishing module 887 may be used to publish educational content, namely, to selectively make it available to third parties, to other teachers, to other students, or the like.

Some embodiments of the invention may present or utilize various applications, windows, tools, and/or content items on the teacher station and/or on one or more student station(s). Content, components and/or presentation elements described herein may be combined together in various suitable combinations, e.g., on the teacher stations and/or on one or more student stations.

In some embodiments, a teacher station and/or a student station may present, for example: a log-in interface allowing the user to enter a user-name and a password.

In some embodiments, a teacher station may present, for example: an indication of the lesson subject (e.g., "math" or "literature"); an indication of the lesson topic (e.g., "multiplication" or "division"); an indication of the class identity and/or the grade identity (e.g., "class number 4 in the second grade of the school"); an indication of the name of the teacher operating the teacher station; a time-bar or a timer indicating the time elapsed since the lesson began, the time remaining until the lesson ends, the percentage of time of the lesson that elapsed or that remains; and an indication of the current date and time.

In some embodiments, a teacher station may present, for example: a button allowing the teacher to stop or pause or "freeze" some or substantially all learning activities being performed by student stations; a button allowing the teacher to resume or "un-freeze" some or substantially all learning activities of student stations; and a button allowing the teacher to command that substantially each student station present a common message or content (e.g., a notification "Please look up at the teacher right now" or "Please look at the board right now").

In some embodiments, a teacher station may present, for example, a small window (e.g., a window occupying less than 20 or 25 or 33 percent of the screen or of the application) showing a scaled-down version of the content projected on the board (e.g., by the projector). The window may be resized or enlarged.

In some embodiments, a teacher station may present, for example, one or more indications regarding class attendance and/or connection or disconnection of students from the system. For example, the teacher station may present an indication that all the students that belong to the class are currently logged-in into student stations (e.g., "all students are logged-in"); and an indication that a certain number or percentage of students is logged-in or not logged in (e.g., "15 out of 18 students are logged-in" or "12 percent of students are not logged-in"), optionally allowing the teacher (e.g., by clicking or otherwise commanding the teacher station) to view a detailed report of logged-in and/or not logged-in students.

In some embodiments, a teacher station may present, for example, one or more indications regarding connectivity and/or operability of various peripherals or components of the teaching/learning system. For example, the teacher station may present an indication that all the students stations are connected to the network, that some student stations are not connected to the network, that the projector or the board are not connected or are turned-off or are inoperable, that the school server or the Internet is disconnected or unavailable, or the like; optionally allowing the teacher (e.g., by clicking or otherwise commanding the teacher station) to view a detailed report of connected, disconnected, operable and/or inoperable components. Optionally, the teacher station may remotely control one or more peripherals, e.g., by turning-on and turning-off the projector, by muting or changing the volume of speakers, by partially or completely blocking students access to the Internet, or the like.

In some embodiments, a teacher station may present, for example, a window reporting the learning progress of individual students, of a group of students, of groups of students, and/or of the class. For example, the teacher station may indicate that within the class, or within a first group out of four groups in the class, 15 students (or 75 percent of students) are currently performing a learning activity (e.g., a learning object), 2 students (or 10 percent of students) completed the learning activity, and 3 students (or 15 percent of students) did not begin to perform the learning activity. The indications may be expanded, for example, to present a detailed list of students of selected types. Optionally, a tabbed interface and/or a windowed interface may be used to allow switching among students or groups of students.

In some embodiments, the teacher may use the teacher station to expand information or to zoom-in into selected items of information. For example, the information item indicating that 15 students (or 75 percent of students) are currently performing a learning activity may be expanded, to show a detailed break-down at a finer resolution; e.g., presenting the information that out of the 15 students, 12 students are currently performing a first learning object of the learning activity, and 3 students are currently performing a second learning object of the learning activity.

A further or finer detail may be obtained by the teacher, by further zoom-in or expansion; for example, the teacher may expand the information item stating that 3 students are currently performing a second learning object of the learning activity, thereby receiving a list of the three students, showing the exact progress of each of the three students within the learning object (e.g., by a percentage indication, by a progress bar indication, or the like).

Other information or details may be presented to the teacher. For example, the teacher may utilize the teacher station to remotely view or track the progress of a student (utilizing a student station), or to compare the current progress of a student (e.g., in substantially real-time) to the progress of other students and/or to past performance or past progress of that student in other learning activities. In some embodiments, information or details about student progress or performance may be "expanded" or obtained by the teacher using one or more methods or tools, for example, using a Real-Time Class Management (RTCM) module (e.g., by zooming-in on an icon representing a learning activity), using an integrated tracking and assessment module (e.g., by searching for a student by name, by browsing through lists or groups of students, by selecting a class and/or a group and/or a student, or the like), or using other suitable modules).

In some embodiments, a teacher station may present, for example, a textual and/or graphical description of the progress of the lesson, e.g., in time units, in learning objects performed or being performed or intended for performance, in learning activities performed or being performed or intended for performance, or the like. For example, the teacher station may present five graphical/textual items. The first item indicates that a first learning object was completed successfully by all the students; optionally, the first item may be partially shaded or darkened or painted in grey, to indicate that the first learning object was completed. The second item indicates that a second learning object was completed successfully by 15 students, and is still being performed by the remaining five students. The third item indicates that a third learning object was completed successfully by eight students, is still being performed by seven students, and that five students did not yet begin to perform the third learning object. The fourth item indicates that a fourth learning object is not yet being performed by any student. A fifth item indicates that a class discussion is scheduled for performance after 90 percent of the students complete the four learning objects.

Optionally, a coloring scheme, a marking scheme, a hiding or grey-color scheme, or other visual indications may be used to easily differentiate among types of items, e.g., items that were completed, items that are being performed, and items that are intended for performance later. Optionally, a marking scheme may be used to indicated other properties of items; for example, a "V" sign or a green light or green frame may be used to indicate a learning object completed successfully by all the students; a red light or a red frame may be used to indicate a learning object that at least a pre-defined percent of the students failed to complete (entirely, partially, correctly, or the like). Other marking or highlighting schemes may be used.

In some embodiments, a teacher station may present, for example, an interface to browse between lessons, e.g., a "previous lesson" button or link, a "next lesson" button or link, or the like. For example, a teacher may view a current station, may view information related to previous lessons that took place in the past, and may view information related to planned lessons that are expected to take place in the future. The teacher may view non-present lessons, for example, in order to check whether a particular learning object was performed in past lessons or is expected to be performed in future lessons; in order to view or compare students performance across lesson; or for other purposes.

In some embodiments, a teacher station may present hierarchical information, for example, using expansion and collapsing mechanisms, using a zoom-in and zoom-out mechanisms, using a tabbed or windowed interface, or the like. For example, lesson information may be expanded or zoomed-in to present learning activities information, which in turn may be expanded or zoomed-in to present learning objects information, which in turn may be expanded or zoomed-in to present information of finer details (e.g., pages within the learning objects), and vice versa.

Additionally or alternatively, hierarchical information may be presented in differential resolution of students, for example, information regarding an individual student, information regarding a group of students, information regarding multiple groups of students, information regarding a class, information regarding multiple classes, information regarding a grade, information regarding multiple grades, information regarding a school, or the like.

In some embodiments, a teacher station may be used to allow the teacher to perform in-class real-time modifications of the lesson or its components (learning activities and learning objects), e.g., based on real-time performance and progress of students operating the student stations. For example, the teacher station may report to the teacher, or may alert the teacher, that a significant percentage of the students (e.g., more than 50 percent) did not successfully complete the second learning object of the lesson. Accordingly, the teacher may command, using the teacher station, that the fourth learning object of the lesson (which is expected to be performed shortly thereafter) be postponed to the next lesson or to a subsequent lesson, transferred to a homework assignment, or cancelled, or that a class discussion be inserted between the third and the fourth learning objects, or that the time allocated for a class discussion be increased on expanse of a cancelled learning object.

In some embodiments, the teaching/learning system may be pre-programmed to automatically suggest (to the teacher, via the teacher station) and/or to automatically perform modifications to the lesson based on real-time performance and progress of students operating the student stations, thereby achieving automatic or semi-automatic adaptive teaching and adaptive learning.

In some embodiments, when student stations are operated to allow the students to perform a learning object, the projector may project on the board a message such as, for example, "Please perform the learning activity on your personal computer", optionally including other information, e.g., the title of the learning activity, the time period allocated to it, or the like.

In some embodiments, the teacher station may present to the teacher materials or content submitted by students utilizing the student stations, for example, answers to questions embedded in learning objects, questions that students have with regard to the learning activity, comments or insights of students related to the educational content, or the like.

In some embodiments, the teacher station may present to the teacher detailed information regarding the performance of a learning object. For example, for each question embedded in a learning object, the following information may be presented on the teacher station in substantially real-time: the number of the question; a short description of the question, or a copy of the question; the number and/or percentage of students that answered the question; the number and/or percentage of students that did not answer the question; the number and/or percentage of students that answered the question correctly; the number and/or percentage of students that answered the question incorrectly; a warning indication in proximity to questions having a small percentage of correct student answers, or a larger percentage of incorrect student answers; and/or other information. The information may be presented in a list or a table, and may be sorted and/or filtered using the teacher station, for example, by question number, by success rate, by level of difficulty, or the like. Optionally, color indications may be used, to emphasize successful items (e.g., in green) and problematic items (e.g., in red). Optionally, bars or graphs or pie-charts may be used to indicate graphical representation corresponding to the presented information.

In some embodiments, the teacher station may present to the teacher a real-time class attendance report, optionally reflecting the progress and/or activity of individual students. For example, the teacher station may present a list or a map of the class students, sorted by their seat locations, sorted by their first names and/or last names, sorted by grades received, or the like. The list or map may use a color scheme, a graphical scheme, or other marking schemes to indicate types or properties of students. For example, a green icon or name may indicate that the student is logged-in into a student station; a red icon or name may indicate that the student is not logged-in into a student station; a white icon or a grey name may indicate that the student is absent from class; or the like. Optionally, the teacher may utilize the teacher station to select one or more students from the list or map (e.g., by clicking on student names or icons), in order to zoom-in and monitor the progress of the selected student(s) so far in the lesson. In some embodiments, a small photograph of a face of a student may accompany, or may replace, the student's name or icon in lists or maps.

In some embodiments, the teacher station may allow the teacher to select an indication of a student (e.g., a photograph, a textual name, a graphical icon, or the like) in order to interact with the student and/or to obtain a detailed report about the student's progress. Upon the selection, the teacher station may present to the teacher: the student's name and photograph; the group(s) to which the student belongs; a button or interface allowing the teacher to compose and send a message to the student; a bar or pie-chart or other indication of the learning progress of the student in the current lesson, e.g., showing in green color the successfully performed activities or portions thereof, showing in red color the incorrectly performed activities or portions thereof, showing in white or grey color the activities that the student did not yet perform; indication of the number of learning objects or questions completed by the student in the current lesson; indication of the number or percentage of errors that the student made in the current lesson; indication of the number or percentage of correct answers that the student provided in the current lesson; a scaled-down graphical representation of completed learning objects, currently performed learning objects, and/or learning object pending for performance by the student in the current lesson; and the average progress of students in the group and/or in the class, optionally compared with the actual progress of the student (e.g., an indication that the student completed so far 2 out of 5 learning objects, whereas the students in the class or in the group completed so far on average 4 out of 5 learning objects).

In some embodiments, a student station may present to the student graphical and/or textual (e.g., hierarchical) representations of subject matters, e.g., presented as worlds of knowledge. For example, globe-shaped circles may represent math, literature, physics, history, and other subject matters. Upon selecting of a subject matter, a zoom-in may be performed to present sub-units of that subject matters, e.g., in lesson units, in topic units, or the like. For example, selection of the "math" world of knowledge may expand or enlarge the math globe, to show indications corresponding to lessons (e.g., Lesson 1, Lesson 2, Lesson 3, etc.).

Optionally, the current lesson or the most-recent lesson may be highlighted or may have large size of indication, less-recent lessons may have smaller size of indications, and lease-recent lessons may have smallest size of indications. Upon selecting of a lesson, a zoom-in may be performed to present sub-units of the lesson, e.g., representations of learning activities in the lesson, representations of learning objects of the lesson, or the like. For example, selection of "Lesson 3" in "math", may expand or enlarge the "Lesson 3" representation to show "a learning object in multiplication", "a self-paced exercise", "a class discussion", or other components of that lesson. Optionally, selection of the topic "multiplication" may expand or enlarge the representation to show a scaled-down graphical representation of a learning object of that topic.

Optionally, the student station may present to the user names or graphical indications of other students that are performing activities in the selected lesson, topic, or learning object; optionally, this may facilitate the ability of the student to contact other student(s) that are engaged in the same activity, for example, to establish collaboration.

In some embodiments, the student station may allow the student to access and utilize a personal tool-box or zone, for example, a dictionary, a thesaurus, a calculator, a notepad, a scratch-pad, a curriculum, a learning itinerary, or the like. Optionally, one or more tools may be disabled or unavailable upon command from a teacher station, and/or automatically according to a disabling instruction in a learning object. For example, the teacher may utilize the teacher station to remotely disable the calculator tool at student stations that are currently performing a learning object in the subject of math. Similarly, a learning object in the subject of literature may automatically disable a dictionary tool in the student station when the learning object is operational.

In some embodiments, the student station may present to the student a list of assignments or tasks pending for performance by the student. In some embodiments, the student station may allow the student to perform the pending assignments in accordance with the student's desired order; in other embodiments, the student station may require a particular order of performance of assignments. The assignments may be presented using indications of their topic, for example, "multiplication", "essay writing", "verbs", "adjectives", or the like.

In some embodiments, the student station may present to the student a list of incoming messages or notifications, for example, received from other students, received from the teacher, generated automatically by the student station, generated automatically by the teacher station or the system, or the like. The student may utilize the student station to selectively display the messages, to delete messages, to reply to messages, or the like. Messages may include, for example, Instant Messaging (IM) items, Electronic Mail (Email) items, chat or chat-room messages, informing the student that his announcement or question in the forum received a reply or comment, or the like. Optionally, a list including names of other students and/or the teacher may be presented, allowing the student to select a name as a recipient, and to compose and send a message to the recipient.

In some embodiments, a learning object may present to the student an input (e.g., text, graphics, animations, audio/video) accompanied by a question and an answering mechanism, e.g., a field for typing in a textual response and submitting the response, a mechanism for selecting one answer or multiple answers from multiple choices presented, a mechanism allowing the student to draw, or the like. Optionally, a "hint" button may provide, upon request, a hint or clue or assistance to the student in finding the correct answer; the utilization of the "hint" button (or the frequent utilization of the "hint" button) may be logged and/or reported to the teacher station. A "launch an aiding tool" may allow the student, upon request, to launch a pre-defined aiding tool (e.g., a dictionary, a thesaurus, a calculator, or the like) in order to utilize the aiding tool for finding the correct answer.

A "submit answer and check its correctness" button may be used to submit the answer that the student selected or types or otherwise entered, to initiate an automated check of the correctness of the submitted answer, followed by a presentation of feedback to the student on the student station. The feedback may include, for example, an indication that the submitted answer is correct; an indication that the submitted answer is incorrect, accompanied by a mechanism allowing the student to retry to correctly answer the question; an indication that the submitted answer is incorrect, accompanied by the correct answer; or the like. A "show the answer" button may present the correct answer to the student, e.g., if the student does not wish to submit his suggested answer, or if the student failed to correctly answer the question. Optionally, a "continue" button may be used by the student to progress from the current question to a subsequent question.

In some embodiments, the learning object may provide the student with a digital drawing board on the student station, and the student may utilize the student station in order to draw, paint, select items, drag-and-drop items, move items, rotate items, delete items, draw lines, draw polygons, draw circles, enter text, resize items, undo actions, re-do actions, clear the digital drawing board, refresh or reload the original drawing, utilize graphical items from a repository, or the like. For example, a learning object in the topic of geometry may present to the student a polygon, and may ask the student how many diagonals can be drawn from a particular corner of the polygon. The student may utilize the student station to enter his response. Then, the learning object may ask the student to draw on the digital board all the diagonals possible from that particular corner. The student may utilize the student station to draw lines representing the diagonals. Then, the learning object may ask the student whether or not his estimate of the possible number of diagonals is correct, in view of his actual drawing of diagonals. The student may select or enter "yes" or "no". The learning object may thus allow interactive step-by-step learning. Optionally, the learning object may provide the student with real-time guidance and correction; for example, if a student attempts to draw a polygon, but generates multiple lines that do not constitute a polygon, the learning object may alert the student that the polygon is not completed, and may advise the student how to correct his drawing.

The teaching/learning system may store and utilize information regarding teachers, students, principals, and other users of the system. The information may include, for example, personal information (e.g., name, home address, contact information); subject matters in which the teacher is able to teach; subject matters in which the teacher actually teaches in the current year; identification of classes which the teacher teaches in the current year, and/or taught in past years; or the like. The information may reflect division of students among classes, division of students among subject-matter classes (e.g., a math class, a literature class), division of students among base classes, or the like. The information may be searched and/or filtered, and various reports may be generated based on the stored information.

Some embodiments include a system for teaching, learning and assessment, which includes three fully-integrated modules: a planning module, a Real-Time Class Management (RTCM) module, and an integrated tracking and assessment module. The planning module allows planning, presenting, editing and preparing items for delivery to a class of students, the items including, for example, integrated teaching-learning-assessment plans having flow and content components. The deliverable items may correspond to an entire yearly curricular program, for each subject matter. The planning may include selecting learning objects and/or learning activities and arranging them in accordance with a teacher's preferred order, optionally allowing differential and/or pre-defined and/or conditional order, layout, and allocation of content and/or activities to different students or groups of students. The system allows the teacher to define, and to dynamically modify: order of subjects, study-units and lessons; flow of activities and learning objects, including content alternatives (e.g., pre-conditioned or manually selected or automated based on allocation rules); groups of students; assessment rules and rubrics.

In some embodiments, a student may belong to more than one group, e.g., for various purposes. For example, a student may belong to Group A (including advanced-level students) with respect to math, and to Group B (including students that require assistance) with respect to literature. Additionally or alternatively, a student may belong to Group A with regard to multiplication in math, and may belong to Group B with regard to division in math. Other suitable parameters may be used to classify students into one or more groups.

The RTCM module allows the teacher: to present content and make content available to students (e.g., by selectively locking/unlocking or enabling/disabling content items) on their student stations; to modify the pre-planed flow of a lesson, e.g., by re-ordering learning activities or by modifying allocation of content to groups; to monitor students activities; to control students activity in class and to assign activities for homework; to control computers and peripheral equipment (e.g., teaching accessories or learning accessories) in the classroom; to manage and moderate a common space and its display area, and to include, order or edit students work, to selectively project it and/or make it available to students for comments.

The integrated tracking and assessment module allows monitoring of substantially all teaching-learning-assessment activities of the users (e.g., teachers and students), assessing them and reporting the results to authorized users (e.g., teachers, principal). The integrated tracking and assessment module allows, for example, definition and arrangement of practice-assignments and tests, based on sets of exercises and questions; publishing and allocating the tests or assignments, including definitions of differential allocation and/or differential behavior of items (e.g., different time to accomplish, different weight of question scoring); checking, assessing and/or grading the assignments performed by students; reporting the results to users according to their rights permissions; and storing a full record of the activity and scores.

The integrated tracking and assessment module performs tracking, e.g., a recording process of most (or substantially all) of the students' interactions with learning objects. These interactions are monitored and tracked during in-class activities and/or homework, and are stored, for example, in the students' personal portfolio or folder. Accordingly, the integrated tracking and assessment module may apply various rules or criteria for assessment, and may not be limited to determining whether correct answers are provided (e.g., during tests and formal exercises).

For example, the integrated tracking and assessment module may determine the number of wrong choices during preliminary phases of an activity; the number of times the student asked for help using the relevant buttons (e.g., "help", "hint", "example", "need assistance", or the like); the rate of assignments that were submitted "on schedule", namely, within the time period allocated for submission and not after a pre-defined deadline; the level of cooperation that the student exhibits while performing collaborative assignments; or other parameters.

The integrated tracking and assessment module allows for assessment and reporting of teachers' professional progress—based on the tracking of his planning activities, real time class performance and his students success/achievement and/or the changes in the personal and group "learning curves" or "knowledge maps". Some embodiment of the system also allows for assessment and reporting of a teacher, a group of teachers or an entire school performance-based on all mentioned above].

In some embodiments, the system may include multiple components, for example, three components: a RTCM component, which includes multiple functions and tools for management of in-class teaching and learning in substantially real time; a planning component, which includes multiple functions and tools for planning (in the macro level and in the micro level) lessons, assignments, learning activities, learning itineraries and teaching itineraries; and an integrated assessment component which performs substantially ongoing assessment of student performance as an integrated part of the teaching/learning process, wherein the ongoing assessment results further affect and modify the teaching and learning processes.

In some embodiments, the teaching/learning system may allow the teacher to utilize the teacher station to divide the students into multiple groups, taking into account one or more dimensions or parameters, and to allocate to different groups different learning objects, different learning activities, different lesson plans, or different learning scenarios. The RTCM component may allow the teacher utilizing the teacher station to dynamically modify the allocation of learning objects or learning activities to students or groups in substantially real time in class. For example, the teacher station may be used by the teacher to "lock" or disable a particular learning object from being performed by students to whom it was previously allocated; to modify the order in which previously-allocated learning objects are performed; or to perform other modifications, optionally using a drag-and-drop interface, a scripting language and/or a scripting interface to allow creation and modification of lesson plans and learning activities.

In some embodiments, the teaching/learning system may allow the teacher to utilize the teacher station to selectively or gradually introduce or serve to different students (utilizing student stations) or to different student groups, one or more learning objects, learning activities, lesson plans, or learning scenarios, based on one or more conditions or criteria. For example, learning objects or learning activities may be exposed or served to different students based on gradual exposure, based on substantially complete exposure, based on conditioned exposure (e.g., completion of a first learning object by Student A is a condition for exposing a second learning object to Student A; or, successful completion of a first learning object by a minimum percentage of students in the class or in a group is a condition for exposing a second learning object; or the like), or other exposure schemes.

In some embodiments, the teacher station may be used by the teacher to control and/or modify operational parameters or operational status of one or more teaching units or other teaching equipment. For example, the teacher may utilize the teacher station to selectively turn-on or turn-off the projector and/or the board connected to the teacher station; to temporarily darken or pause or stop the projection so that the students attention is directed to the teacher and not to the projection; to project a message instructing the students to direct their attention to the teacher or to the board; and to selectively enable or disable the connection of one or more students stations (or substantially all the students stations) to the Internet. Optionally, the teacher station may show textual indications and/or graphical indications of the operational status of one or more teaching units (e.g., the projector, the board, the Internet connection, or the like). Optionally, the pre-planned lesson plan may include commands to automatically control the operation of such teaching units during the lesson, e.g., when a triggering event occurs, when pre-defined conditions are met, when a threshold percentage of students completed a learning activity, or the like.

In some embodiments, the teaching/learning system is able to generate and to dynamically update a knowledge map per student, which may be used as an evaluation tool to evaluate the achievements and the performance of that student. Optionally, the knowledge map may be presented using textual descriptions (e.g., "the student is strong in math and weak in literature") having various levels of resolution or detailing (e.g., "the student is very strong in multiplication, and relatively weak in division"). The knowledge map may optionally include color representations (e.g., marking in green color a topic in which the student is strong, and marking in red color a topic in which the student is weak). The knowledge map may optionally include graphical representations, e.g., charts, pie charts, graphs, or the like. The knowledge map of a student may use textual and/or graphical indications to represent, for example, the actual or estimate knowledge map of the student; the required or expected knowledge map; and the "gap" or difference between the two. The knowledge map may be used instead of or in addition to other evaluation metrics or evaluation articles, for example, a report card, a listing of grades, a transcript, or the like. The dynamically-updated knowledge map may be used for self-assessment of the student by himself, for parental supervision and assessment, for pedagogic supervision and assessment, or the like.

In some embodiments, a base-line curricular knowledge map is generated, and is optionally regarded as a set of pre-defined rubrics or requirements of the curriculum or the lesson plan). Students' knowledge maps may be evaluated with reference to the base-line curricular knowledge map, thereby allowing assessment of how a student accomplished the requirements set by the curriculum.

In some embodiments, the teaching/learning system is able to generate and to dynamically update a knowledge map of a student, and to generate and update dynamically multiple knowledge maps of multiple students, respectively. The multiple knowledge maps of multiple students may be used by the teaching/learning system for further analysis, research, and/or data mining tasks. The teaching/learning system may analyze multiple knowledge maps of multiple students, and use the aggregated information in order to generate output, for example: an evaluation of a teacher based on the knowledge maps of the students associated with that teacher; an evaluation of a teacher based on the "knowledge gaps" (e.g., between the actual knowledge map of a student and the required or expected knowledge map) of the students associated with that teacher; an evaluation of a school, or of multiple schools, or of an education system, based on an analysis of aggregated knowledge maps of multiple students (e.g., substantially all students, representative students, pseudo-randomly selected students, or the like); or the like.

In some embodiments, the knowledge maps of multiple students may be used by the teaching/learning system to compare or evaluate particular operations performed by a teacher, particular decisions taken by a teacher, particular teaching styles, or the like. For example, a first group of students may be associated with a first teacher, that utilizes lesson plans and/or learning objects and/or learning activities that are pre-provided by the teaching/learning system, substantially exclusively, without modification or personalization by the first teacher. In contrast, a second group of students may be associated with a second teacher, that utilizes modified lesson plans and/or modified learning objects and/or modified learning activities (e.g., modified by the second teacher). Furthermore, a third group of students may be associated with a third teacher, that utilizes newly-generated lesson plans and/or newly-generated learning objects and/or newly-generated learning activities (e.g., newly-generated by the third teacher, using a generation wizard or other generation tools). The teaching/learning system may aggregate and analyze knowledge maps of students from the first group, the second group, and the third group; and may provide output, comparison results, and relative success of each teacher—the first teacher that uses pre-provided educational content, the second teacher that uses modified educational content, and the third teacher that uses newly-generated educational content. Other analysis or comparisons may be performed.

In some embodiments, a process of techno-pedagogic "cracking" or solving is performed, in order to create relation and correlation between ICT advantages and pedagogic goals (e.g., as set for knowledge, skills and competencies in the curriculum). The techno-pedagogic cracking process determines the best way, the optimal way, a near-optimal way, a suggested optimal way, or an estimated optimal way to teach, learn and assess a certain topic, issue, skill and/or competency with the aid of ICT. In some embodiments, cracking of pedagogic approaches and processes is performed in various learning processes or disciplines, for example, at the primary or elementary school (e.g., first language studies; second learning studies; mathematics; or the like).

The techno-pedagogic solutions ("cracks") are all field-tested, followed by research and evaluation pedagogic teams, and provide proven paths for teaching, learning and assessment. The teaching/learning system offers content, methodology, conditions and tools which are incorporated in the teaching/learning environment (and relevant parts are incorporated in the teachers and students workstations) that provide the advantages of ICT to the pedagogic science and profession. These allow the teacher to carry out his job (e.g., managing and guiding a learning process), utilizing the benefits of Information and Communication Technology (ICT) and using the computer in the classroom and/or at home.

The teaching/learning system provides to the teacher: a variety of learning objects that fulfill different goals in the processes of teaching, learning and assessment; a set of editing and authoring tools that allow creating, editing, modifying and adapting (e.g., changing predefined content and/or behavior) of learning objects, and allow their incorporation into teaching, learning and assessment processes; an assortment of pedagogic models, where learning objects are arranged into predefined, tested and proven paths of teaching, learning and assessment; a teaching management and planning environment that allows for editing, modifying and adapting of the predefined pedagogic models according to class or students needs, allowing replacing, adding, deleting, modifying, re-sequencing and re-ordering of learning objects; a real-time class management environment that allows activation or "playback" of a predefined or modified or edited flow of learning objects (e.g., according to a pedagogic model), as well as allocating of learning objects to a class or a group of individual students, and optionally locking ("freezing" or temporarily disabling) and unlocking ("unfreezing" or enabling) learning objects; and a dynamic, optionally case-sensitive (e.g., adapted to provide case-by-case relevant input), set of help files, instructions and pedagogic recommendations for the use of both the learning object(s) and the pedagogic models.

Some embodiments provide a modeling language, pedagogic scripting, and/or techno-pedagogic scripting or modeling. For example, an Educational Modeling Language (EML) allows managers of instruction or of pedagogic processes to define a path for of computer-based pedagogic activities and their relevant content. It further allows defining computerized management of differential and adaptive learning, for example, using a set of pedagogic terms that the system recognizes and arranging them in a way the system is able to understand and act upon.

In some embodiments, a "simple sequencing" script is used, for example, utilizing a script file that includes the sequence of the learning objects to be presented or activated. The script is able to call learning objects from the repository onto the screen of a computer in a predefined order. Having more than one alternative of sequence scripts for a given learning process (or topic or set of skills), allows production of differential learning processes for different groups or students, according to needs of the users as estimated or predicted by the sequence planner.

In some embodiments, a more complicated format is used, for example, a branched and conditional sequencing script.

The script may modify the path of learning (e.g., the sequence or the educational content elements that are presented or activated), according to the context or according to a students' behavior or interaction with the educational content. For example, built-in algorithms may assess or evaluate ("judge") the students' interaction with the educational content, and may modify the sequence or content elements in the script according to a pre-defined set of options or alternatives, thereby providing the student with an adaptive fit to his needs. The assessment or evaluation ("judgment") of students' interactions by the system is based on predicted patterns of behavior, on sorting and discernment of student answers and on algorithms set in the system.

In some embodiments, a script may further modify or edit the content elements within a learning activity or learning object, e.g., "on the fly" or in real-time. For example, the script may call for a content "presenter" (e.g., a component that displays the content on the screen), then calls for a template (e.g., that defines order, placement of multimedia elements, and behavior instructions to interactive elements), then calls for the multimedia elements and the textual elements involved and presents all of them on the screen as an interactive learning object.

In some embodiments, the system may use a combination of script types, to allow the teacher to prepare or allocate for each group or student an assortment of different content elements with differentiality in substantially all the aspects of the interactive learning object, e.g., the look and feel of "skins" and navigation controls, the use of multimedia elements or textual elements, the choice of words or level or register of a language, changes in conditional behavior, changes in assessment rubrics or information elements, or the like; thereby providing the student with an adaptive fit to his needs, as well as content and behavior that fit his learning style, his disabilities (if any), his talents, or the like.

In some embodiments, the teacher or the learning path planner may edit the script and create a learning flow or scenario. The teacher may drag-and-drop learning objects into the class or group or student designated learning path, and may create a preferred sequence for each. The teacher may use an editing tool (e.g., implemented as a subset of the differential assigning of content and activities module 523 of FIG. 5) which utilizes the EML that is based on pedagogic terms that the teaching/learning system recognizes, and arrange them in a way that allows the system to understand and act upon them using a learning script editor.

The learning script editor may display the results of the editing process by the teacher in an interactive way, in a "what you see is what you get" (WYSIWYG) manner, and may allow the teacher, for example: to select learning objects from the repository; to set the initial conditions or order in which they are allocated or offered to a student; to set alternative learning objects, and the conditions and/or context and/or circumstances and/or parameters that will incorporate or activate them in the learning path; to rearrange the look, feel and content of the learning objects; to set alternative look, feel and content of any of the selected learning objects; to evaluate or assess his decisions in real time; to make corrections of his editing; and to place the edited scenario in the teaching, learning and assessment plan, and/or allocate it to individual students, groups or the entire class.

Some embodiments include a "factory" or process for generating educational content, including tools for "mass production" of pre-prepared digital educational content items, and tools for "mass production" of educational content by users (e.g., teachers). The tools include templates supporting multiple aspects, e.g., visual and behavioral (or functional). The factory or process may define and utilize standardization to achieve usability and re-usability of created or modified digital educational content.

A template includes a standardized form that defines creation aspects of a certain type of content elements (namely, learning objects) in more than one instance or example; for example, creation aspects of the same type of content element, with the same behavior of functions, but with different content or multimedia assets from instance to instance.

Content is created or built in small elements ("educational content atoms"), that can be rapidly and conveniently arranged into bigger "portions" or "chunks" of content ("educational content molecule"). All template elements and multimedia assets are designed and manufactured according to template definitions and system standards and/or style guides, thereby allowing improved re-utilization and combining of elements or assets into learning objects.

A template further sets the standards for creating or developing all the components (assets) involved in a type of learning object, for example, standards for sizes, color schemes, style guides, predicted behavior, outcome or result of student interaction with them, or the like. This standardization allows better re-usability of the assets, as well as integrating multimedia assets developed once, into many examples or instances of the template or learning object; and allows the integration of more than one "atomic" educational content item into a chain or a complex learning object ("educational content molecule").

Content elements are placed in a content repository, a content management system and/or a content library. Each content element is tagged with comprehensive metadata that describes its features, settings, parameters, and possible relations with other content elements and with the learning flow. The content management system automatically determines where each element or multimedia asset is placed, and into which template it may fit, or into which presenter or "container" it may be called and be displayed or activated.

Some content objects may be pre-fabricated, such that elements are combined together into a "playable" file or script, or incorporated into a common "container" that is regarded by the teaching/learning system as a unique item or a "black box". Other content objects may be dynamically built "on the fly" or in real time; for example, a file containing a script may call for a content presenter, may call a template, may call all multimedia elements (assets), may call the texts involved, and may display them on the screen when needed or called for.

With regard to pre-fabricated learning objects, an editor allows the arrangement (or re-arrangement) of all parts or components of the learning object (e.g., skins, navigation elements, multimedia assets) as well as insertion of text where needed. The editor creates a "container" that includes a script file (e.g., using XML) that: defines the context for which the learning object is relevant; lists all elements that are included in a current instance of the learning object; defines the conditions for calling the learning object to the students station; set rubrics and/or parameters for assessment, and the actions that the system takes with respect to the interaction of the student with the learning object.

With regard to dynamically generated learning objects, a learning script editor is used (e.g., as described herein with reference to techno-pedagogic scripting). This allows creating an "instructions file", e.g., a script that describes the learning scenario offered for the current activity, which notifies the learning management system about all relevant components (e.g., template, assets, etc.) to be called for at any time.

These editors may be implemented as teacher's tools, allowing teachers to access and/or create educational content based on system templates and multimedia assets, and to set or modify their behavior and functionality according to system rules (e.g., the modeling language). Products generated by these editors may be incorporated into the teaching, learning and assessment plan of the teacher for his class, and may be activated in the process at the teacher's request or at predefined conditions or context.

Some embodiments allow publishing of generated or modified educational content, for example, by a first teacher to other teachers. Content publishing may be un-moderated, or may be controlled and moderated by a supervisor. In some embodiments, a learning object created by a teacher or modified by a teacher, may be published or otherwise shared with other teachers and/or with the teaching/learning system, and may thus become re-usable in other teaching/learning scenarios and instances. Accordingly, the product generated by a teacher, who creates or modifies a learning object (optionally using editor tools, step-by-step "wizard" tools" or the like) may thus become part of the teaching/learning system and may be used by that teacher or by other teacher in subsequent teaching/learning sessions.

Optionally, a digital learning object created or modified by a teacher, may include (or may be associated with) rules or scripts for dynamic adaptation or dynamic modification thereof. Optionally, a digital learning object may include "self-awareness" rules or "self-modification rules" which may dynamically modify the content of the digital learning object in real time in response to dynamic properties of the teaching/learning environment. In some embodiments, for example, a digital learning object may be adapted to automatically use a first set of vocabulary items when executed by a first-grade student or by a weak student, and to automatically use a second, different, set of vocabulary items when executed by a third-grade student or by an advanced student. In some embodiments, for example, a digital learning object may be pre-programmed to switch from a first set of vocabulary items to a second set of vocabulary items, based on the ongoing performance of that digital learning object by a student. In some embodiments, a digital learning object may be associated with various other rules that adaptively and/or differentially modify the digital learning object, or modify or replace the assets used therein (e.g., vocabulary, numbers, images, or the like), based on identity and properties of the student executing the digital learning object, based on past performance or current performance of the digital learning object by the student, based on external or environmental properties (e.g., extending the time or shortening the time allocated for completing the digital learning object, in response to an increase or decrease in the time allocated for the lesson), or other self-modification rules.

In some embodiments, the system utilizes voice recognition and/or speech recognition, for example, as a mechanism allowing the teacher to provide input, to provide commands, to perform RTCM operations, or the like. For example, the teacher station may utilize a voice recognition mechanism, including hardware components (e.g., a microphone) and software components (e.g., a software module that recognizes speech). The teacher station may be trained or adapted to selectively recognize the teacher's voice, and to selectively execute commands conveyed orally by the teacher; and to ignore, disregard, or not execute oral input or commands provided by students or other parties. For example, the teacher station may be adapted to recognize the phrase "projector on" (when said or pronounced by the teacher) and to turn on the projector in response; to recognize the phrase "projector off" (when said by the teacher) and to turn off the projector in response; to recognize the phrase "please look at me" (when said by the teacher) and in response to project (and/or send to all students stations) a message "please look at the teacher"; or other suitable commands. Speech recognition may be used by the teacher to perform RTCM operations, or to dynamically modify in real time learning objects and/or lesson plans; for example, the teacher station may recognize the phrase "lock the third learning object" (when said by the teacher) and in response may lock or "freeze" or disable the third learning object scheduled for utilization in the current lesson. Other suitable operations may be triggered using voice recognition and/or speech recognition, in addition to or instead of other types of input mechanisms (e.g., using a mouse, a keyboard, or the like).

The present invention may provide an Educational Adaptive Engine development environment for Data Driven Teaching; as infrastructure and modules supported by "building blocks", digital objects and files, components and interfaces; allowing developing, configuring and executing modular and flexible adaptive teaching/learning mechanisms, as well as the accompanying digital content needed for their execution. The system may utilize two interconnected or separate platforms, the Teach Platform and the Create Platform, which may be able to communicate with each other by utilizing pre-defined taxonomy of educational definitions and/or a set of parameters/operators; in a manner that that requires content creation and/or content utilization (e.g., including the configuration or real-time modification of content) without programing knowledge. The system may allow a computerized process which takes the teacher and the student from a conventional textbook to innovative Electronic Course (eCourse) teaching and learning environment.

The Teach Platform may comprise or may provide, for example: (a) Access to content repository of digital objects and (for teachers' choice) according to student's needs; such as, eBooks, predefined courses, banks of interactions; and allowing ongoing lesson planning and lesson modification, according to actual results. (b) Display of class/group/students profiles, including level and progress status, displayed to the teacher(s); with an intuitive UI that allows auto-grouping and re-grouping of students according to their accomplishment (subject to manual teacher's override); The system may identify the level of a student, based on his accomplishment(s) during interactions and assessment, thus keeping a continuously-updated student knowledge map. The system may also align all interactions with educational requirement such as state or common core standards. As the system holds and updates such information for the entire class (or for groups of students), the system may recommend assignment or division or allocation of the students into groups (and dynamic real-time re-allocation or re-grouping, based on dynamically-monitored accomplishments of individual students), such that all students in a group are of the same or sufficiently-close accomplishment level. The "boundaries" of a group (high and low marks for the students to be included in the group) may be pre-set (and locked) by schools administration, or may be left to the teacher's decision for dynamic modification. The teacher may choose to allow this process to be governed automatically by the system, or to allow the system to operate in "recommend mode" in which the system recommends actions that the teacher may accept or reject (or which may be automatically accepted unless the teacher over-rides within a pre-defined time period). In the "recommend mode", the system may "alert" the teacher about changes in student's accomplishment, for individual student(s) or for groups of students. This may be a note in "end of lesson" summary report, or a real-time alert in the real-time progress dashboard, or a special notice if and when the system realizes such recommendation is appropriate (e.g., student or students are currently performing below or above their set level. Once the teacher gets such recommendation, the teacher may choose to use the re-grouping interface and move (e.g., via drag and drop) students from one group to another group. A special case may be handled at the beginning of the school year, as the system has no data or little data for initial grouping; and a Placement Level Test may be performed and the system may assign or recommend group placement for all participating students; and optionally, the system may utilize historical data from a previous year, with regard to one or more students. (c) Content allocation for different groups of students and/or individual students; for example, allowing to serve them different educational content and different interactions (e.g., at different complexity or level), different scaffolding and support features (e.g., help, hints, tips, highlight and comments, number of allowed trials); (d) Adaptive generic engine for different adaptive learning implementations, which may optionally rely on content taxonomy and may be aligned with educational requirements (e.g., state standards); (e) Monitoring module, via real-time progress dashboard, end-of-lesson report, periodical reports; allowing effective formative assessment (e.g., real-time performance feedback) and continuous quality improvement in a virtual teaching-learning cycle; (f) Real-Time teaching and class management features, supporting messaging, spot check, polling, ensuring that all students are on the same page, allowing a student to "raise his hand" to answer or to pose a question by operating his computer station; and/or other suitable features.

The Create Platform may comprise an educational applications generation environment, featuring: (a) Pre-defined pedagogically designed interactions editing tools and templates; (b) Design and layout features at the user interface level (not requiring additional programming), with the ability to choose between Dynamic Layout (multi-platform, multi-resolution automatic layout) or Dynamic Layout Bypass; (c) Ability to keep original PDF design by adding hotspots to open the interactions, or ability to view the original PDF in the player while performing the interactions; the CGS has the ability to convert PDF files into HTML5, while keeping the original layout (book view). Interactions may be "linked" to selected places in the book view page. This may be done by specifying a link on text or picture or part(s) of picture (e.g., by marking a specific mark on the picture and defining it to act as a "hot-spot" that activates a link to the activity when clicked upon); (d) Standalone player (for running content on other platforms (e.g., LMS), or to wrap the content in a generic (or integrated, or flexible) player that allows the content to be played on other platforms and/or through other devices, as a stand-alone application or a native application. (e) Workflow management; (e) Content reuse (e.g., maintain one instance of content and re-use it with modifications); and/or other suitable features.

The combination of Teach and Create platforms allows realization of various pedagogic approaches, to facilitate and achieve the end-goal of Improved Students Achievement: teaching and learning in a variety of IT settings (one-to-one; one-to-class; class and home); gathering data from students' interactions during learning activities; executing different adaptive concepts and related teaching methodologies; pave a differential personal learning path based students' performance; interact or integrate with a variety of third party tools—to enhance school, class, student and lessons management; Content differential update, such that a new update affects only content of lessons that were not used. The digital educational content may be updated easily and efficiently, and this is of great value to content creator, publisher and authorities; but typically the content creator or publisher loses any knowledge about the digital content once it was published and released or distributed; such as, content that was used by a class, presented or assigned to the students and then interacted with, should not be changed or updated as an update will usually replace the interacted content and the data on student accomplishment may be lost. If content that was used by student is changed or updated, it may become different in his "lessons history" relative to what he experienced during class, causing possible confusion. The system may thus identify already-used content; if an update is issued and content is replaced in the content repository (library), it would be available for "new use" in the updated form but it will not over-write those lessons that were already used by teacher and students in class.

A Rule Engine controls the flow of the learning path. The rule engine may be built by utilizing a programming language composed of set(s) of API's to read user previous performance attributes, current performance attribute, and API that controls the "path" of the application (the learning path implemented by routing the user to the Next learning activity).

A user performance mapping module may create and utilize a data structure representing previous/predeceasing performance data; this data structure is a dynamic data structure allowing the implementer to store predeceasing information for user learning activities. The structure complexity depends on the adaptive learning methodology (may vary from a simple list of attributes to complex structures).

The set of learning activities may be a bank of digital learning objects (e.g., files, mini-programs, scripts) created by the content developer(s) and tagged with specific attributes to identify the learning activity difficulty, and other parameters.

Various approaches may be realized to achieve different adaptive concepts to facilitate personal learning path based on learning activities. The teacher may control the rules (through the teacher controlled Adaptive Model Rules Interface) and may selectively assign a different adaptive concept to groups or individuals.

The Technical Actions Flow module allows a teacher to assign different adaptive concepts to multiple (e.g., three) groups in the class: Bellow level students, on level students, and above level students.

In the lessons planning phase, the teacher accesses the planning section in the DTP and activates the teacher controlled Adaptive Model Rules Interface. The teacher may change the parameters of the rules according to the desired adaptive learning concept/method; (a) For below level students, defines that: all help, hints and examples are active and the student is assigned at least 10 repetitions of the activity with different data; (b) For on level students, defines that: only help and hints are active, and only after wrong answer; the student is assigned only 7 repetitions of the activity with different data, and only if he scores below 50% he will be assigned another set of seven; (c) For above level students, defines that: no help or hints are active; the student is assigned only 4 repetitions of the activity; if he scores below 50% he will be assigned only another set of 4; if he scores above 75% he will be assigned extra reading and a problem solving assignment.

In another implementation, all three groups are assigned to a placement test. Their accomplishments in the placement test are used for setting the adaptive rules for them: Students that accomplish poorly in spelling will be assigned more interaction that requires spelling of words. Students that had many mistakes in grammar will be assigned more interaction that strengthens their mastering of grammatical rules. Students that their performance indicated problems in understanding will receive more reading passages accompanied with a lot of scaffolding tools, if needed.

In another implementation, on-level and above-level groups of students, are assigned to adaptive rules; while bellow level students are not, and rather, the below-level students are addressed by the teacher and treated separately according teachers' understanding.

During class, each group of student receives on the screen the starting point content element (first LO) that is assigned to students of the group; and the adaptive engine controls the flow and assignment of the next content elements (second LO, third LO, and so forth) according to the rules set for the group.

In a first example, Student A who is bellow-level and student B who is on-level will both receive identical first and second LOs. These LOs include interactions (questions) that the way the students answers them indicates his level of understanding and ability to accomplish the task at hand. Student A performs badly which is an indication that he belongs to the bellow-level set of rules, so from the third LO onwards he will receive all interactions with help hints and examples. This will be the case with the ten (or other number of) the following digital Los; and if the system realizes that he is answering correct answers without accessing the help and hint scaffolding tools, then the following digital LOs will again be presented without scaffolding tools. Student B who performed better on the two initial digital LOs, will continue to receive LOs with no help or hint. If he performs properly, this will be the case for seven (or other number of) repetitions; but if he provides wrong answers then the system may offer him to try again and expose the help and/or hint options. If the help/hint indeed helped, and the student answers properly in most cases, then he will continue to the next step (and again will start with no help or hint exposed); but if he scores below a certain threshold (e.g., below 50%) then he will be assigned another set of 7 interactions of the same kind.

The present invention may provide a Course Browser utilizing Dynamic Layout (DL). Courses or LOs may run on various devices (e.g., desktop computer; laptop computer; tablet; smartphone; interactive board; eBook reader; multimedia player) with different screen size and/or screen resolution, and with different operating systems. The Course Browser adapts the pedagogical content to provide the best display on the relevant device. The Course Browser takes into account several factors by a machine or human when solving the best content layout on the screen or other display peripherals. Such factors may include, for example: (a) Mission factor, or Mission of the pedagogical activity, namely, the pedagogical content requirements for the specific activity, such as goals, activity characteristics, and the information presented to the user; (b) Environment factor, representing constraints for the content layout solution related to environmental factors, such as, user profile (age, special needs) and physical conditions (e.g., lighting conditions, measured ambient lighting; estimated user distance from the screen, particularly if the screen comprises or is associated with a projector or a smart-board, and optionally utilizing a camera or imager located in proximity to the screen, the camera or imager able to capture an image of the classroom or to capture a field-of-view, the camera associated with measurement logic or estimation logic to estimate distance of one or more students from the screen, based on size or relative size of image components, or based on other suitable parameters); the system will change font type and/or font size if needed, as well as image size; the system may maintain "pedagogic priority" and therefore resize or hide or replace with thumb-nail the less important content elements (from pedagogic point of view) while trying to keep the more important parts unchanged or "less changed". (c) Device factor, representing constraints for the content layout solution related to the device in use; such as, display (size, resolution, color depth, quality) input peripheral (mouse, keyboard, touch-screen, multi-touch screen, stylus).

In some embodiments, a Mission of a digital educational activity or LO may take into account goal(s) intended to be achieved, concept(s) intended to be conveyed and learned, information intended to be conveyed and learned, one or more tasks that need to be completed or performed (e.g., actual on-screen operations, or pedagogical tasks), one or more characteristics of the activity (e.g., is it text-based or graphics-based; is it audio-based or silent; is it timed or non-timed), and/or other suitable parameters.

The Technical Actions Flow may include: the publisher (content creator) uses the "Create" Platform or engine (or CGS platform) to define pedagogic rules that will guide the content browser's layout and behavior when played on different devices. The DL engine determines the purpose and/or the context of the elements that it needs to re-arrange; the basic component for the layout is a Task, and since the task is modeled to different elements (such as question, answer, bank of results) then the DL may apply pre-defined logic to the whole task to keep the pedagogical rational and not only a graphical basic lay-outing process (like a web-browser may do. Some embodiments may perform DL of visual elements of a digital educational learning object, based on (or by taking into account), for example, pedagogic requirements, pedagogic constraints, pedagogic standards, pedagogic importance or significance of visual elements, priority order of pedagogic requirements or constraints, standards or guidelines for accessibility for disabled persons or for students with special needs, or the like.

When creating content, the publisher uses a Pedagogical Constrains Setting Interface to apply desired pedagogical constraints for the course content; for example, no scroll per task; no text reduction; no image reduction; image must be shown together with the text of the question, side-by-side or one above the other; image may be replaced by thumb-nail that will launch a floating image window; all elements except for the interactive applet can be resized; no element can be resized except for a given list of elements which can be hidden and replaced with icons or thumb-nails that will un-hide them when clicked; question and answers must be shown all the time, while accompanying elements such as explanatory drawing may be hidden/un-hidden or activated in a floating window.

The Content Editor creates course content (e.g., feeding text, images, and other content elements). When the content is played (in the Create Platform's preview module, or in the Teach Platform playback module), the Content Browser automatically and dynamically determines or generate or modifies the layout of publisher's content, based on: Device type; given and/or available on-screen real-estate (e.g., available screen size, in pixels; the view port of an electronic device); layout rules which may be general for a group of content items, and/or may be specific for a student or a group of student, and/or may be specific for a particular date or time or location; content characteristics (e.g., type, amount); the publisher's predefined pedagogical constraints.

In a first example, the dynamic layout module of the Teach Platform may present the same LO in two different manners, for a laptop computer having a generally-horizontal screen or Landscape-type display, and for a tablet having a generally-vertical screen or a Portrait-type display. For example, in a landscape-type display unit, the Teach Platform may arrange side-by-side internal components of a particular LO (e.g., a graph chart, side-by-side with a yes/no question or a multiple-choice question); whereas, in a portrait-type display unit, the Teach Platform may arrange such internal components of the LO one on top of the other (e.g., a graph chart on top of the yes/no question or the multiple-choice question). Optionally, the font size may automatically adjusted, and/or graphic elements may be automatically resized, in order to accommodate a particular display type or size.

In a second example for dynamic layout, a list of four graphical items, (A) may be presented as a horizontal list of four graphical items side-by-side on a first device having sufficient landscape-type display (e.g., a laptop computer having screen ratio of 16:9); and (B) may be automatically adjusted to be displayed as a vertical list of four graphical items, one on top of the other, on a second device having narrow horizontal space or having portrait-type display (e.g., a smartphone held in portrait mode); and (C) may be automatically adjusted to be displayed as a matrix of two-by-two graphic elements, on a third device having medium-level of horizontal display capacity (e.g., a laptop computer having screen ratio of 4:3, or a tablet held in landscape mode, or a smartphone held in landscape mode).

In another example, if there is insufficient on-screen real-estate for all the four graphical items on the screen when their aspect ratio is maintained, then the DL engine may determine to show one item in original size while the other three items are reduced to thumb-nails; when a one of the reduced three is clicked, the full-size item is reduced to thumb-nail and the "clicked" item is shown in full size, thereby allowing efficient utilization of limited on-screen real estate, to interactively present multiple elements by taking into account a small or limited form factor.

The platforms of the systems may include a "Stop Line" module, enabling a teacher to control and to plan in advance, how far the students (or all students in class, or a group of students, or an individual student) would be authorized to progress in the educational content items for a specific lesson and/or for a specific course. The stop line may be dynamically adjusted during the lesson, by the teacher. By using the Technical Actions Flow, in the planning phase, the teacher indicates the last activity or interaction or LO that the students (or some of them) get access to; and may assign or define different "Stop Line" to different students or to different groups of students. In class, when the student reaches the last activity/interaction that the teacher set for him (or for his group), an indication will pop-up on the student's station, telling the student that he completed his task(s) for the current time point, and that he cannot continue to further tasks, and/or that he should approach the teacher or communicate with the teacher electronically or otherwise. The teacher may dynamically adjust the Stop Line for the class, a specific group or individual.

In some implementations, once student A reaches his Stop Line, the teacher station may automatically generate a notification to the teacher about this event; and may query the teacher, whether the teacher would like to extend the Stop Line by one or more activities, or by a pre-defined number of learning activities (e.g., towards a "secondary" Stop Line which may be pre-defined by the teacher). In some implementations, the teacher may define in advance a primary Stop Line, and a secondary Stop Line that the system would utilize automatically, as a default extension, once the student reached the primary Stop Line and provided that the teacher did not intervene (e.g., within 15 or 30 seconds of receiving a notification of this event) by commanding not to extend the primary Stop Line.

In another example, the teacher may use the Stop Line feature for controlling "pre-lesson reading" (or "pre-lesson practice") activities. For example, the teacher wants the student(s) to read a certain passage and prepare for a class discussion; and the teacher wants them to read up to a certain point only (as the rest of the passage comes up with solutions or conclusions which will may harm or prevent an open discussion). Therefore, the Stop Line is placed by the teacher at the desired point, preventing any further reading of the content at student stations. A Stop Line may be "conditional", such that, if a student scores above a predefined threshold then he will be stopped at a certain point; while another student that scored below the threshold would be stopped at another point, allowing such students to selectively be authorized to read (or view) less content or more content (according to the case, the nature of the text or the level of interactions). Other suitable mechanisms may be used.

Some embodiments may utilize a "Follow the Teacher" module, enabling the teacher to force all students (or a group of students in class) to be "on the same page/place" as the teacher wants them to be, within a sequence of multiple LOs or digital activities, in order to explain a specific matter; even if the student is currently working individually and/or a-synchronously on another task via his student station. The content publisher may create or define lessons or tasks, which should be displayed and/or performed during a "Follow the Teacher" mode of synchronous teaching/learning. In the content authoring phase, the content creator may set an entire lesson, or a specific set of activities, to be displayed and/or performed (e.g., by all students, or by a group of students) in "Follow the Teacher" mode. If set for this mode, then the content on students' devices will advance only if and when the teacher "activates" it for re-advancing or for reverting back to the content that each student was consuming or performing prior to the "Follow the Teacher" mode (e.g., which may be saved temporarily using a Save State module). In the planning phase, the teacher may indicate that an entire lesson, or a specific set of activities, would be displayed or performed in "Follow the Teacher" mode. In Class, content chosen by the teacher for "Follow the Teacher mode" will be exposed on the students' devices, only if and when the teacher "activates" the "Follow the Teacher" mode from the teacher's station, for the entire class or for a subset or group of students (e.g., optionally allowing one or more students, such as advanced students, to continue working on their current tasks, optionally utilizing their headphones for audio).

Some embodiments may utilize an "Eyes to the Teacher" module, allowing the teacher to command, through the teacher's station, that: (a) all the student stations (or a subset or group thereof) would "freeze" or pause the current activity of each student; and/or (b) all the student stations (or a subset or group thereof) would block students from further interacting (e.g., by causing all input units, keyboards, mouse devices, touch-screens, to become non-responsive); and/or (c) all the student stations (or a subset or group thereof) would display a teacher-defined message or notification, such as, "Please pause your current work and turn your eyes to the teacher". In such mode, the system may Save State of each student station, and may Resume that state once the teacher subsequently de-activates (or terminates) the "Eyes to the Teacher" mode. In some embodiments, the "Eyes to the Teacher" mode may be selectively activated by the teacher, for example, selectively towards a student or a group of students that the teacher would like to "freeze" their current on-screen interactions (e.g., a disobedient student or a noisy student, that the teacher wants to talk to, while the student's station is paused remotely per the teacher's command).

The Create Platform may include an educational application generation environment or suit of modules; an authoring suit that allows the creation of Educational Interactive Applications, without the need for programming skills. The Create Authoring Environment allows authoring and publishing of digital interactive content, using: (a) General Purpose Educational Interactions Bank, a set of educational computerized pedagogical interactions authoring tools that are covering most of the pedagogical needs serving to develop computerized educational content; and/or (b) Educational Applications (Applets), small applications that are designed to convey a pedagogical concept (e.g., probability, number-line, text analysis). The Create environment provides the set of tool to generate such applets. The "end product(s)" comprising interactive elements Educational Interactions and Applets, are then combined into lessons and courses, to be published as a Teach lesson or as Educational Applications. The Create "Toolbox" offers all that is needed for the generation of General Purpose Educational Interactions and Educational Applications (Applets); and may optionally utilize eWidgets (Applet "Templates" and/or Applet APIs)—a set of pre-defined concepts, structures, interfaces and building blocks that allow the creation (without programming skills) of educational computerized components (eWidgets) that can become the foundation of an applet and later on be "plugged-in" into educational application(s). Multiple "atomic" digital LOs may be combined or assembled, in advance and/or dynamically in real time, into a "molecular" digital LO; utilizing a "controller" element which manages or controls their sequence or their conditional playback (e.g., if student performed Atomic LO successfully, then proceed to another atomic LO; otherwise, proceed to a third atomic LO). This may be applied to generating applets; authoring of smart educational applets may be based on more than one eWidget combined together with a controlling component of "logic" that governs the relations (and/or conditioning, and/or sequencing) between the widgets. For example, to create a "Live Text" applet, the creator may utilize (a) an eWidget of text display with capability to highlight text elements, (b) another eWidget that may include lists of text rules or components (one displaying tenses—past, present, present progressive, future; another displaying the parts of speech); (c) combining these two with a relations logic eWidget to create an applet of Live Text, that highlights sentences in the text according to the choice in the text components lists; (d) an API eWidget may allow integration of the Applet into a learning interaction that makes use of the applet and General Purpose Educational Interactions such as questions, that in order to answer them the student may need to operate the Live Text applet. The applet in turn, may be loaded with text passages and perform "live text" highlighting as an assistive tool for study of grammatical text elements while the General Purpose Educational Interactions are loaded with specific questions that relate to the text passages and to the highlighted parts-of-speech. Other eWidgets may be "construction" elements (or building blocks) for: mathematical applets (e.g., relation between elements; mathematic and graphic presentations of functions); science or technology applets (e.g. changing an experiment results by controlling conditions or parameters); or the like. The "Controlling" or managerial eWidget element may provide "API features", allowing interaction and data exchange between General Purpose Educational Interactions and Applets (that were generated based on these eWidgets), as well as interchanging of data and commands with the Teach (DTP) platform. These eWidget allow the system to Save State, as well as Teacher Controls (such as Stop Line, Follow the teacher, Eyes to the teacher), updates to teacher's dash-board in real time, and storage of students' scores or progress data for analysis and reporting.

The Create Publishing Environment allows publishing of educational interactive content in various ways, including: (A) Automatic publishing, first publication as a lesson to be run on the Teach platform; and content update (a differential update of content that will affect only content of lessons that were not used in class), such as a differential content update ability which allows for ongoing improvement of the content (without changes to content that was used in class); while on the other hand, classes and/or students that never accessed and used this content may benefit from the update (which is generally developed to introduce improvements, add or delete text, images or interactions according to feedback from users, or to correct mistakes). The added value is educational and/or pedagogical: once a teacher/class/students used a portion of digital educational content (course/lesson), then this content becomes (a) basis for future steps of learning in the same course, (b) basis for assessment of accomplishments of the students (e.g., questions in assessment events are based on this content), (c) "revision content" for the students when preparing for test (as this chunk of content is part of their learning history). Once introduced to a class and studied (interacted) by the students, this content must not be changed for the students of this class (at least not as long as the school year is not finished, or as long as the teacher did not indicate willingness for refreshing). The automatic differential update may be over-ridden by a teacher (e.g., if he wants to re-teach the course/lesson to the same class) by choosing a "refresh content" order that empties all the content from all students' interactions with it. In this case the content will become "unused" and will be updated as any unused content. (B) Package and Publish, as a Sharable Content Object Reference Model (SCROM) package, an Educational Application. (C) Data driven publishing; when run on the Teach platform, the content is continuously monitored and reported to the Create user and the system may perform analysis of the usage reports of the educational computerized content (from large numbers of students), allowing constant improvement of the content. Accordingly, the system gives the content publisher an ongoing picture and feedback about his released content, and may save him a lot of time and efforts (as the Teach platform can provide him with information that otherwise could only be gained by distributing a preliminary "draft" version to some testing schools/classes or "focus group", monitor their use, and gather information about their satisfaction and accomplishments). The monitoring, recording and reporting features of the Teach platform can send to the Create platform valuable information. Based on this feedback data, the publisher/author of the content may: (a) understand user's satisfaction, based on usage reports providing information indicating what parts or types of content are used by more users and/or more frequently than other parts (and use the "wisdom of the crowd" to improve the content product); (b) understand if the content is aligned with students' understanding level and abilities (at a certain age group), based on usage reports that can indicate too complicated (or too difficult) interactions (e.g., intense "trial and error" type of use, or intense use or "hints" and "helps" by on-level and above-level students) or too simple (or "easy") interactions (e.g. all answers are correct—even from bellow level students, or the time taken by the students to answer a chunk of interactions is much shorter than planned/estimated) (c) understand if questions in the content are written properly, based on correct/incorrect answers (e.g., an overwhelming number of mistakes in answers for a question may indicate un-clear use of language in the question, or misleading/distracting wording in the question or answer options).

In another example, when using the Create platform to generate lessons and interactions by school teachers; adapting content for use by colleagues and the results of use by their students may serve as "wisdom of the crowed" to correct mistakes or to improve quality of the lesson flow and the integrated interactions and/or applets. For example, Teacher A creates a digital learning unit about ratios in math, comprising of 5 lessons; each lesson includes a solved example of an exercise in ratios, and ten exercises for practice by students, and a Ratios Applet that combines and presents different presentations of ratios (e.g. painted/unpainted areas, dilutions of colored liquid in clear water, numbers of individual under a certain age in a crowd) and equivalent mathematical expressions like A:B or C/D) and may be called and used by the students as a scaffolding tool. The lessons are imported for use by 4 fellow teachers and assigned by them to their 100 students within a week. The content creator Teacher A, who is recognized by the system as the lessons' author, queries the Create platform to generate a usage and progress report from all the users of this digital learning unit on the Teach platform. The report is generated, indicating that 80% of students failed most of the exercises in the third lesson. Teacher A checks the third lessons' interactions and the Ratio Applet, and finds that the wording used in the Applet for the representations of the colored liquid dilutions in water and the wording used in the exercises are not the same, indicating a possible cause for confusion. Teacher A modifies the wording accordingly. The report is also indicating that in the fifth lesson, about 90% of the students (even those in the below-level groups) have completed successfully the given exercises within about 35 percent of the predicted or planned or allotted time. Teacher A checks the fifth lesson's interactions descriptors, and finds out that he published for that lesson a copy of those interactions already published in the fourth lesson; Teacher A then edits lesson the fifth lesson to include the right questions and to re-publish the entire unit.

The present invention may include an adaptive teaching/learning system or a Digital Teaching Platform (DTP) or a Learning Management System (LMS) which may present digital learning objects to students who utilize student stations or other suitable electronic devices. Each student may utilize a student station or student device (e.g., a desktop computer, a laptop computer, a tablet, a smartphone, or the like) which may present to the student interactive digital educational content, for example, a story having text and/or audio narration, a quiz, questions having multiple-choice answers, questions or phrases with "fill in the blank" regions, math questions, reading comprehension, or the like. A server computer may dynamically allocate different digital learning objects to different students who utilize, in turn, different student stations or devices; thereby allowing differential and adaptive teaching. For example, the server may adjust, add, remove or modify one or more features of a digital learning object (e.g., add or remove audio narration; add or remove an on-screen calculator; add or remove an on-screen numbers line; add or remove an on-screen dictionary or thesaurus or word-bank tool), to accommodate a particular need or a particular ability (increased or decreased) of a particular student. A teacher station may be used to manage the teaching/learning in real time; to selectively modify in real time, while class is in session, parameters of digital learning object(s) of one or more student stations (e.g., adding more time to complete a task; adding or removing on-screen tools); as well as to allocate or re-allocate digital learning objects to various student stations (e.g., change order of previously-allocated digital learning objects; add or remove a digital learning object for one or more student stations). The teacher station further allows the teacher to view, in real time, the progress of each student in completing tasks using his/her student station; and further allows the teacher to view cumulative data, historic data, data related to performance of a group of students, or the like. The system may further include automatic Computer Aided Assessment (CAA) modules, modules for repetitive training or "drilling" of particular subject matters, alert modules, reporting modules, or the like.

The present invention may automatically or semi-automatically generate Digital Learning Objects (DLOs), which may then be used by the teaching/learning system in order to present interactive pedagogical tasks that students can engage in, using her student stations.

For example, a DLO generator may include the following units, which may be implemented using suitable hardware components and/or software modules:

(1) An input unit able to receive educational content or pedagogical content, which may typically be in a non-interactive format. The input may be, for example, a Portable Document Format (PDF) file or document, and may include text and/or images. Other suitable input file(s) may be used, for example, a Microsoft Word file or other word processing file; a Microsoft Excel file or other spreadsheet file; a Microsoft PowerPoint file or other presentation file; a Rich Text Format (RTF) file; a text file (TXT); or the like.

(2) An optional Optical Character Recognition (OCR) module, which may optionally perform OCR on the input file in order to convert bitmap-based data into distinct textual characters which may then be further utilized by the system.

(3) A converter module to perform a preliminary step, in which the non-interactive initial input (for example, the PDF file) is converted to a format or language or representation which may be interactive or may be suitable for further conversion into an interactive applet. For example, the converter may convert the initial PDF file into an HTML5, which may be visually identical (or generally, visually similar) to the visual appearance of the initial PDF file.

(4) An element identifier module, which may analyze the converted version that the converter produced, in order to identify one or more elements, visual elements, textual elements, visual elements, patterns, or the like. For example, the element identifier module may identify a header, a footer, a title, an introduction region, an image, a question region, an answer region, a multiple-choice question, items that comprise a set of multiple-choice answers, a math question, an open question, a fill-in-the-blank question or sentence, a doze, a matching task, a narrative, a free text box, or the like. The user may configure the element identifier module to identify other suitable types of elements, based on other pre-defined criteria.

(5) Optionally, the identification may be performed based on contextual analysis; based on recognizing that a certain textual component is a question (e.g., ending with a question mark; beginning with a question word such as "who" or "what" or "where" or "when" or "why"); based on recognizing that a portion of the content is a list of items (e.g., four multiple-choice answers preceded with "a", "b", "c" and "d", and optionally starting with the word "because"); based on identification of a particular term or phrase from a pre-defined list or table of phrases (e.g., "Please choose the most accurate answer", or "Which one of these is true"); based on identification of action words or commands (e.g., "calculate", "explain", "describe", "fill-in", "solve", "demonstrate"); and/or based on other suitable attributes or criteria.

(6) A manual mover module, providing the user a drag-and-drop interface (or other suitable interface), such that a user may review the converted data and may "select and drag" portions thereof (or otherwise "move" portions thereof) into one or more pre-defined areas or regions. For example, the user may drag a question sentence from a first portion of the screen (which shows the PDF to HTML5-converted content) towards a second portion of the screen (which shows, for example, a first region for a Story, a second region for an Image, a third region for a Question, a fourth region for Answers, or the like). The user may thus drag-and-drop portions of the original PDF file, which have been converted automatically into HTML5 elements, onto particular regions or place-holders in a template. The manual mover module may also include a labeling module, allowing a user to create or modify a label of a selected portion of the content, for example, in case the pre-suggested labels (e.g., Question, Answers, Story) are not suitable.

(7) An automatic mover module, which automatically moves or copies identified elements into particular regions or place-holders in a template; for example, moving or copying the text of an identified Question sentence, into a place-holder or box for a Question in the template; moving or copying the text of identified multiple-choice answers, into the corresponding place-holder(s) or region(s) in the template; or the like. The automatic mover module may also include a labeling module, able to create or attach a label (e.g., from a pre-defined pool of labels) to various elements in the template.

(8) A flow management module, which may automatically manage the process in which the DLO generator identifies elements of the initial contents, and places them into a suitable DLO template.

(9) A template selector, allowing manual selection by the user of a suitable DLO template for a particular initial input file, and/or allowing automatic selection by the system of a suitable DLO template for a particular initial input file. For example, based on initial analysis by the element identifier module, the DLO generator may determine that the initial input corresponds the best to a math-question template, and thus the template selector may automatically select a DLO template which suits a math question.

(10) Optionally, a DLO compiler module, able to take the DLO template in which the user and/or the system inserted content into particular place-holders or regions or boxes; and able to generate from that template, and its content, an interactive DLO based on pre-defined rules that are associated with the DLO template being used (or, based on pre-defined rules that are associated with the boxes or place-holders within that DLO template). The DLO compiler module may not necessarily compile an executable file, but rather, may be able to generate a DLO in an interactive format or in a rich-media format, for example, HTML5, JavaScript, Adobe Flash, Adobe AIR, Ajax, Flex, Rich Internet Applications (RIA), Java, an applet, an embedded element, a rich media element, a stand-alone element, an element displayable via a Web browser, an element able to run in a browser-less environment (e.g., utilizing an operating system or a particular runtime environment)

For example, a DLO template may be associated with pre-defined rules, or with a script or a flow, which dictates an order of presenting items on the screen, an order of presenting output and receiving input, or the like. For example, a "story-question-answer" DLO template may be associated with a script or a flow, such that at first the user is shown the story, optionally with audio narration (e.g., using an automated text-to-speech converter); then, after a pre-defined period of time (e.g., 60 seconds), the question element appears, and multiple-choice answers appear; then the user is prompted to select an answer, and the flow continues to provide feedback to the user on his/her choice of answer (e.g., "you are correct" or "you are incorrect, try again").

In another example, some DLO template elements may be associated with particular rules or a script or flow pertaining to their own behavior. For example, a "multiple-choice answers" element may be associated with a user interface that allows the user to select one answer (e.g., "radio buttons") or to select multiple answers (e.g., check-box elements).

(11) A DLO transporter, able to transport or copy the generated DLO to a proper storage device, DLO repository, cloud-based storage or repository, network location, student station, server, remote location, or other suitable destination in which the DLO may be stored and/or may be interacted-upon.

(12) A user-generated content module, allowing a teacher or other user to view and modify already-existing educational content, and to convert it into (or save it as) a new DLO; or to import or input content into a previously-created (e.g., empty or partially-filled) DLO; or to create a new DLO starting from scratch (e.g., a simple DLO having few boxes or place-holders, or a more complex DLO associated with various scripts or flows or rules). Optionally, a DLO editor/modifier module may be used, allowing the teacher or user to view, modify and/or edit a previously-created DLO.

Some embodiments of the present invention may allow an educator or other user to easily and efficiently convert, in an automatic or semi-automatic computer-aided process, a PDF file (or other suitable non-interactive content container) into an interactive DLO, or to perform a "save as" operation of a content file into a DLO format or structure.

The present invention may include a system and method for enabling and administering adaptive teaching in a learning environment with digital devices. The system may be based on automated content conversion, from any digital format of "TextBook" (PDF, ePub, Rich text), into a format that allows the system and its users (a teacher or any authorized authority) to create, modify, administer and manage an "eCourse" (based on that TextBook), that may be run on any computerized device (smart-board, laptop, tablet, desktop computer, smartphone, electronic reader, eBook reader). The teaching/learning system may enable the teacher, by using a teacher station or other suitable computerized device, to do one or more of the following: (1) Import a digitized textbook (converted and enhanced to the system's course format) from a catalogue or repository or local source or remote source; (2) Modify flow of the course (e.g., edit or modify or re-arrange the Table of Content (TOC) and/or related content), to fit a preferred teaching flow, learning environment (classroom, synchronous online teaching/learning, non-synchronous or a-synchronous online teaching/learning), and teaching method being used; (3) Modify the educational content to fit learners (group, individuals) and their learning needs (difficulty level, learning style, limitation, disability, special ability or advantage), by adding (or removing) any type of files or any element or application-element; by editing the course interactive content; by adding user interactive generated content (from provided tools within the system); (4) Manage the content allocation to students (group, individuals), in and out of the classroom (or in and out of lesson sequence); (5) Monitor student progress and interactions with the content, in real time, and while generating real-time alerts and notifications to the teacher about progress of one or more students, groups of students, and the entire class; (6) Control students activities and communicate with them (in real time, and/or beyond the lesson time period); (7) Review and grade students' submitted work, and send-back to students the graded or commented work or assignments or homework, for the students to further review; (8) Generate and/or receive analyzed reports on students' performance, with regard to individual student, a group or subset of students, or an entire class.

The teacher may be able to react to students' progress based upon dashboard indications and notifications, and may check why progress is slow or why certain students are making too many mistakes; he may activate the "All eyes to the teacher" feature, or may address a single student (or a group of students in the class) that has problems, while others are doing their independent work on their stations. The teacher may change or edit lesson flow or lesson content, typically after the lesson ends, in response to the "End of lesson report" or to reports of assessment events. The "planning like" activities that a teacher may perform in real time, while the lesson is in progress, may include, for example, changing or moving or dragging the Stop Line to a new location; dragging a students' name/avatar/icon from one group to another group (or otherwise modifying groups, or re-grouping students); writing a comment or "virtual sticky note" to himself with regard to particular student(s) or topics or content; or the like. Optionally, some implementations allow the teacher to perform in real-time while the lesson is in progress, or subsequently after the lesson has ended, one or more modifications and/or changes as described herein.

In some embodiments, a method of computerized teaching may comprise: (a) storing in a repository multiple digital learning objects that are tagged in accordance with pedagogical requirements; (b) based on a pre-planned digital lesson plan, controlled from a teacher device, selectively allocating digital learning objects to interaction by individual students utilizing student electronic devices; (c) based on analysis of student interactions with digital learning objects through the student electronic devices, automatically grouping each student into one of three groups which comprise: (i) a below-level group of below-level students, (ii) an on-level group of on-level students, (iii) an above-level group of above-level students; (d) dynamically allocating (A) a first digital learning object having an increased level of student-oriented help, to be performed by the below-level group of students, (B) a second digital learning object having an average level of student-oriented help, to be performed in parallel by the on-level group of students, (C) a third digital learning object having a reduced level of student-oriented help, to be performed in parallel by the above-level group of students; (e) generating on a teacher station, which is associated with said groups of students, an on-screen drag-and-drop interface enabling a teacher to re-group students by moving a particular student between two of said groups, in real time while a lesson is in progress; wherein generating the drag-and-drop interface comprises: generating an interface enabling the teacher to over-ride a pre-defined grouping that had been automatically generated by an adaptive learning management system.

In some embodiments, the method may comprise: adding to said repository an educational digital learning object that was created by a content developer; serving said educational digital learning object to a plurality of students utilizing a plurality of electronic devices; monitoring progress and accomplishments of said students interacting with said educational digital learning object; sending to said content developer a report about the monitored progress and accomplishments of said students, wherein the report indicates a potential problem with a particular portion of said educational digital learning object.

In some embodiments, the method may comprise: determining that the percentage of students, who interacted with a particular question and also failed said particular question, is excessively greater than a pre-defined adequate failure rate; generating said report indicating that said particular question potentially requires correction by the content developer due to excessive failure rate by students.

In some embodiments, the method may comprise: determining that the percentage of students, who interacted with a particular question and also solved successfully said particular question, is excessively greater than a pre-defined adequate failure rate; generating said report indicating that said particular question potentially requires correction by the content developer due to excessive success rate by students.

In some embodiments, the method may comprise: receiving from a content creation platform, an educational digital learning object that was developed by a content publisher; publishing the educational digital learning object to a content consumption platform, in which a plurality of student devices consume said educational digital learning object; at the content consumption platform, monitoring progress of said students and their interaction with said educational digital learning object; at the content consumption platform, generating an aggregated report reflecting aggregated automatically-generated feedback to said educational digital learning object; sending the aggregated report to the content publisher.

In some embodiments, the method may comprise: receiving from a content publisher, an update to a digital learning object that is stored in said repository; selectively updating said digital learning object, only relative to students that did not yet interact with said educational digital learning object, and while maintaining un-modified said educational digital learning object for students that already interacted with said educational digital learning object.

In some embodiments, the method may comprise: receiving from a content publisher, an update to a digital learning object that is stored in said repository, and that (A) was used by a first class of students, and (B) was not already used by a second class of students, and (C) was already used by some but not all of students of a third class of students; selectively updating said digital learning object, only relative to the students of the second class, and not relative to the first class and the third class.

In some embodiments, the method may comprise: automatically allocating additional digital learning objects, only to above-level students.

In some embodiments, the method may comprise: automatically allocating additional on-screen help tools, only to below-level students.

In some embodiments, the method may comprise: generating an adaptive rules engine interface, enabling a teacher utilizing a teacher station, to define one or more rules that define differential allocation of digital learning objects to students of the on-level group, to students of the below-level group, and to students of the above-level group.

In some embodiments, the method may comprise: generating an adaptive learning path interface, enabling a teacher utilizing a teacher station, to define one or more rules that generate differential paths of digital learning to different groups of students.

In some embodiments, the method may comprise: generating a pre-defined sequence of digital learning objects, intended for individual interaction by each student in a class; defining a first stop-line indicating that a first group of students in said class is authorized to interact with a particular portion of the sequence of digital learning objects, wherein the particular portion of the sequence ends at said first stop-line; defining a second stop-line indicating that a second group of students in said class is authorized to interact with a certain portion of the sequence of digital learning objects, wherein the certain portion of the sequence ends at said second stop-line.

In some embodiments, the method may comprise: generating a drag-and-drop interface enabling the teacher, via the teacher station, to modify in real-time at least one of the first stop-line and the second stop-line.

In some embodiments, the method may comprise: generating a pre-defined sequence of digital learning objects, intended for individual interaction by each student in a class; defining a first stop-line indicating that the on-level group of students in said class, is authorized to interact with a first portion of the sequence of digital learning objects, wherein the first portion of the sequence ends at said first stop-line; defining a second, advanced, stop-line indicating that the above-level group of students in said class, is authorized to interact with a second, advanced, portion of the sequence of digital learning objects, wherein the second portion of the sequence ends at said second stop-line.

In some embodiments, the method may comprise: generating a drag-and-drop interface enabling the teacher, via the teacher station, to modify in real-time at least one of the first stop-line and the second stop-line.

In some embodiments, the method may comprise: retrieving from said repository a particular digital learning object; performing dynamic layout of said particular digital learning object, to adjust visual elements of said particular digital learning object for presentation of different electronic devices, by taking into account at least: (A) an available on-screen resolution of a view port of an electronic device, and (B) pedagogic importance of one-or-more visual elements.

In some embodiments, the method may comprise: retrieving from said repository a particular digital learning object; performing dynamic layout of said particular digital learning object, to adjust visual elements of said particular digital learning object for presentation of different electronic devices, by taking into account at least: (A) a screen orientation of an electronic device, and (B) pedagogic importance of one or more visual elements.

In some embodiments, the method may comprise: retrieving from said repository a particular digital learning object; performing dynamic layout of said particular digital learning object, to adjust visual elements of said particular digital learning object for presentation of different electronic devices, by (A) re-arranging a series of visual elements as a horizontal list on a first electronic device, and (B) re-arranging said series of visual elements as a vertical list on a second electronic device, and (C) re-arranging said series of visual elements as a matrix on a third electronic device; wherein said re-arranging is based on both (i) a form factor of each said electronic devices, and (ii) a pedagogic goal intended to be achieved by said particular digital learning object.

In some embodiments, the method may comprise: retrieving from said repository a particular digital learning object; performing dynamic layout of said particular digital learning object, to adjust visual elements of said particular digital learning object for presentation of different electronic devices, based on pedagogic priority of said visual elements.

In some embodiments, the method may comprise: retrieving from said repository a particular digital learning object; performing dynamic layout of said particular digital learning object, to adjust visual elements of said particular digital learning object for presentation of different electronic devices, by taking into account one or more accessibility standards for students having special needs.

In some embodiments, the method may comprise: retrieving from said repository a particular digital learning object; performing dynamic layout of said particular digital learning object, to adjust visual elements of said particular digital learning object for presentation of different electronic devices, based on estimated distance of a user from each said electronic devices.

In some embodiments, the method may comprise: retrieving from said repository a particular digital learning object; performing dynamic layout of said particular digital learning object, to adjust visual elements of said particular digital learning object for presentation of different electronic devices, (A) by reducing a size of at least one visual element having reduced pedagogic significance, and (B) by maintaining a non-reduced size of at least one visual element having increased pedagogic significance.

In some embodiments, the method may comprise: retrieving from said repository a particular digital learning object; performing dynamic layout of said particular digital learning object, to adjust visual elements of said particular digital learning object for presentation of different electronic devices, (A) by maintaining a non-reduced size of at least one visual element having increased pedagogic significance, and (B) by replacing a visual element, having reduced pedagogic significance, with a thumbnail representation of said visual element.

In some embodiments, the method may comprise: retrieving from said repository a particular digital learning object; performing dynamic layout of said particular digital learning object, to adjust visual elements of said particular digital learning object for presentation of different electronic devices, by resizing visual elements, that have reduced pedagogic importance, at a greater resizing ratio relative to a resizing ratio of visual elements having increased pedagogic importance.

In some embodiments, the method may comprise: retrieving from said repository a particular digital learning object; retrieving from said repository a set of pedagogic constraints that are pre-associated with visual elements of said particular digital learning object; performing dynamic layout of said particular digital learning object, to adjust visual elements of said particular digital learning object for presentation of different electronic devices, by taking into account said set of pedagogic constraints.

In some embodiments, the method may comprise: retrieving from said repository a particular digital learning object; retrieving from said repository a set of pedagogic constraints that are pre-associated with visual elements of said particular digital learning object; performing dynamic layout of said particular digital learning object, to adjust visual elements of said particular digital learning object for presentation of different electronic devices, by taking into account said set of pedagogic constraints; wherein the set of pedagogic constraints comprises at least a constraint that a particular graphic element should always be shown in proximity to a particular textual element.

In some embodiments, the method may comprise: (a) generating a sequence of digital learning objects, intended for individual interaction by each student in a class, utilizing individual electronic devices; (b) at a point in time, in which a first student reached a first digital learning object in the sequence, and in which a second student reached a second, more advanced, digital learning object in the system, receiving from a teacher device a command to temporarily unify current sequence location for all students in the class; (c) in response to the command, temporarily modifying the content shown on all student devices, to show the same digital learning object selected by the teacher from said sequence of digital learning objects, and while saving state of each student device prior to said modifying; (d) in response to a further command to return to individual work, modifying back the content shown on all student devices, to show the content based on the saved state of each student device.

In some embodiments, the method may comprise: (a) generating a sequence of digital learning objects, intended for individual interaction by each student in a class, utilizing individual electronic devices; wherein the sequence reflects a pre-defined flow and timing for gradual release of digital learning objects to be accessible by student devices; (b) un-authorizing interaction of all student devices with all the digital learning objects of said sequence, except for one or more digital learning objects that the sequence determined to be released for interaction; (c) via a teacher station, gradually and selectively releasing an additional digital learning object from said sequence, to be authorized for interaction by student devices, and while maintaining subsequent not-yet-released digital learning objects as non-accessible by student devices until a subsequent release command is generated by the teacher station.

In some embodiments, the method may comprise: packaging a set of digital learning objects as a stand-alone package comprising (a) a user-defined sequence of performing the digital learning objects, and (b) a stand-alone playback module to playback the digital learning objects in accordance with said sequence, autonomously on a different platform.

In some embodiments, the method may comprise: packaging a set of digital learning objects as a stand-alone package comprising (a) a user-defined sequence of performing the digital learning objects, and (b) a stand-alone playback module to playback the digital learning objects in accordance with said sequence, autonomously on a different platform, and (c) an Application Programming Interface (API) module to enable inter-communication between the stand-alone package and a different Learning Management System (LMS).

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method implementable on a computerized system that comprises at least a hardware processor and a memory unit, the method comprising:
   (a) at a Digital Learning Object (DLO) transporter unit that is implemented at least by said hardware processor and said memory unit, storing in a repository multiple digital learning objects that are tagged in accordance with pedagogical requirements,
   and further storing metadata that describes:
   (i) features of each DLO of said multiple DLOs,
   (ii) parameters of each DLO of said multiple DLOs,
   (iii) a relation between a first DLO of said DLOs and a second, different, DLO of said DLOs, and
   (iv) pedagogical constraints that are associated with each DLO and which indicate layout modifications that are unauthorized to be performed by student electronic devices as part of automatic adaptation of layout of DLOs to properties of a particular student electronic device;
   (b) at a Real-Time Class Management (RTCM) unit, based on a pre-planned digital lesson plan which is dynamically controlled from a teacher device, automatically and selectively allocating digital learning objects to be executed by different student electronic devices;
   wherein based on the pre-planned digital lesson plan, a first DLO from said repository is automatically allocated to a first student electronic device, and a second, different, DLO from said repository is automatically allocated to a second, different, student electronic device;
   wherein at least an overlapping time-period is allocated for execution of the first DLO by the first student electronic device and of the second DLO by the second student electronic device;
   (c) based on analysis of interactions with digital learning objects through the student electronic devices, automatically grouping each user of student electronic device into one of three groups which comprise: (i) a below-level group of below-level students, (ii) an on-level group of on-level students, (iii) an above-level group of above-level students; and in response to a command from the teacher device, dynamically re-grouping students across said three groups during execution of said digital lesson plan;
   (d) dynamically allocating at said Real-Time Class Management (RTCM) unit, (A) a first digital learning object having an increased level of student-oriented help, to be performed by the below-level group of students, (B) a second digital learning object having an average level of student-oriented help, to be performed in parallel by the on-level group of students, (C) a third digital learning object having a reduced level of student-oriented help, to be performed in parallel by the above-level group of students;
   automatically adapting content items of said first DLO and said second DLO, for presentation on said first and second student devices, respectively, by taking into account both: (i) display constraints of said first and second student devices, and (ii) pedagogical goals and pedagogical requirements that are pre-defined with regard to said first DLO and said second DLO and which modify a manner in which the first and second DLOs are adapted to be displayed on said first and second student electronic devices, respectively;
   (e) generating on a teacher station, which is associated with said groups of students, an on-screen drag-and-drop interface to dynamically re-group students by moving an on-screen representation of a particular student between two of said groups, in real time while a lesson is in progress and during execution of said digital lesson plan;
   wherein generating the drag-and-drop interface comprises: generating an interface enabling to over-ride a pre-defined grouping that had been automatically generated by an adaptive learning management system.

2. The method of claim 1, further comprising:
   adding to said repository an educational digital learning object that was created by a content developer;
   serving said educational digital learning object to a plurality of students utilizing a plurality of electronic devices;
   monitoring progress and accomplishments of said students interacting with said educational digital learning object;
   sending to said content developer a report about the monitored progress and accomplishments of said students, wherein the report indicates a potential problem with a particular portion of said educational digital learning object.

3. The method of claim 2, comprising:
   determining that the percentage of students, who interacted with a particular question and also failed said particular question, is excessively greater than a pre-defined adequate failure rate;
   generating said report indicating that said particular question potentially requires correction by the content developer due to excessive failure rate by students.

4. The method of claim 2, comprising:
   determining that the percentage of students, who interacted with a particular question and also solved successfully said particular question, is excessively greater than a pre-defined adequate failure rate;
   generating said report indicating that said particular question potentially requires correction by the content developer due to excessive success rate by students.

5. The method of claim 1, comprising:
   receiving from a content creation platform, an educational digital learning object that was developed by a content publisher;
   publishing the educational digital learning object to a content consumption platform, in which a plurality of student devices consume said educational digital learning object;
   at the content consumption platform, monitoring progress of said students and their interaction with said educational digital learning object;
   at the content consumption platform, generating an aggregated report reflecting aggregated automatically-generated feedback to said educational digital learning object;
   sending the aggregated report to the content publisher.

6. The method of claim 1, comprising:
   receiving from a content publisher, an update to a digital learning object that is stored in said repository;
   selectively updating said digital learning object, only relative to students that did not yet interact with said educational digital learning object, and while maintaining un-modified said educational digital learning object for students that already interacted with said educational digital learning object.

7. The method of claim 1, comprising:
receiving from a content publisher, an update to a digital learning object that is stored in said repository, and that (A) was used by a first class of students, and (B) was not already used by a second class of students, and (C) was already used by some but not all of students of a third class of students;
selectively updating said digital learning object, only relative to the students of the second class, and not relative to the first class and the third class.

8. The method of claim 1, comprising:
automatically allocating additional digital learning objects, only to above-level students.

9. The method of claim 1, comprising:
automatically allocating additional on-screen help tools, only to below-level students.

10. The method of claim 1, comprising:
generating an adaptive rules engine interface, enabling a teacher utilizing a teacher station, to define one or more rules that define differential allocation of digital learning objects to students of the on-level group, to students of the below-level group, and to students of the above-level group.

11. The method of claim 1, comprising:
generating an adaptive learning path interface, enabling a teacher utilizing a teacher station, to define one or more rules that generate differential paths of digital learning to different groups of students.

12. The method of claim 1, comprising:
generating a pre-defined sequence of digital learning objects, intended for individual interaction by each student in a class;
defining a first stop-line indicating that a first group of students in said class is authorized to interact with a particular portion of the sequence of digital learning objects, wherein the particular portion of the sequence ends at said first stop-line;
defining a second stop-line indicating that a second group of students in said class is authorized to interact with a certain portion of the sequence of digital learning objects, wherein the certain portion of the sequence ends at said second stop-line.

13. The method of claim 12, comprising:
generating a drag-and-drop interface enabling the teacher, via the teacher station, to modify in real-time at least one of the first stop-line and the second stop-line.

14. The method of claim 1, comprising:
generating a pre-defined sequence of digital learning objects, intended for individual interaction by each student in a class;
defining a first stop-line indicating that the on-level group of students in said class, is authorized to interact with a first portion of the sequence of digital learning objects, wherein the first portion of the sequence ends at said first stop-line;
defining a second, advanced, stop-line indicating that the above-level group of students in said class, is authorized to interact with a second, advanced, portion of the sequence of digital learning objects, wherein the second portion of the sequence ends at said second stop-line.

15. The method of claim 14, comprising:
generating a drag-and-drop interface enabling the teacher, via the teacher station, to modify in real-time at least one of the first stop-line and the second stop-line.

16. The method of claim 1, comprising:
retrieving from said repository a particular digital learning object;
performing dynamic layout of said particular digital learning object, to adjust visual elements of said particular digital learning object for presentation of different electronic devices, by taking into account at least: (A) an available on-screen resolution of a view port of an electronic device, and (B) pedagogic importance of one-or-more visual elements.

17. The method of claim 1, comprising:
retrieving from said repository a particular digital learning object;
performing dynamic layout of said particular digital learning object, to adjust visual elements of said particular digital learning object for presentation of different electronic devices, by taking into account at least: (A) a screen orientation of an electronic device, and (B) pedagogic importance of one or more visual elements.

18. The method of claim 1, comprising:
retrieving from said repository a particular digital learning object;
performing dynamic layout of said particular digital learning object, to adjust visual elements of said particular digital learning object for presentation of different electronic devices, by (A) re-arranging a series of visual elements as a horizontal list on a first electronic device, and (B) re-arranging said series of visual elements as a vertical list on a second electronic device, and (C) re-arranging said series of visual elements as a matrix on a third electronic device;
wherein said re-arranging is based on both (i) a form factor of each said electronic devices, and (ii) a pedagogic goal intended to be achieved by said particular digital learning object.

19. The method of claim 1, comprising:
retrieving from said repository a particular digital learning object;
performing dynamic layout of said particular digital learning object, to adjust visual elements of said particular digital learning object for presentation of different electronic devices, based on pedagogic priority of said visual elements.

20. The method of claim 1, comprising:
retrieving from said repository a particular digital learning object;
performing dynamic layout of said particular digital learning object, to adjust visual elements of said particular digital learning object for presentation of different electronic devices, by taking into account one or more accessibility standards for students having special needs.

21. The method of claim 1, comprising:
retrieving from said repository a particular digital learning object;
performing dynamic layout of said particular digital learning object, to adjust visual elements of said particular digital learning object for presentation of different electronic devices, based on estimated distance of a user from each said electronic devices.

22. The method of claim 1, comprising:
retrieving from said repository a particular digital learning object;
performing dynamic layout of said particular digital learning object, to adjust visual elements of said particular digital learning object for presentation of different electronic devices, (A) by reducing a size of at least one visual element having reduced pedagogic significance, and (B) by maintaining a non-reduced size of at least one visual element having increased pedagogic significance.

23. The method of claim 1, comprising:

retrieving from said repository a particular digital learning object;

performing dynamic layout of said particular digital learning object, to adjust visual elements of said particular digital learning object for presentation of different electronic devices, (A) by maintaining a non-reduced size of at least one visual element having increased pedagogic significance, and (B) by replacing a visual element, having reduced pedagogic significance, with a thumbnail representation of said visual element.

24. The method of claim 1, comprising:

retrieving from said repository a particular digital learning object;

performing dynamic layout of said particular digital learning object, to adjust visual elements of said particular digital learning object for presentation of different electronic devices, by resizing visual elements, that have reduced pedagogic importance, at a greater resizing ratio relative to a resizing ratio of visual elements having increased pedagogic importance.

25. The method of claim 1, comprising:

retrieving from said repository a particular digital learning object;

retrieving from said repository a set of pedagogic constraints that are pre-associated with visual elements of said particular digital learning object;

performing dynamic layout of said particular digital learning object, to adjust visual elements of said particular digital learning object for presentation of different electronic devices, by taking into account said set of pedagogic constraints.

26. The method of claim 1, comprising:

retrieving from said repository a particular digital learning object;

retrieving from said repository a set of pedagogic constraints that are pre-associated with visual elements of said particular digital learning object;

performing dynamic layout of said particular digital learning object, to adjust visual elements of said particular digital learning object for presentation of different electronic devices, by taking into account said set of pedagogic constraints, wherein the set of pedagogic constraints comprises at least a constraint that a particular graphic element should always be shown in proximity to a particular textual element.

27. The method of claim 1, comprising:

(a) generating a sequence of digital learning objects, intended for individual interaction by each student in a class, utilizing individual electronic devices;

(b) at a point in time, in which a first student reached a first digital learning object in the sequence, and in which a second student reached a second, more advanced, digital learning object in the system, receiving from a teacher device a command to temporarily unify current sequence location for all students in the class;

(c) in response to the command, temporarily modifying the content shown on all student devices, to show the same digital learning object selected by the teacher from said sequence of digital learning objects, and while saving state of each student device prior to said modifying;

(d) in response to a further command to return to individual work, modifying back the content shown on all student devices, to show the content based on the saved state of each student device.

28. The method of claim 1, comprising:

(a) generating a sequence of digital learning objects, intended for individual interaction by each student in a class, utilizing individual electronic devices; wherein the sequence reflects a pre-defined flow and timing for gradual release of digital learning objects to be accessible by student devices;

(b) un-authorizing interaction of all student devices with all the digital learning objects of said sequence, except for one or more digital learning objects that the sequence determined to be released for interaction;

(c) via a teacher station, gradually and selectively releasing an additional digital learning object from said sequence, to be authorized for interaction by student devices, and while maintaining subsequent not-yet-released digital learning objects as non-accessible by student devices until a subsequent release command is generated by the teacher station.

29. The method of claim 1, comprising:

packaging a set of digital learning objects as a stand-alone package comprising (a) a user-defined sequence of performing the digital learning objects, and (b) a stand-alone playback module to playback the digital learning objects in accordance with said sequence, autonomously on a different platform.

30. The method of claim 1, comprising:

packaging a set of digital learning objects as a stand-alone package comprising (a) a user-defined sequence of performing the digital learning objects, and (b) a stand-alone playback module to playback the digital learning objects in accordance with said sequence, autonomously on a different platform, and (c) an Application Programming Interface (API) module to enable inter-communication between the stand-alone package and a different Learning Management System (LMS).

* * * * *